United States Patent
Ruedisueli et al.

(10) Patent No.: US 11,281,816 B2
(45) Date of Patent: Mar. 22, 2022

(54) SYSTEMS AND METHODS FOR MANUFACTURING PERSONALIZED ORAL CARE DEVICES

(71) Applicant: Fresh Health Inc., Mountain View, CA (US)

(72) Inventors: Stuart Gavin Ruedisueli, Roxbury, MA (US); Andrew Witt, Boston, MA (US); Angela Junyan Chu, San Francisco, CA (US); Sophie Katherine Sheeline, San Francisco, CA (US)

(73) Assignee: FRESH HEALTH INC., Mountain View, CA (US)

( * ) Notice: Subject to any disclaimer, the term of this patent is extended or adjusted under 35 U.S.C. 154(b) by 0 days.

(21) Appl. No.: 17/066,390

(22) Filed: Oct. 8, 2020

(65) Prior Publication Data
US 2022/0027526 A1   Jan. 27, 2022

Related U.S. Application Data

(60) Provisional application No. 63/054,678, filed on Jul. 21, 2020.

(51) Int. Cl.
*G06F 30/10*   (2020.01)
*A61C 17/02*   (2006.01)
(Continued)

(52) U.S. Cl.
CPC .......... *G06F 30/10* (2020.01); *A61C 17/0211* (2013.01); *A61C 9/0046* (2013.01); *B33Y 80/00* (2014.12); *G06F 2111/16* (2020.01)

(58) Field of Classification Search
CPC .. G06F 30/10; G06F 2111/16; A61C 17/0211; A61C 9/0046; B33Y 80/00
See application file for complete search history.

(56) References Cited

U.S. PATENT DOCUMENTS

| | | |
|---|---|---|
| 3,379,192 A | 4/1968 | Warren |
| 3,527,218 A | 9/1970 | Westine |

(Continued)

FOREIGN PATENT DOCUMENTS

| | | |
|---|---|---|
| EP | 0 865 770 A1 | 9/1998 |
| FR | 2 905 258 | 3/2008 |

(Continued)

OTHER PUBLICATIONS

International Search Report and Written Opinion issued in International Application No. PCT/US2018/040459 dated Nov. 5, 2018, 12 pages.

(Continued)

*Primary Examiner* — Jay Hann
(74) *Attorney, Agent, or Firm* — Cooley LLP

(57) ABSTRACT

Designing personalized oral irrigation may include a generated oral insert including a fluid inlet port, fluid nozzles, manifolds, and a tray configured to retain teeth. One variation of a design method may comprise the steps of displaying a graphical representation of the oral insert model, generating a geometry of the fluid nozzles based on oral scan data of a jaw, defining a tray surface that encloses the fluid nozzles based on the oral scan data, and generating a geometry of the manifolds that connect the fluid inlet port to the fluid nozzles on the graphical representation of the oral insert model. The manifolds are configured to provide a predetermined range of hydraulic pressures to each of the fluid nozzles.

16 Claims, 32 Drawing Sheets

(51) Int. Cl.
*B33Y 80/00* (2015.01)
*G06F 111/16* (2020.01)
*A61C 9/00* (2006.01)

(56) References Cited

U.S. PATENT DOCUMENTS

| | | | |
|---|---|---|---|
| 3,731,675 A | 5/1973 | Kelly | |
| 4,164,940 A | 8/1979 | Quinby | |
| 5,104,315 A | 4/1992 | McKinley | |
| 5,177,827 A | 1/1993 | Ellison | |
| 5,365,624 A | 11/1994 | Berns | |
| 6,056,710 A | 5/2000 | Bachman et al. | |
| 6,334,853 B1 | 1/2002 | Kopelman et al. | |
| 6,353,956 B1 | 3/2002 | Berge | |
| 6,402,707 B1 | 6/2002 | Ernst | |
| 6,475,173 B1 | 11/2002 | Bachman et al. | |
| 6,893,259 B1 | 5/2005 | Reizenson | |
| 7,059,853 B2 | 6/2006 | Hegemann | |
| 7,092,107 B2 | 8/2006 | Babayoff et al. | |
| 7,112,065 B2 | 9/2006 | Kopelman et al. | |
| 7,156,661 B2 | 1/2007 | Choi et al. | |
| 8,102,538 B2 | 1/2012 | Babayoff | |
| 8,241,035 B2 | 8/2012 | Jones et al. | |
| 8,363,228 B2 | 1/2013 | Babayoff | |
| 8,617,090 B2 | 12/2013 | Fougere et al. | |
| 8,638,447 B2 | 1/2014 | Babayoff et al. | |
| 8,638,448 B2 | 1/2014 | Babayoff et al. | |
| 8,675,207 B2 | 3/2014 | Babayoff | |
| 8,684,956 B2 | 4/2014 | McDonough et al. | |
| 8,888,727 B2 | 11/2014 | Boyd et al. | |
| 8,936,466 B2 * | 1/2015 | Moffson | A61C 1/084 433/75 |
| 9,022,959 B2 | 5/2015 | Fusi, II et al. | |
| 9,022,960 B2 | 5/2015 | Fougere et al. | |
| 9,022,961 B2 | 5/2015 | Fougere et al. | |
| 9,101,433 B2 | 8/2015 | Babayoff | |
| 9,216,073 B2 | 12/2015 | McDonough et al. | |
| 9,222,768 B2 | 12/2015 | Ernst et al. | |
| 9,299,192 B2 | 3/2016 | Kopelman | |
| 9,308,064 B2 | 4/2016 | Binner et al. | |
| 9,367,063 B2 * | 6/2016 | Herrman | G05B 19/4097 |
| 9,579,173 B2 | 2/2017 | Fougere et al. | |
| 9,615,901 B2 | 4/2017 | Babayoff et al. | |
| 9,770,643 B2 | 9/2017 | Hawkins | |
| 10,215,317 B2 * | 2/2019 | Burkhart | B01F 15/0429 |
| 10,591,898 B2 * | 3/2020 | Wolf | G05B 19/4063 |
| 10,682,211 B1 | 6/2020 | Barlet et al. | |
| 11,141,249 B2 | 10/2021 | Evans et al. | |
| 2007/0184404 A1 | 8/2007 | Johnki | |
| 2009/0208898 A1 | 8/2009 | Kaplan | |
| 2009/0223513 A1 | 9/2009 | Papania et al. | |
| 2010/0062397 A1 | 3/2010 | Brewer | |
| 2011/0027746 A1 | 2/2011 | McDonough et al. | |
| 2011/0072605 A1 | 3/2011 | Steur | |
| 2011/0117517 A1 | 5/2011 | Bergheim et al. | |
| 2011/0154595 A1 | 6/2011 | Hill | |
| 2011/0185525 A1 | 8/2011 | Stapelbroek et al. | |
| 2011/0318705 A1 | 12/2011 | Sullivan et al. | |
| 2012/0077144 A1 | 3/2012 | Fougere et al. | |
| 2012/0189976 A1 | 7/2012 | McDonough et al. | |
| 2012/0219926 A1 | 8/2012 | Sullivan et al. | |
| 2012/0318289 A1 | 12/2012 | Sahoo | |
| 2013/0014331 A1 | 1/2013 | Garner et al. | |
| 2013/0190608 A1 | 7/2013 | Schmidt | |
| 2016/0235509 A1 | 8/2016 | Freiberg et al. | |
| 2016/0236851 A1 | 8/2016 | Leser et al. | |
| 2017/0165040 A1 | 6/2017 | Wolgin | |
| 2018/0116773 A1 * | 5/2018 | Chen | A61C 17/0211 |
| 2018/0344440 A1 * | 12/2018 | Dorward | A61C 17/022 |
| 2019/0000599 A1 | 1/2019 | Hanuschik et al. | |
| 2021/0030519 A1 | 2/2021 | Hanuschik et al. | |
| 2021/0085436 A1 | 3/2021 | Evans et al. | |

FOREIGN PATENT DOCUMENTS

| | | |
|---|---|---|
| WO | WO 2016/164068 A1 | 10/2016 |
| WO | WO 2020/214697 A1 | 10/2020 |
| WO | WO-2020/223353 A1 | 11/2020 |

OTHER PUBLICATIONS

International Search Report and Written Opinion issued in International Application No. PCT/US2020/028311 dated Aug. 14, 2020, 16 pages.

Extended European Search Report issued in European Application No. 18824871.0 dated Feb. 8, 2021, 10 pages.

United States Patent and Trademark Office, International Preliminary Report on Patentability for PCT/US2020/028311, dated Sep. 28, 2021, 9 pages.

* cited by examiner

SYSTEMS AND METHODS FOR MANUFACTURING PERSONALIZED ORAL CARE DEVICES

CROSS-REFERENCE TO RELATED APPLICATIONS

This application claims priority to U.S. Provisional Patent Application No. 63/054,678, filed Jul. 21, 2020, which is hereby incorporated by reference in its entirety.

BACKGROUND

Tooth-brushing, interdental cleaning (e.g., flossing), and oral rinsing with antiseptic solutions are methods recommended by dental practitioners to prevent periodontal disease, gum disease (e.g., gingivitis), and/or tooth loss. However, for a variety of reasons, few individuals include all of these steps as part of their regular dental hygiene practice. Without adequate cleaning, bacteria levels in the mouth may rise and increase the likelihood of tooth decay, gum disease, and may even cause systemic inflammation. Elevated levels of inflammation have been linked to an increased risk of cardiovascular disease (e.g., developing atherosclerotic plaques, heart attack, stroke) and other diseases or conditions.

Currently, water flossers are available that provide high-speed fluid jets, as well as electric toothbrushes with vibrating bristles. The high-speed bristle motion may remove plaque and/or biofilms more efficiently than manual brushing. However, some oral care devices may be cumbersome and/or time-consuming to design and validate, thereby increasing their cost and increasing the barrier to entry for consumers. Accordingly, additional methods for manufacturing oral care devices may be desirable.

SUMMARY

Described herein are methods of generating a model (e.g., template) of an oral insert that is configured to provide personal oral irrigation. The oral insert may comprise a fluid inlet port, fluid nozzles, manifolds, and a tray configured to retain teeth. The method may comprise displaying a graphical representation of the oral insert model, generating a geometry of the fluid nozzles based on oral scan data of a jaw, defining a tray surface that encloses the fluid nozzles based on the oral scan data, and generating a geometry of the manifolds that connect the fluid inlet port to the fluid nozzles on the graphical representation of the oral insert model. The manifolds may be configured to provide a predetermined range of hydraulic pressures to each of the fluid nozzles.

In some variations, each of the manifolds may comprise a trunk coupled to the fluid inlet port and at least one of the fluid nozzles. In some variations, a diameter of the manifold may decrease along a length of the manifold from the fluid inlet port. In some variations, generating the geometry of the manifolds may further comprise identifying one or more step regions along a length of the manifold.

In some variations, the one or more step regions of the manifold may be identified based on one or more of a location of the fluid nozzles. In some variations, the one or more step regions may comprise a step length and a taper angle. In some variations, generating the geometry of the manifolds may further comprise generating a branch coupled to the trunk and one or more of the fluid nozzles. In some variations, generating the geometry of the manifolds may further comprise generating a pressure port coupled to the trunk based on a number of the fluid nozzles. In some variations, generating the pressure port may further comprise connecting the pressure port between the trunk and a fluid outlet port of the oral insert.

In some variations, generating the geometry of the manifolds may be based at least on curvature analysis of the manifolds. In some variations, intersections may be smoothed between one or more of the fluid inlet port, fluid nozzles, manifolds, branch, pressure port, and the tray surface. In some variations, the manifold may be configured to provide a substantially equal hydraulic pressure to each of the fluid nozzles.

Also described are methods of generating a model of an oral insert that comprises a fluid inlet port, fluid nozzles, manifolds, and a tray configured to retain teeth, the method comprising generating a geometry of the fluid nozzles based on oral scan data of a jaw, defining a tray surface that encloses the fluid nozzles based on the oral scan data, generating a geometry of the manifolds that connects the fluid inlet port to the fluid nozzles, and displaying a graphical representation of a geometric conflict between one or more of the fluid inlet port, the fluid nozzles, the manifolds, and the tray.

In some variations, the geometric conflict may be identified between one or more of the fluid inlet port, the fluid nozzles, the manifolds, and the tray. In some variations, one or more of the geometries of the fluid nozzles and the manifolds may be modified in response to the geometric conflict. In some variations, modifying one or more of the geometries of the fluid nozzles and the manifolds may comprise linear optimization. In some variations, the linear optimization sequentially modifies the geometries of the fluid nozzles and the manifolds. In some variations, modifying one or more of the geometries of the fluid nozzles and the manifolds may comprise non-linear optimization. In some variations, the non-linear optimization may comprise measuring a quality of fluid nozzle positioning using a predetermined fitting function. In some variations, modifying one or more of the geometries of the fluid nozzles and the manifolds may comprise serial or parallel modification of the geometries of the fluid nozzles and the manifolds.

In some variations, displaying the graphical representation of the geometric conflict may further comprise identifying one or more intersections and clearance conflicts between one or more of the fluid inlet port, the fluid nozzles, the manifolds, and the tray surface based on one or more of a wire representation and mesh representation. In some variations, displaying the graphical representation of the geometric conflict may further comprise identifying one or more kinks in the manifolds. In some variations, displaying the graphical representation of the geometric conflict may further comprise identifying one or more intersections and clearance conflicts between the fluid nozzle and the tray surface. In some variations, intersections between one or more of the fluid inlet port, fluid nozzles, manifolds, and the tray may be smoothed.

Also described are methods of generating a model of an oral insert that comprises a fluid inlet port, fluid nozzles, manifolds, and a tray configured to retain teeth, the method comprising displaying a graphical representation of the oral insert, identifying interproximal geometry and teeth geometry of oral scan data of a jaw, generating a geometry of the fluid nozzles on the graphical representation based on the interproximal geometry and the teeth geometry such that the fluid nozzles are configured to clean oral tissue. The geometry of the fluid nozzles comprise a fluid nozzle inlet, a fluid nozzle outlet, and a fluid nozzle clearance geometry.

In some variations, the interproximal geometry may comprise one or more of a facial interproximal point, a lingual interproximal point, an occlusal interproximal point, and an interproximal plane. In some variations, the teeth geometry may comprise a longitudinal axis of the tooth. In some variations, the fluid nozzle clearance geometry may comprise a longitudinal axis between an in interproximal point and the fluid nozzle outlet with a length between about 2 mm and about 6 mm. In some variations, the longitudinal axis may extend from of the facial and lingual interproximal points.

In some variations, the fluid nozzle clearance geometry may comprise a vertex angle between about 45 degrees and about 90 degrees. In some variations, the fluid nozzle clearance geometry may comprise an inlet comprising a first diameter and an outlet comprising a second diameter larger than the first diameter. In some variations, the fluid nozzle may comprise a first portion, a second portion, and a fluid nozzle angle between the first portion and the second portion. In some variations, the first portion may be between about 1 mm and about 2.5 mm. In some variations, the first angle may be between about 100 degrees and about 260 degrees. In some variations, a tray surface may define a surface that encloses the fluid nozzles based on the oral scan data. In some variations, the fluid nozzle inlet may comprise a manifold space reservation. In some variations, a geometry of the manifolds may be generated on the graphical representation that connects the fluid inlet port to the fluid nozzles. In some variations, intersections between one or more of the fluid inlet port, fluid nozzles, manifolds, and the tray may be smoothed. In some variations, one or more of the geometries of the fluid nozzles and the manifolds of the oral insert model may be optimized. In some variations, the teeth may comprise upper and lower teeth, and the jaw may comprise upper and lower jaws, and the tray comprises an upper and lower tray. In some variations, manufacturing the oral insert may be based on the model of the oral insert.

DETAILED DESCRIPTION

Figure 1A:
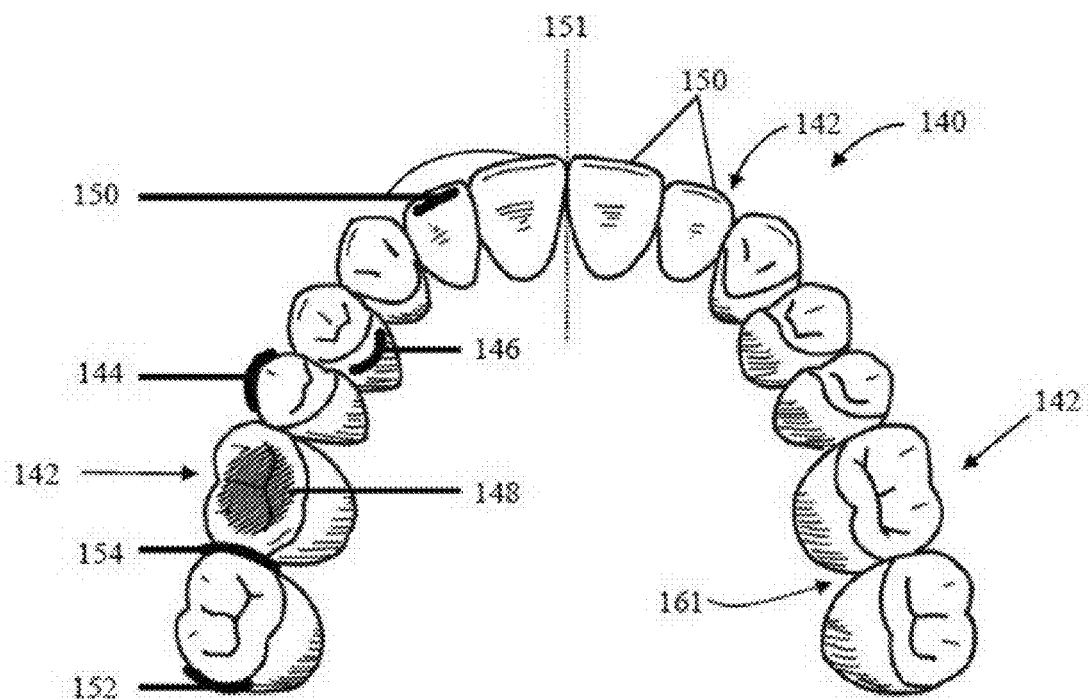
FIG. 1A depicts a top view of the oral anatomy of a user.

Disclosed herein are methods and systems for manufacturing personalized oral care devices such as an oral insert. These devices may include an arrangement of fluid openings configured to output pressurized fluid for cleaning the surfaces of or interproximal spaces between one or more teeth. Generally, an oral care device model (e.g., oral insert model) may comprise an arrangement of fluid openings positioned to output a predetermined range of fluid flow specific to a user's oral anatomy. Other device structures in fluid communication with the fluid openings may include one or more of a manifold, fluid inlet, effluent port, and tray, as described in more detail herein. An oral care device manufactured based on the oral care device model may be held in the mouth of a user and coupled to a fluid source such as a fluid reservoir.

In some variations, the oral insert may be designed for the unique oral anatomy of each user to improve one or more of cleaning efficiency and user comfort, which may increase adoption and promote consistent usage. For example, the dimensions of the oral insert may be optimized (e.g., reduced) for user comfort while comprising structures (e.g., manifolds, nozzles) configured to provide a predetermined hydraulic efficiency for optimal oral tissue care (e.g., gingiva cleaning, gingiva stimulation, teeth cleaning). Fluid egress from a plurality of fluid openings (e.g., nozzles) may clean multiple teeth simultaneously where the arrangement and spatial configuration of the fluid nozzles target specific oral anatomy features of a predetermined user to facilitate effective cleaning of oral tissue surfaces (e.g., gingiva, teeth).

Generally, the methods and systems for generating an oral care device model as described herein may streamline a production workflow by processing user oral scan data into a user anatomy model used to generate the structures of the oral care device model customized to the user's anatomy. In some variations, a customized oral care device model may be generated based on one or more of a plurality of scans of user oral anatomy and scans of a physical impression of the user anatomy. In some variations, an oral care device model may be generated based on the user oral data with structural features comprising a fluid inlet port, fluid nozzles, manifolds, tray, fluid outlet port (e.g., effluent port), and the like. For example, the oral care device model may be generated based on identified reference interproximal geometry and teeth geometry (e.g., gingival margins, interdental gingiva, interproximal regions, incisal edges, and contours of the occlusal, facial, lingual, mesial and distal surfaces of the teeth, etc.), corresponding to the user oral data, as described in more detail herein.

Also described herein are methods of optimizing an oral care device model. One or more structures (or representations of the structures) of an oral care device model may be initially generated. The geometry and location of one or more structures may be modified during and/or after initial generation to avoid structural conflicts, aid manufacturing, improve one or more of hydraulic efficiency, cleaning efficiency, user comfort, and/or other optimizations. Conventional manual optimization of an oral care device model generally relies on the skill, experience, and efficiency of a designer, which may lead to inconsistent design, time efficiency, and results. Furthermore, the number of structural elements, design parameters and requirements may be such that manual optimization techniques are impractical if even feasible. For example, hydraulic elements (e.g., manifold) of an oral insert may be constrained by a patient's unique oral anatomy, hydraulic performance criteria, and manufacturing constraints (e.g., minimum wall thicknesses). A change in a parameter value (e.g., manifold diameter) may optimize the oral insert in one dimension but may generate geometric conflicts (e.g., manifold-enclosure conflict) and/or reduce performance for a plurality of downstream structures (e.g., fluid nozzle flow rate) that may require additional modifications in geometry to meet each design requirement. Identifying geometric conflicts between the different structures of the oral care device model may add significant computational load for each potential modification. In some variations, the configuration of the structural features of an oral care device model may be optimized based on a predetermined set of structural constraints. For example, a device structure may be modified after detecting a proximity error between at least two structures (e.g., minimum wall thickness between manifold and tray, nozzle collision).

In some variations, errors and/or inefficiencies (e.g., geometric conflicts, hydraulic inefficiencies) of one or more structures may be identified and then the structures may be modified to optimize the oral care device model. For example, a manifold connected to a plurality of fluid nozzles may be configured to provide a predetermined range of hydraulic pressures to each of the fluid nozzles. In turn, each of a plurality of fluid nozzles may be configured to provide a predetermined range of hydraulic pressures at an outlet of its fluid nozzle. However, if a conflict is identified between the geometry of the fluid nozzle and the geometry of a tray surface, then one or more of the fluid nozzle and tray surface may be modified to resolve the conflict. In turn, a corresponding manifold may be modified if necessary to ensure that the predetermined range of hydraulic pressures are provided to each of the fluid nozzles (e.g., by ensuring fluidic connection between the manifold and fluid nozzle). As another example, a manifold may comprise a path having a section with a kink with high tortuosity and turbulent fluid flow. The radius of curvature may be increased at the section with the kink to reduce tortuosity and turbulent fluid flow. Furthermore, one or more fluid nozzles may be repositioned and/or rotated along a length of the manifold to accommodate the change in manifold geometry.

In some variations, the oral care devices described herein may be configured to clean teeth and/or disrupt biofilms that may form on or in between the teeth or restorations or around dental appliances, and within the gingival sulcus. However, it should be understood that the systems described herein may also be used for the application of medicaments or prophylactics to the oral cavity, teeth whitening, oral disinfection, antiseptic fluids, cleaning fluids, etc.

As used herein, user oral anatomy may comprise any oral and/or dental devices or implants, for example, permanent and removable dental restorations/prosthetics, orthodontic appliances, and etc. (e.g. crowns, bridges, implants, braces, retainers, dentures, and the like).

In some variations, the systems, devices, and methods disclosed herein may comprise one or more systems, devices, and methods described in International Patent Application Serial No. PCT/US2018/040459, filed on Jun. 29, 2018, and International Patent Application Serial No. PCT/US2020/028311, filed on Apr. 15, 2020, the contents of which are hereby incorporated by reference in its entirety.

Oral Anatomy

Figure 1B:
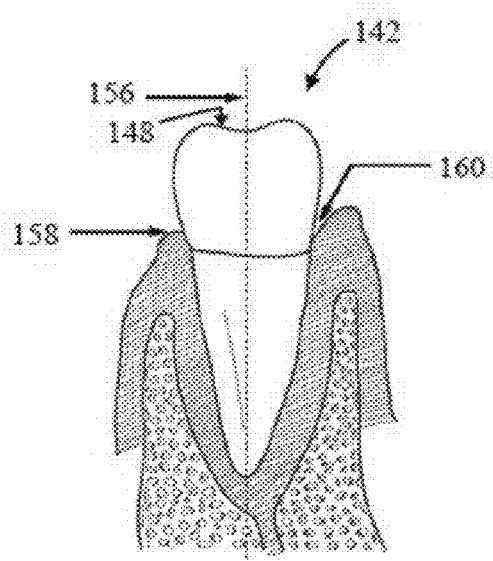
FIG. 1B depicts a partial cutaway side view of a tooth and surrounding gingiva.
Figure 1C:
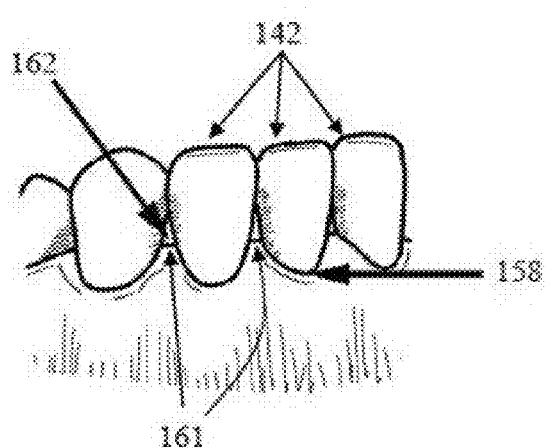
FIG. 1C depicts a side view of teeth and surrounding gingiva.

It may be helpful to briefly identify and describe relevant oral anatomy. FIGS. 1A-1C are schematic depictions of oral anatomy and dental structures, illustrating the regions of the oral cavity described herein. FIG. 1A depicts a top view of a set of teeth (140) of the mandible or lower jaw (though similar terminology may be used to refer to the teeth and structures of the maxilla or upper jaw). Each tooth (142) may have a facial surface (144) which is the region of the tooth that contacts the cheeks or lips and a lingual surface (146) which is the region of the tooth that contacts (or is nearest to) the tongue. Facial surfaces may be, for example, the buccal surfaces of the posterior teeth and the labial surfaces of the anterior teeth. Lingual surfaces may also be referred to as the palatal surfaces for maxillary teeth. Posterior teeth may have an occlusal surface (148) and the anterior teeth may have an incisal edge or surface (150). The occlusal (or incisal) surface is the region of the tooth that aids in chewing, and/or faces across from the occlusal (or incisal) surface of the opposing tooth. The surface of a tooth facing away from the arch midline may be referred to as the distal surface (152) while the surface of a tooth facing toward the arch midline (151) may be referred to as the mesial surface (154).

FIG. 1B depicts a side view of a single tooth (142), which may have a longitudinal axis (156) that extends along the longest dimension of the tooth (142) and/or is substantially perpendicular to the occlusal surface (148) or incisal edge (150) of the tooth. The edge or boundary of the gums (e.g., gingiva, gingival tissue) along the surfaces of the teeth or closest to the occlusal surfaces or incisal edge of the teeth may be referred to as the gingival margin (158). The gingival margin (158) may have one or more curves along the bottom of each tooth, and the radius of curvature and length of the gingival margin for each tooth may vary. A space or region (160) between the gingiva and the surfaces of the tooth may be referred to as a gingival sulcus (160). Interdental gingiva (161) may be the gum tissue located between two adjacent teeth. FIG. 1C depicts a side view of a plurality of teeth (142). The space or gap between each tooth (142) may be referred to as the interproximal space or gap (162), and may be defined by the mesial surface of one tooth and the distal surface of the adjacent tooth, or the mesial surfaces of two teeth, in the case of central incisor teeth. The left side of a user's oral cavity may be the region of the oral cavity that is to the left of the interproximal space between the two central incisors (e.g., to the left of the arch midline), and the right side of a user's oral cavity may be the region of the oral cavity that is to the right of the interproximal space between the two central incisors (e.g., to the right of the arch midline).

I. Systems and Devices

Described here are oral care devices and systems. Generally, the oral care devices (e.g., oral inserts) comprise an arrangement of fluid openings (e.g., fluid nozzles) and corresponding fluid channels (e.g., manifolds) configured to provide a predetermined range of fluid flow based on at least one characteristic of the user's oral anatomy. Fluid egress from a plurality of fluid openings may clean multiple teeth simultaneously and the location and geometry of the fluid openings with respect to specific and unique structures of the user's mouth may help facilitate expeditious and/or effective cleaning of teeth surfaces.

Oral Care System

Figure 2A:
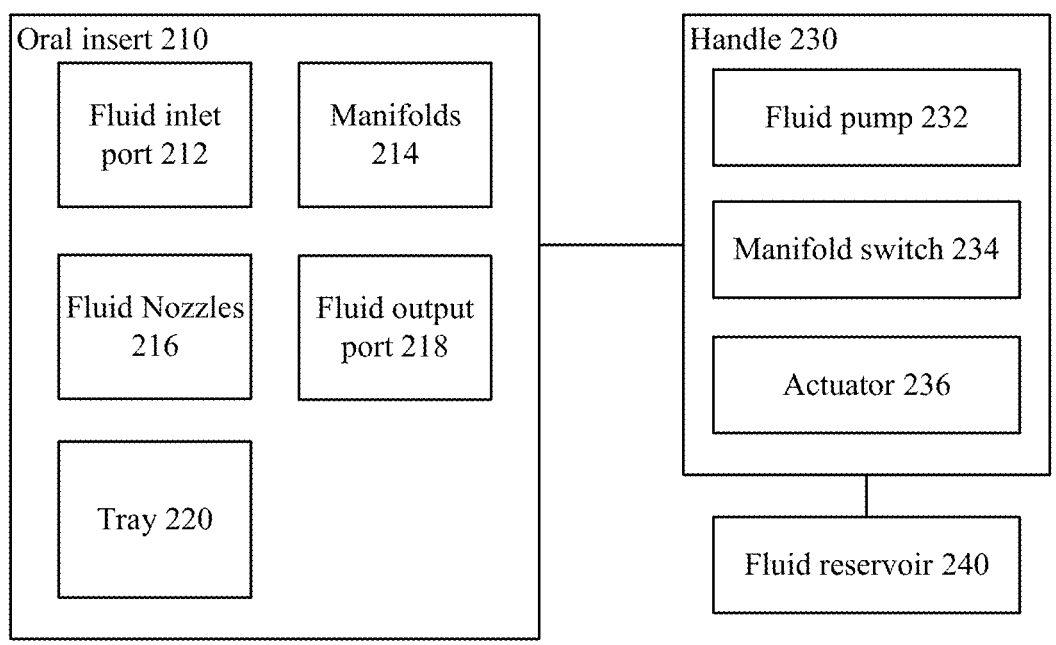
FIG. 2A depicts a block diagram of one variation of an oral care system.

FIG. 2A depicts a block diagram of one variation of an oral care system (200) comprising an oral insert (210), handle (230), and fluid reservoir (240). The oral insert (210) may be releasably engaged with the handle (230) and fluid reservoir (240). A user may use the handle (230) to manipulate and position the oral insert (210) within oral anatomy. The oral insert (210) may be configured to be in fluid communication with the fluid reservoir (240). The oral insert (210) may output a predetermined volume of fluid received from the fluid reservoir (240). The fluid structures defined by the oral insert (210) may comprise a fluid inlet port (212), a set of manifolds (214), a set of nozzles (216), and a fluid outlet port (e.g., effluence port) (218). The oral insert (210) may define a tray (220) configured to retain teeth (e.g., upper teeth, lower teeth). In some variations, the tray (220) may be configured such that at least a portion of the tray (220) corresponds to a shape of the user's teeth.

The oral insert (210) may be configured to receive fluid from the fluid reservoir (240) at the fluid inlet port (212). The fluid inlet port (212) may be configured to be in fluid communication with the set of manifolds (214) and the set of nozzles (216). Fluid output from the set of nozzles (216) may be directed at the user's oral anatomy, for example, through the interproximal spaces between the teeth. After the fluid passes through and/or irrigates the user's oral anatomy, the fluid may then be guided to the fluid outlet port (218) to exit the user's oral cavity. In some variations, fluid may flow sequentially into the fluid inlet (212) and through the set of manifolds (214) and then respective nozzles (216). The set of nozzles (216) may be configured to output fluid toward oral anatomy. The fluid outlet port (218) may then receive the fluid (e.g., effluence) and channel it away from the oral anatomy.

In some variations, the oral care device (210) may be configured to receive fluid from the handle (230) and/or fluid reservoir (240). In some variations, the handle (230) may comprise one or more of a fluid pump (232), manifold switch (234), and actuator (236). For example, the fluid inlet port (212) may be coupled to the fluid pump (232). The fluid pump (232) may be configured to output pressurized fluid to the oral insert (210). In some variations, the handle (230) may comprise a manifold switch (234) configured to select and route fluid into one or more of the manifolds (214). For example, the manifold switch (234) may be configured to output fluid sequentially to each manifold at a predetermined rate. This may allow control of fluid flow rates to increase user comfort by preventing an excess volume of pressurized fluid from entering and exiting a user's mouth. The handle (230) may comprise an actuator (236) configured to operate one or more of the fluid pump (232) and manifold switch (234).

In some variations, the fluid reservoir (240) may be configured to hold a predetermined volume of fluid. For example, the fluid reservoir (240) may be configured to hold enough fluid for at least one cleaning cycle. Additionally or alternatively, the fluid reservoir (240) may be configured to couple to a fluid source to supply and/or augment the fluid held by the fluid reservoir (240).

Additionally or alternatively, the oral care system (200) may comprise one or more temperature control elements (e.g., heater, chiller). For example, one or more of the handle (230) and fluid reservoir (240) may comprise one or more of a heating element and a cooling element. In some variations, a heating element may be configured to control a temperature of the fluid. In some variations, the fluid may be set at a predetermined range of temperatures to improve cleaning efficacy (e.g., higher temperatures may help facilitate removal of hydrophobic food or biofilm residues, such as residues with fatty acids and/or oils, and/or dissolve and/or soften hardened food residues), and/or increase chemical activity of entrained, therapeutic additives. In some variations, a heating element may comprise an electrical-resistance type heating element, and/or a cooling element may be a thermoelectric cooler (e.g., a solid-state device such as a Peltier device).

Computing System

Figure 2B:
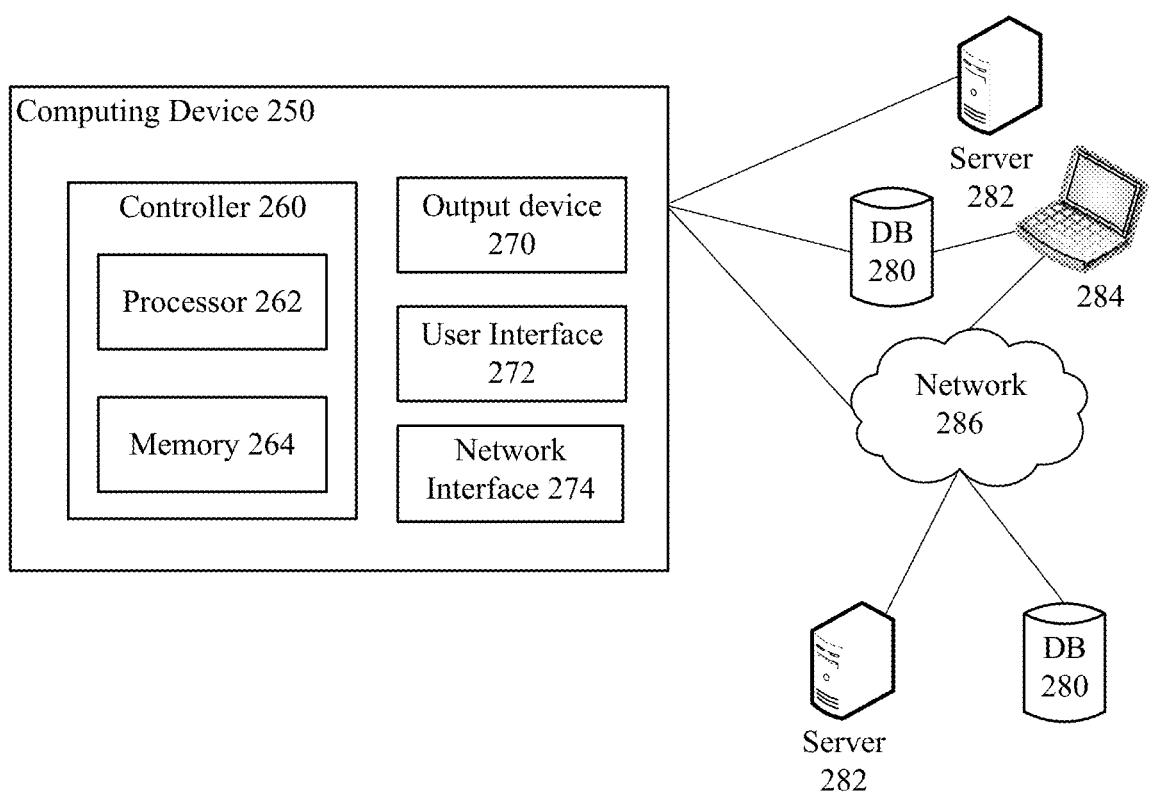
FIG. 2B depicts a block diagram of a computing system.

FIG. 2B depicts a block diagram of a computing system configured to generate an oral care model (e.g., oral insert model) as described herein. The computing devices as described herein may couple to one or more control systems (e.g., computer systems) and/or networks. FIG. 2B is a block diagram of the computing device (250). The computing device (250) may comprise a controller (260) comprising a processor (262) and a memory (264). In some embodiments, the computing device (250) may further comprise a display (270), user interface (272), and network interface (274). A user interface (272) configured to permit a user to directly control the computing system (250). The controller (260) may be coupled to the network interface (274) to permit a user to remotely control the computing system (250). The network interface (274) may be configured to connect the computing system (250) to another system (e.g., Internet, remote server, database) over a wired and/or wireless network.

Controller

Generally, the computing devices described herein may include process oral data to generate an oral insert model. In some variations, one or more graphical representations of the oral insert model may be output on a display. The oral insert model may be output in a data format for manufacture. As described in more detail herein, the controller may be coupled to one or more networks using a network interface. The controller may include a processor and memory coupled to a user interface. The controller may automatically perform one or more steps of data processing, oral anatomy identification, oral insert structure generation, and conflict resolution, and thus optimize oral insert model generation. The controller may include computer instructions for operation thereon to cause the processor to perform one or more of the steps described herein. Generally, the processor (e.g., CPU) described here may process data and/or other signals to control one or more components of the system. The processor may be configured to receive, process, compile, compute, estimate, calculate, optimize, modify, store, access, read, write, and/or transmit data and/or other signals.

The controller (260) may comprise one or more processors (262) and one or more machine-readable memories (264) in communication with the one or more processors (262). The processor (262) may incorporate data received from memory (264) and user input to control the computing device (250). The memory (264) may further store instructions to cause the processor (262) to execute modules, processes, and/or functions associated with the computing device (250). The controller (260) may be implemented consistent with numerous general purpose or special purpose computing systems or configurations. Various exemplary computing systems, environments, and/or configurations that may be suitable for use with the systems and devices disclosed herein may include, but are not limited to software or other components within or embodied on a server or server computing devices such as routing/connectivity components, multiprocessor systems, microprocessor-based systems, distributed computing networks, personal computing devices, network appliances, portable (e.g., hand-held) or laptop devices. Examples of portable computing devices include smartphones, personal digital assistants (PDAs), cell phones, tablet PCs, wearable computers taking the form of smartwatches and the like, and portable or wearable augmented reality devices that interface with the user's environment through sensors and may use head-mounted displays for visualization, eye gaze tracking, and user input.

Processor

The processor (262) may be any suitable processing device configured to run and/or execute a set of instructions or code and may include one or more data processors, image processors, graphics processing units, physics processing units, digital signal processors, and/or central processing units. The processor (262) may be, for example, a general purpose processor, Field Programmable Gate Array (FPGA), an Application Specific Integrated Circuit (ASIC), combinations thereof, and the like. The processor (262) may be configured to run and/or execute application processes and/or other modules, processes and/or functions associated with the system and/or a network associated therewith. The underlying device technologies may be provided in a variety of component types including metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, combinations thereof, and the like.

Memory

In some embodiments, the memory (264) may include a database (not shown) and may be, for example, a random access memory (RAM), a memory buffer, a hard drive, an erasable programmable read-only memory (EPROM), an electrically erasable read-only memory (EEPROM), a read-only memory (ROM), Flash memory, combinations thereof, and the like. As used herein, database refers to a data storage resource. The memory (264) may store instructions to cause the processor (262) to execute modules, processes, and/or functions associated with the computing system (250), such as identification, generation, modification, optimization, storage, output, analysis, notification, communication, authentication, user settings, combinations thereof, and the like. In some embodiments, storage may be network-based and accessible for one or more authorized users. Network-based storage may be referred to as remote data storage or cloud data storage. Data stored in cloud data storage (e.g., database) may be accessible to authorized users via a network, such as the Internet. In some embodiments, database (280) may be a cloud-based FPGA.

Some embodiments described herein relate to a computer storage product with a non-transitory computer-readable medium (also may be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also may be referred to as code or algorithm) may be those designed and constructed for a specific purpose or purposes.

Examples of non-transitory computer-readable media include, but are not limited to, magnetic storage media such as hard disks, floppy disks, and magnetic tape; optical storage media such as Compact Disc/Digital Video Discs (CD/DVDs); Compact Disc-Read Only Memories (CD-ROMs); holographic devices; magneto-optical storage media such as optical disks; solid state storage devices such as a solid state drive (SSD) and a solid state hybrid drive (SSHD); carrier wave signal processing modules; and hardware devices that are specially configured to store and execute program code, such as Application-Specific Integrated Circuits (ASICs), Programmable Logic Devices (PLDs), Read-Only Memory (ROM), and Random-Access Memory (RAM) devices. Other embodiments described herein relate to a computer program product, which may include, for example, the instructions and/or computer code disclosed herein.

The systems, devices, and methods described herein may be performed by software (executed on hardware), hardware, or a combination thereof. Hardware modules may include, for example, a general-purpose processor (or microprocessor or microcontroller), a field programmable gate array (FPGA), an application specific integrated circuit (ASIC), combinations thereof, and the like. Software modules (executed on hardware) may be expressed in a variety of software languages (e.g., computer code), including C, C++, Java®, Python, Ruby, Visual Basic®, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

User Interface

User interface (272) may serve as a communication interface between a user (e.g., operator) and the computing device (250). In some embodiments, the user interface (272) may comprise an input device and output device (e.g., touch screen and display) and be configured to receive input data and output data from one or more sensors, input device, output device, network (286), database (280), and server (282). For example, a user interface (272) of the computing device (250) may include an input device for a user to input commands and an output device (e.g., display (2700) for a user (e.g., technicians) to receive output (e.g., view graphical representations of an oral insert model on a display device) related to operation of the computing device (250). Model data and/or oral anatomy data may be received by user interface (272) and output visually, audibly, and/or through haptic feedback through one or more output devices. As another example, user control of an input device (e.g., joystick, keyboard, touch screen) may be received by user interface (272) and then processed by processor (262) and memory (264) for user interface (272) to output a control signal to one or more components of the computing device (250). In some embodiments, the user interface (272) may function as both an input and output device (e.g., a handheld controller configured to generate a control signal while also providing haptic feedback to a user).

Some embodiments of an input device of a user interface (272) may comprise at least one switch configured to generate a control signal. In some embodiments, the input device may comprise a wired and/or wireless transmitter configured to transmit a control signal to a wired and/or wireless receiver of a controller (260). For example, an input device may comprise a touch surface for a user to provide input (e.g., finger contact to the touch surface) corresponding to a control signal. An input device comprising a touch surface may be configured to detect contact and movement on the touch surface using any of a plurality of touch sensitivity technologies including capacitive, resistive, infrared, optical imaging, dispersive signal, acoustic pulse recognition, and surface acoustic wave technologies. In embodiments of an input device comprising at least one switch, a switch may comprise, for example, at least one of a button (e.g., hard key, soft key), touch surface, keyboard, analog stick (e.g., joystick), directional pad, pointing device (e.g., mouse), trackball, jog dial, step switch, rocker switch, pointer device (e.g., stylus), motion sensor, image sensor, and microphone. A motion sensor may receive user movement data from an optical sensor and classify a user gesture as a control signal. A microphone may receive audio and recognize a user voice as a control signal.
Output Device An output device (270) may comprise one or more of a display device, audio device, and haptic device. The display device may be configured to display a graphical user interface (GUI). The output data may also be encrypted to ensure privacy and all or portions of the output data may be saved to a server. A display device may permit a user to view oral insert model data, anatomy data, visualization data, conflict data, hydraulic data, system data, user data, and/or other data processed by the controller (260). In some embodiments, an output device may comprise a display device including at least one of a light emitting diode (LED), liquid crystal display (LCD), electroluminescent display (ELD), plasma display panel (PDP), thin film transistor (TFT), organic light emitting diodes (OLED), electronic paper/e-ink display, laser display, holographic display, combinations thereof, and the like.

An audio device may audibly output user data, oral insert model data, conflict data, system data, alarms and/or warnings. For example, the audio device may output an audible warning when structural conflicts in an oral insert model are identified. In some embodiments, an audio device may comprise at least one of a speaker, piezoelectric audio device, magnetostrictive speaker, and/or digital speaker. In some embodiments, a user may communicate with other users using the audio device and a communication channel.

A haptic device may be incorporated into one or more of the input and output devices to provide additional sensory output (e.g., force feedback) to the user. For example, a haptic device may generate a tactile response (e.g., vibration) to confirm user input to an input device (e.g., joystick, keyboard, touch surface). In some embodiments, the haptic device may include a vibrational motor configured to provide haptic tactile feedback to a user. Haptic feedback may in some embodiments confirm initiation and completion of input commands. Additionally or alternatively, haptic feedback may notify a user of an error such as structural conflict.
Network Interface The network interface (274) may permit a user to interact with and/or control the computing device (250) directly and/or remotely. In some embodiments, a network interface (332) may permit the computing device (250) to communicate with one or more of a network (286) (e.g., Internet), remote server (282), and database (280) as described in more detail herein.

As depicted in FIG. 2B, a computing system (250) described herein may communicate with one or more networks (276) and computer systems (250) through a network interface (274). In some embodiments, the computing system (250) may be in communication with other devices via one or more wired and/or wireless networks. The network interface (274) may facilitate communication with other devices over one or more external ports (e.g., Universal Serial Bus (USB), multi-pin connector) configured to couple directly to other devices or indirectly over a network (e.g., the Internet, wireless LAN).

In some embodiments, the network interface (274) may comprise a radiofrequency receiver, transmitter, and/or optical (e.g., infrared) receiver and transmitter configured to communicate with one or more devices and/or networks. The network interface (274) may communicate by wires and/or wirelessly with one or more of the sensors, user interface (272), network (286), database (280), and server (282).

In some embodiments, the network interface (274) may comprise radiofrequency (RF) circuitry (e.g., RF transceiver) including one or more of a receiver, transmitter, and/or optical (e.g., infrared) receiver and transmitter configured to communicate with one or more devices and/or networks. RF circuitry may receive and transmit RF signals (e.g., electromagnetic signals). The RF circuitry converts electrical signals to/from electromagnetic signals and communicates with communications networks and other communications devices via the electromagnetic signals. The RF circuitry may include one or more of an antenna system, an RF transceiver, one or more amplifiers, a tuner, one or more oscillators, a digital signal processor, a CODEC chipset, a subscriber identity module (SIM) card, memory, and the like. A wireless network may refer to any type of digital network that is not connected by cables of any kind.

Examples of wireless communication in a wireless network include, but are not limited to cellular, radio, satellite, and microwave communication. The wireless communication may use any of a plurality of communications standards, protocols and technologies, including but not limited to 5G, Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, near-field communication (NFC), radio-frequency identification (RFID), Wireless Fidelity (Wi-Fi) (e.g., IEEE 802.11a, IEEE 802.11b, IEEE 802.11g, IEEE 802.11n), Voice over Internet Protocol (VoIP), Wi-MAX, a protocol for email (e.g., Internet Message Access Protocol (IMAP), Post Office Protocol (POP)), instant messaging (e.g., eXtensible Messaging and Presence Protocol (XMPP), Session Initiation Protocol for Instant Messaging, Presence Leveraging Extensions (SIMPLE), Instant Messaging and Presence Service (IMPS)), Short Message Service (SMS), or any other suitable communication protocol. Some wireless network deployments combine networks from multiple cellular networks or use a mix of cellular, Wi-Fi, and satellite communication.

In some embodiments, a wireless network may connect to a wired network in order to interface with the Internet, other carrier voice and data networks, business networks, and personal networks. A wired network is typically carried over copper twisted pair, coaxial cable, and/or fiber optic cables. There are many different types of wired networks including wide area networks (WAN), metropolitan area networks (MAN), local area networks (LAN), Internet area networks (IAN), campus area networks (CAN), global area networks (GAN), like the Internet, and virtual private networks (VPN). As used herein, network refers to any combination of wireless, wired, public, and private data networks that are typically interconnected through the Internet, to provide a unified networking and information access system.

Oral Insert

The oral care devices (e.g., oral inserts) described herein may be configured to output fluid in a predetermined manner unique to a user's oral anatomy, and may comprise an arrangement of fluid openings and associated fluid structures such as a manifold, fluid nozzles, fluid inlet port, fluid outlet port, and the like. The oral care device may be configured to be held in the mouth of a user during application of fluid flow. By tailoring the oral insert to the unique oral anatomy of each user, one or more of cleaning efficiency, user comfort, and compliance may be increased.

Figure 3A:
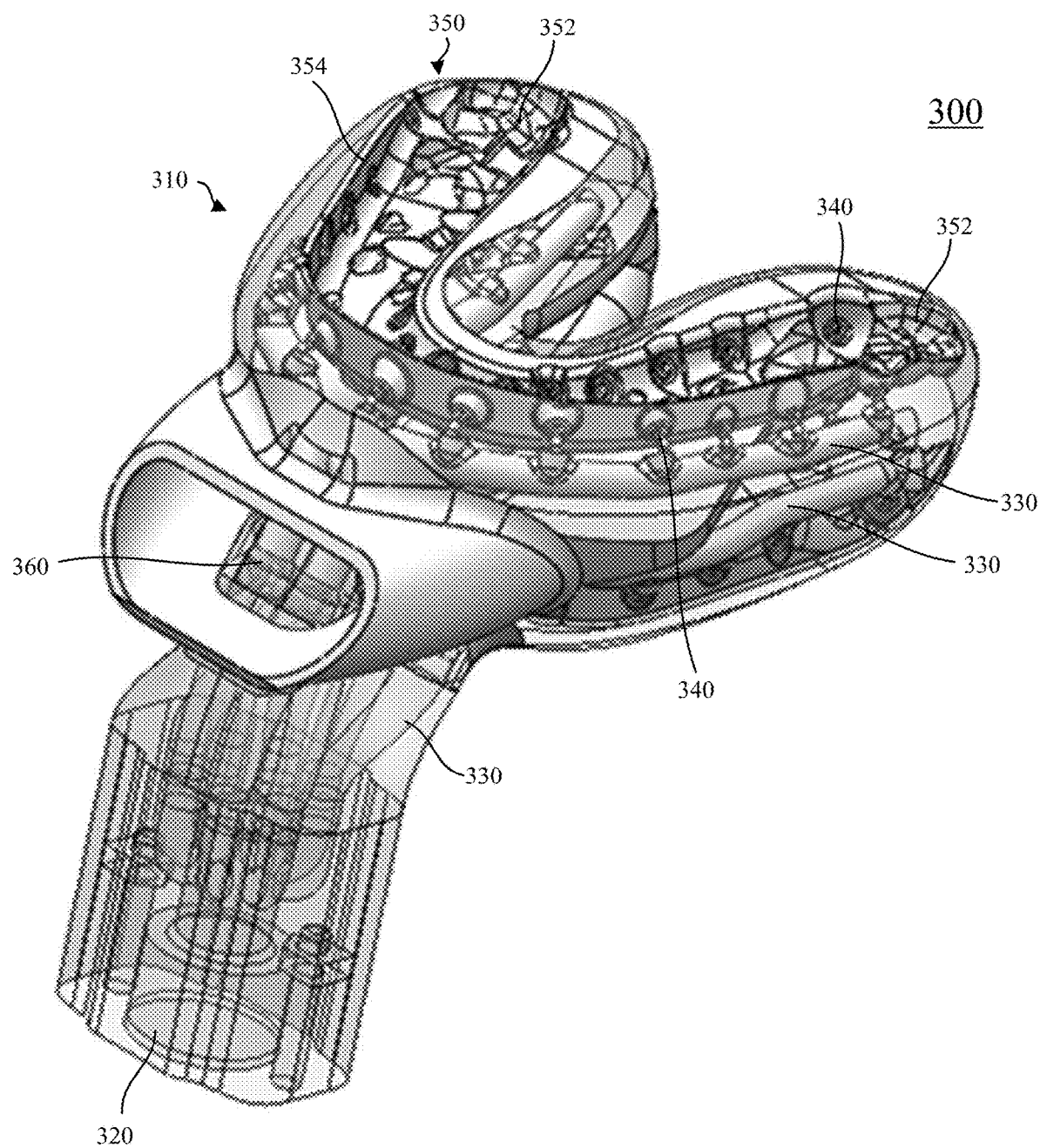
FIG. 3A depicts a perspective view of one variation of an oral insert.

FIG. 3A depicts a perspective view of an oral insert (300). In some variations, an oral insert (300) may comprise an enclosure (310) defining an outer surface of the insert (300), a fluid inlet port (320), a set of manifolds (330), a set of fluid nozzles (340), a tray (350) (e.g., tray surface), and a fluid outlet port (e.g., effluence port (360)). In some variations, the oral insert (300) may not be symmetrical based on a user's oral anatomy. In some variations, the fluid inlet port (320) may be configured to receive fluid from a fluid source. For example, the fluid inlet port (320) may be configured to releasably couple to a handle (230) coupled to a fluid reservoir (240) such as described with respect to FIG. 2A. The oral insert (300) may be configured to receive fluid through the fluid inlet port (320). The fluid inlet port (320) may comprise a lumen in fluid communication with the set of manifolds (330). In some variations, a manifold switch and/or fluid switcher assembly (not shown) may be releasably attached to the fluid inlet port (320) and configured to selectively route fluid through one or more of the manifolds (330). In some variations, a diameter of the fluid inlet port (320) may be larger than a diameter of a manifold (330). As shown in FIGS. 3E, 3F, and 3G, the oral insert (300) may comprise one or more fluid outlet ports (360) configured to permit fluid egress from a user's mouth.

In some variations, one or more manifolds (330) may be configured as fluid conduits between the fluid inlet port (320) and the fluid nozzles (340). In some variations, the set of manifolds (330) may comprise between about 1 manifold and about 16 manifolds, including all values and sub-ranges in-between. For example, the set of manifolds (330) may comprise between about 4 manifolds and about 8 manifolds. In some variations, each fluid nozzle of the set of fluid nozzles (340) may be in fluid communication with a manifold of the set of manifolds (330). In some variations, the manifolds (330) may be configured to permit a predetermined range of hydraulic pressures to the fluid nozzles (340) coupled therewith. As shown in FIGS. 3D and 3E, a first set of manifolds (340) may be directed to the upper teeth and a second set of manifolds (340) may be directed to the lower teeth. As described in more detail herewith, manifold (330) may comprise one or more of a trunk, branch, and port each configured to control hydraulic pressure to a fluid nozzle.

In some variations, the fluid nozzles (340) may be configured to direct fluid toward predetermined oral anatomy such as teeth. In some variations, the set of fluid nozzles (340) may comprise between about 1 fluid nozzle and about 64 fluid nozzles, including all values and sub-ranges in-between. For example, the set of fluid nozzles (340) may comprise between about 16 manifolds and about 36 fluid nozzles. In some variations, the fluid nozzles (330) may be configured to provide a predetermined range of hydraulic pressures at an output of a respective fluid nozzle (330). In some variations, one or more fluid nozzles (330) may be directed at one or more teeth or oral anatomy structures. While the fluid nozzles are described herein in the context of fluid ingress (e.g., introducing fluid into the oral cavity), it should be understood that one or more of the fluid nozzles may be used for fluid egress (e.g., channeling fluid out of the oral cavity), as may be desirable.

In some variations, the enclosure (310) may comprise a tray (350) configured to retain teeth (e.g., upper teeth, lower teeth). In some variations, the tray (350) may be configured such that at least a portion of the tray (350) corresponds to a shape of the user's teeth. That is, the tray (350) may comprise one or more of a channel, trough, groove, and slot.

Figure 3B:
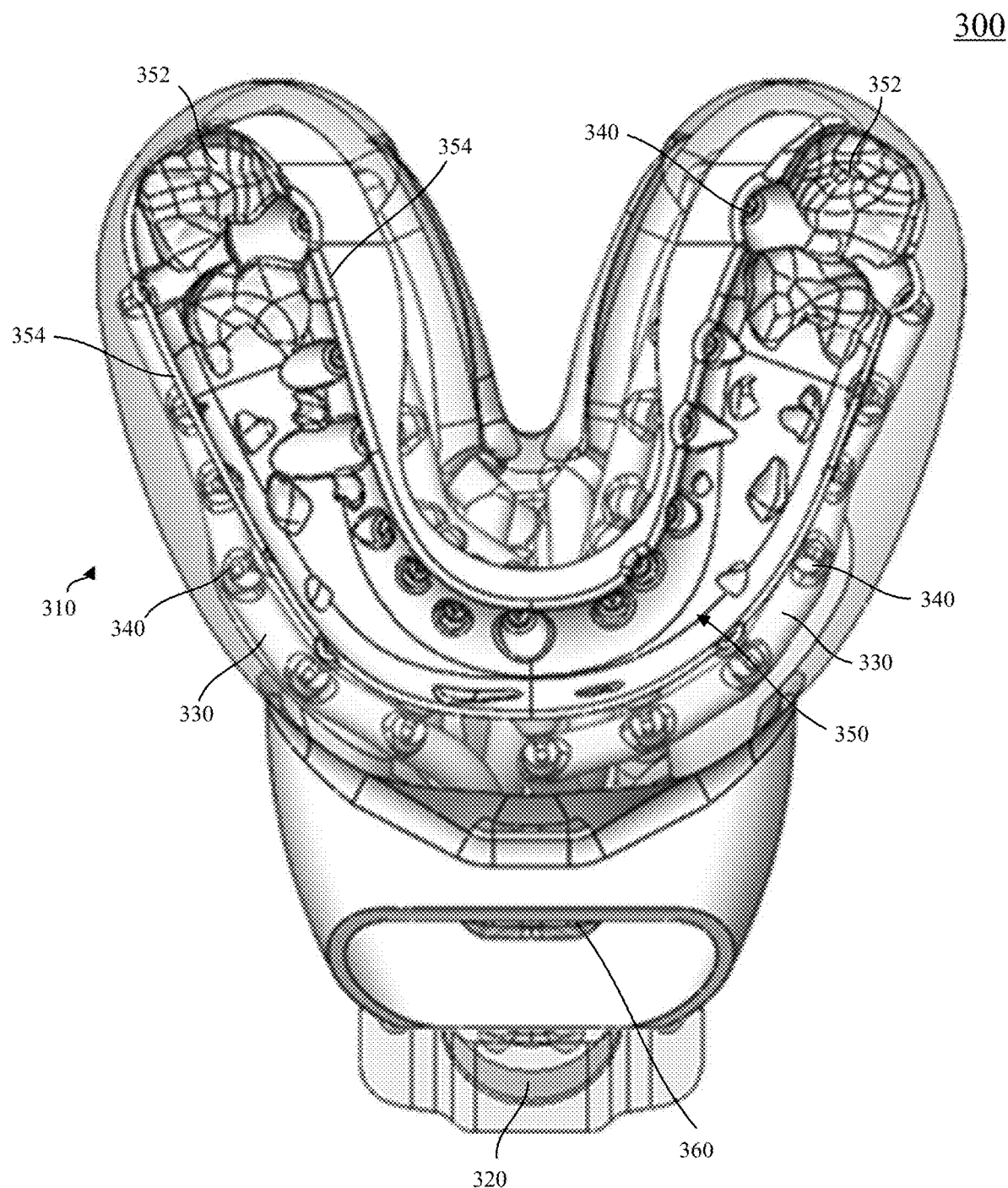
FIG. 3B depicts a top view of one variation of an oral insert.
Figure 3C:
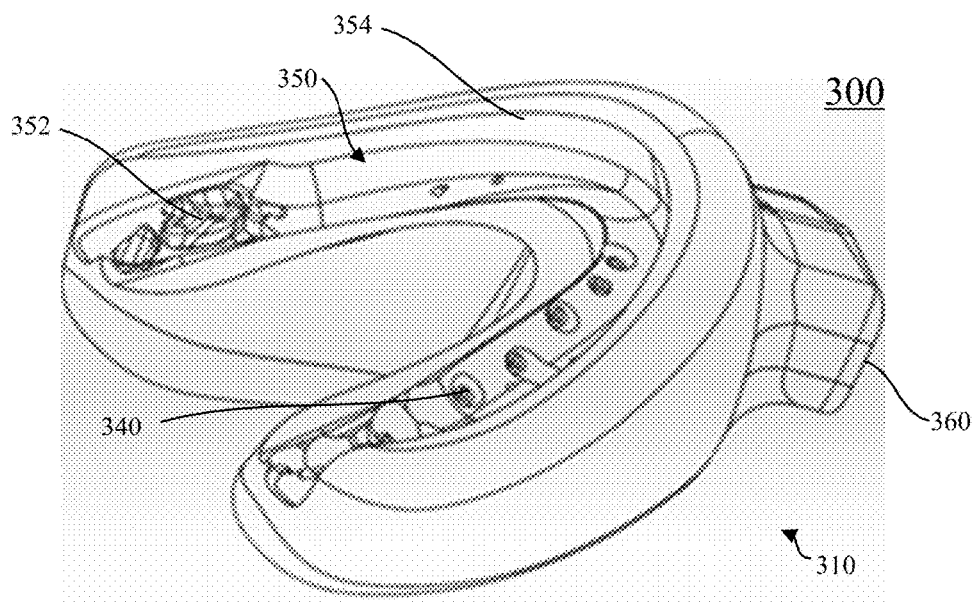
FIG. 3C depicts another perspective view of one variation of an oral insert.
Figure 3D:
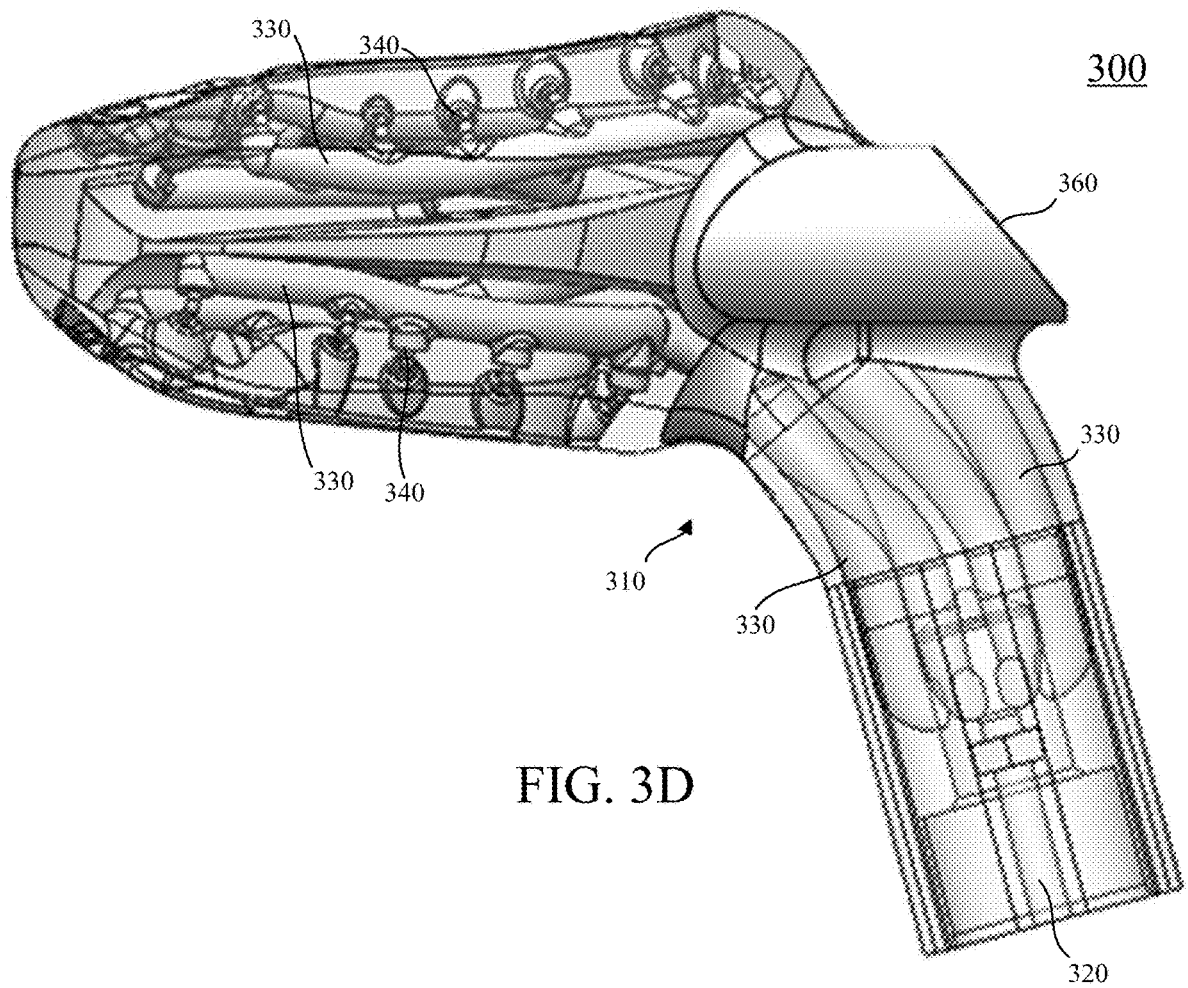
FIG. 3D depicts a side view of one variation of an oral insert.
Figure 3E:
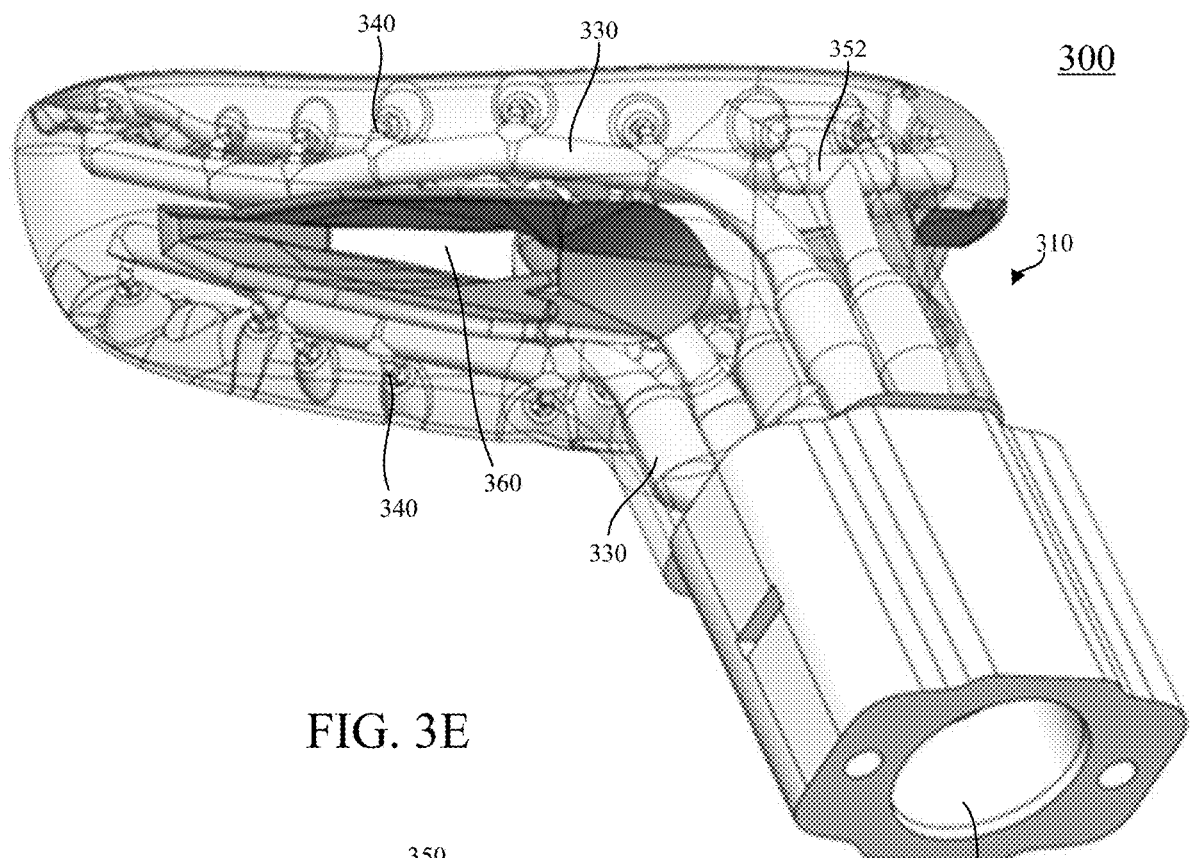
FIG. 3E depicts yet another perspective view of one variation of an oral insert.
Figure 3F:
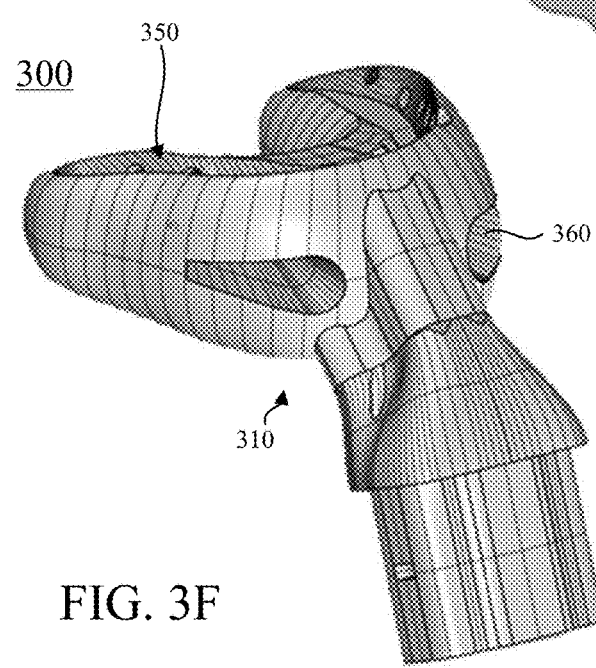
FIG. 3F depicts another perspective view of one variation of an oral insert.
Figure 3G:
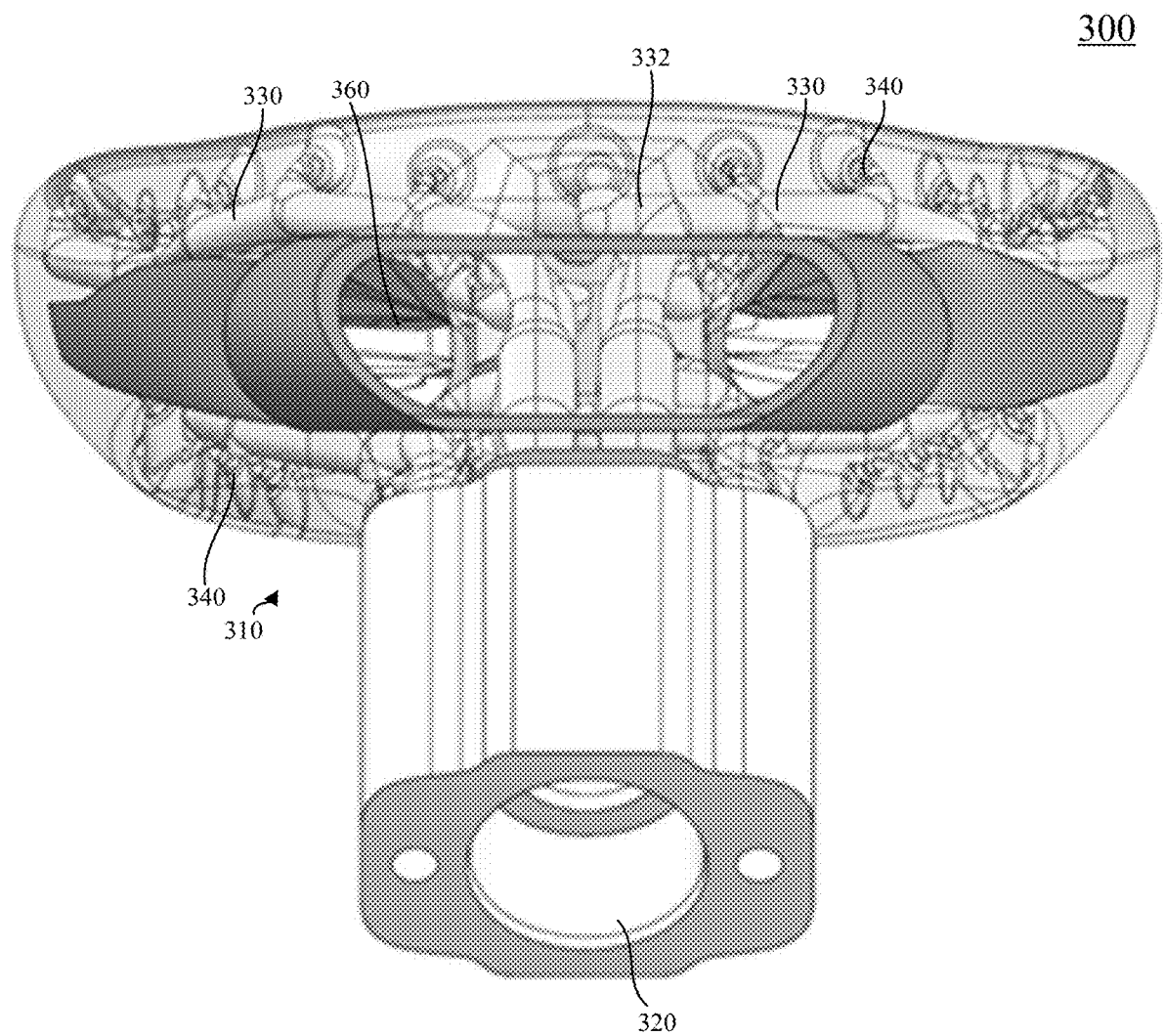
FIG. 3G depicts another view of one variation of an oral insert.

For example, as shown in FIGS. 3B and 3C, a posterior portion of the tray (350) may be contoured (352) to a shape of a user's posterior teeth while an anterior portion of the tray (350) may be configured to retain the anterior teeth without having a contoured shape. In some variations, the tray (350) may define a bottom wall and one or more sidewalls (354) configured to face one of the facial and buccal sides of the teeth (not shown for the sake of clarity). In some variations, the oral insert (300) may comprise one or more of an upper tray configured to retain upper teeth and a lower tray configured to retain lower teeth. As used herein, a cavity of the oral insert (300) may refer to the space above the surface of the enclosure (310) between opposite sidewalls (354). In some variations, the tray (350) may define one or more surfaces of the fluid nozzles (340). For example, one or more fluid nozzles (340) may be recessed relative to other surfaces of the tray (350). Additionally or alternatively, one or more fluid nozzles (340) may protrude relative to other surfaces of the tray (350).

In some variations, an oral insert may comprise one or more alignment features (e.g., keying feature) (352) to help facilitate correct and consistent placement and alignment of the oral insert within the mouth. In some variations, one or more alignment features (352) may be located within the tray (350) to help seat the teeth within the tray (350). For example, an alignment feature (350) may comprise protrusions, slots, or recesses that receive and/or articulate with the user's teeth, gums, hard palate, soft palate, other oral structures, and/or may have contours that correspond to one or more teeth. These alignment features (350) may help to ensure that the oral insert is seated in a desired position in the user's mouth. In some variations, the side walls and bottom wall may have smoothed surfaces and/or contours that may or may not correspond with the anatomical contours of the one or more teeth.

In some variations, the tray (350) may comprise a shape based on optical and/or digital oral anatomy data obtained using intraoral scanners or photographs (e.g., 3-D intraoral scans, 3-D scans of a dental impression), photographs, X-rays, physical impressions, intraoral and extraoral radiographs, computed tomography, including cone beam computed tomography, magnetic resonance imaging, ultrasound, combinations thereof, and the like.

While some oral inserts may comprise a single tray (e.g., trough) to fit over either the maxillary teeth or the mandibular teeth, in other variations, an oral insert may comprise two opposing trays where one tray accommodates the maxillary teeth and the other tray accommodates the mandibular teeth (e.g., so that both upper (maxillary) and lower (mandibular) teeth may be irrigated simultaneously or in series with a single oral insert). A first set of fluid nozzles may be enclosed within a first tray to provide fluid flow to the mandibular teeth and a second set of fluid nozzles may be enclosed within a second tray to provide fluid flow to the maxillary teeth.

The oral inserts (300) described herein may also accommodate changes in dental geometry. For example, a user may have a broken or missing tooth, and/or may have new teeth or restorations. Some variations of an oral insert (300) may include one or more barriers (not shown) that may have a geometry that corresponds to the surface contours of one or more of the user's teeth. The barriers may be releasably coupled into the space of the tray (350) that corresponds to the missing or broken tooth, and may extend from the oral insert (300) up to the gingival margin (e.g., a few millimeters over the gingival margin). The barriers may help prevent fluid jets intended for the missing or broken tooth from intersecting the space where the tooth was previously located. The barriers may also be used to shield especially sensitive teeth or gums (e.g., due to tooth decay, retained roots, partially erupted teeth, and/or after a dental procedure) from fluid jets, as may be desirable for user comfort.

Figure 4A:
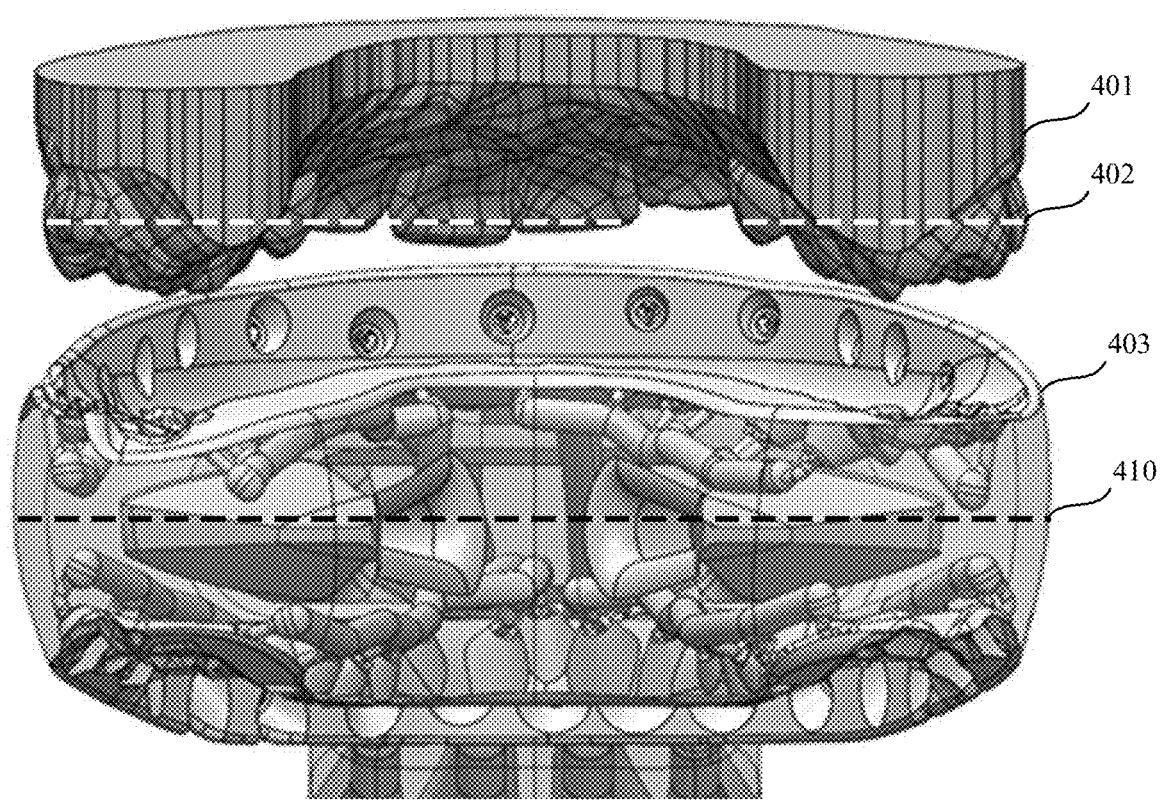
FIGS. 4A-4F are schematic depictions of oral anatomy and oral insert geometry.

FIGS. 4A-4F are schematic depictions of oral anatomy and oral insert geometry characterizing the oral insert. FIG. 4A depicts a jaw (401) comprising a mandibular arch width (402). The oral insert (403) may comprise an overall width (410) defining the widest portion of the insert (403). In some variations, the overall width (410) may be based on a maxillary arch width (not shown) and/or mandibular arch width (402). For example, the overall width (410) may be larger by a predetermined value (e.g., offset) than one of the maxillary arch width and the mandibular arch width (e.g., whichever is larger). The overall width (410) of the oral insert (403) may affect one or more of the jaw opening during insertion, lip deflection, and lip curling.

Figure 4B:
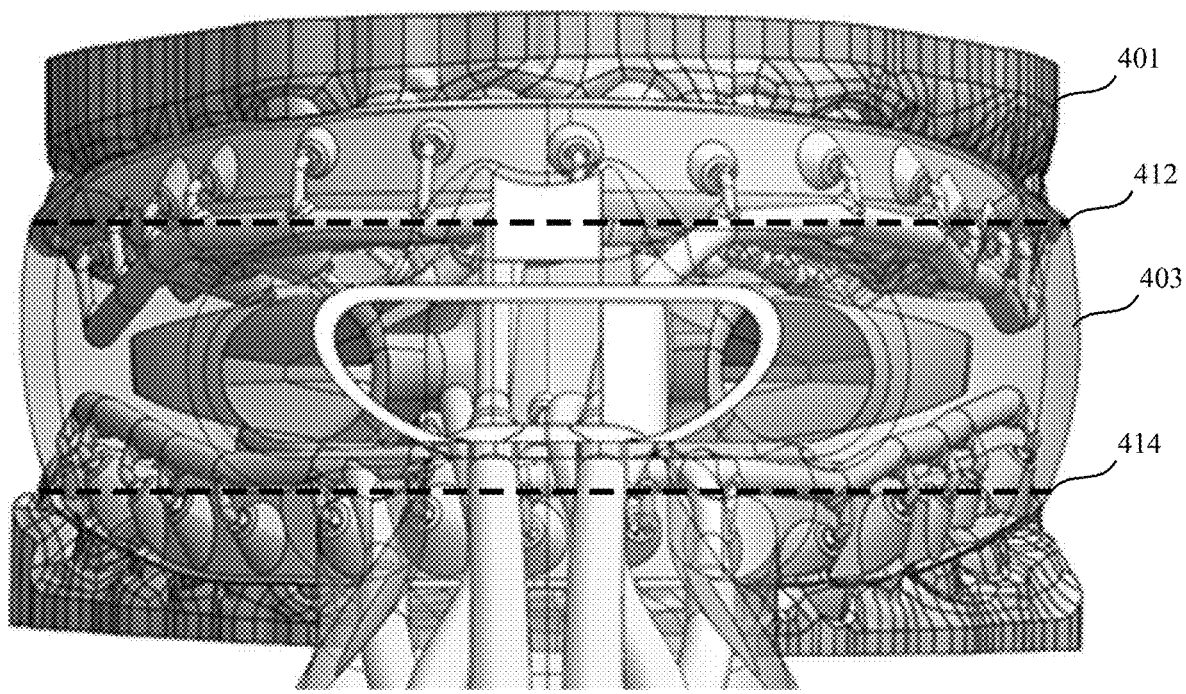

FIG. 4B depicts a maxillary mid-buccal width (412) and a mandibular mid-buccal width (414) of the oral insert (403). In some variations, the mid-buccal width (412) may define the widest portion of the mid-buccal plane of the posterior most teeth. In some variations, the mid-buccal widths (412, 413) may be based on a respective maxillary arch width (not shown) or mandibular arch width (402). For example, the mid-buccal widths (412, 413) may be larger by a predetermined range of mid-buccal values than a respective maxillary arch width or mandibular arch width. The mid-buccal width (412, 413) of the oral insert (403) may provide bulk at the tightest part of the cheeks (e.g., around the maxillary and mandibular attachments of the buccinators muscle), which may be uncomfortable at the tightest part of the cheeks if the mid-buccal width is to large.

Figure 4C:
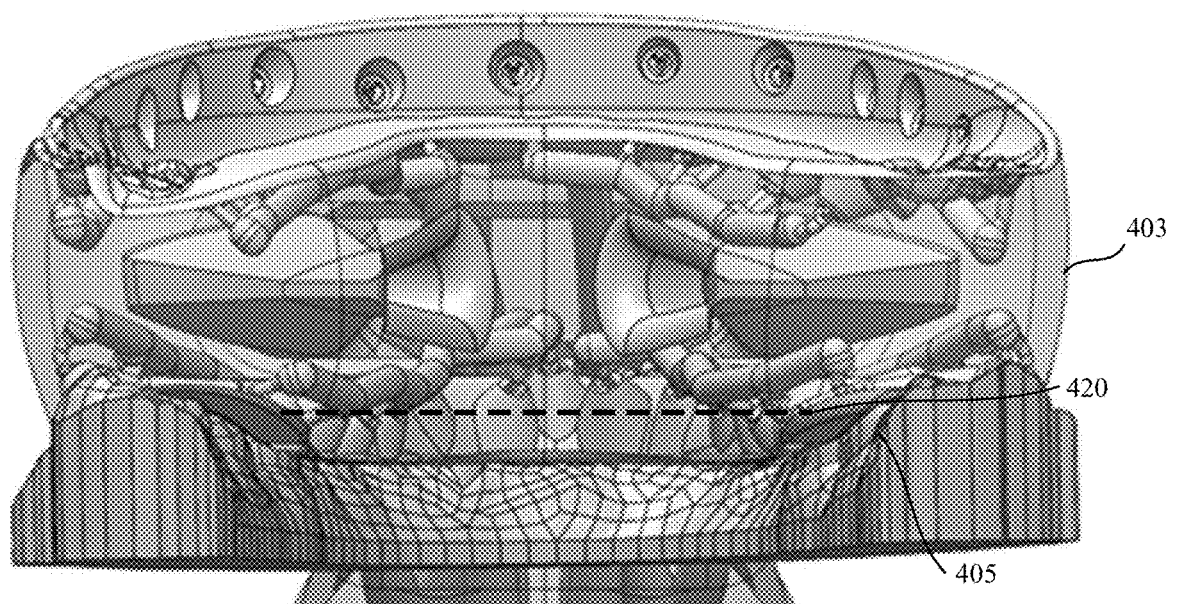

FIG. 4C depicts a lingual width (420) of the oral insert (403). In some variations, the lingual width (420) may define the width between a lingual surface of the posterior most mandibular molars and an inner portion of the oral insert (403). For example, the lingual width (420) may be larger by a predetermined range of values than the lingual-to-lingual last molar arch width. The lingual width (420) of the oral insert (403) may affect one or more of tongue clearance and a gag reflex.

Figure 4D:
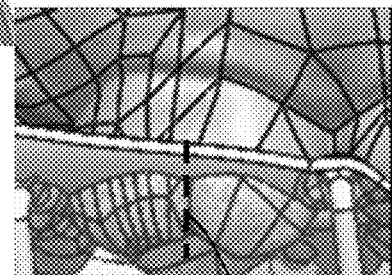
Figure 4D:
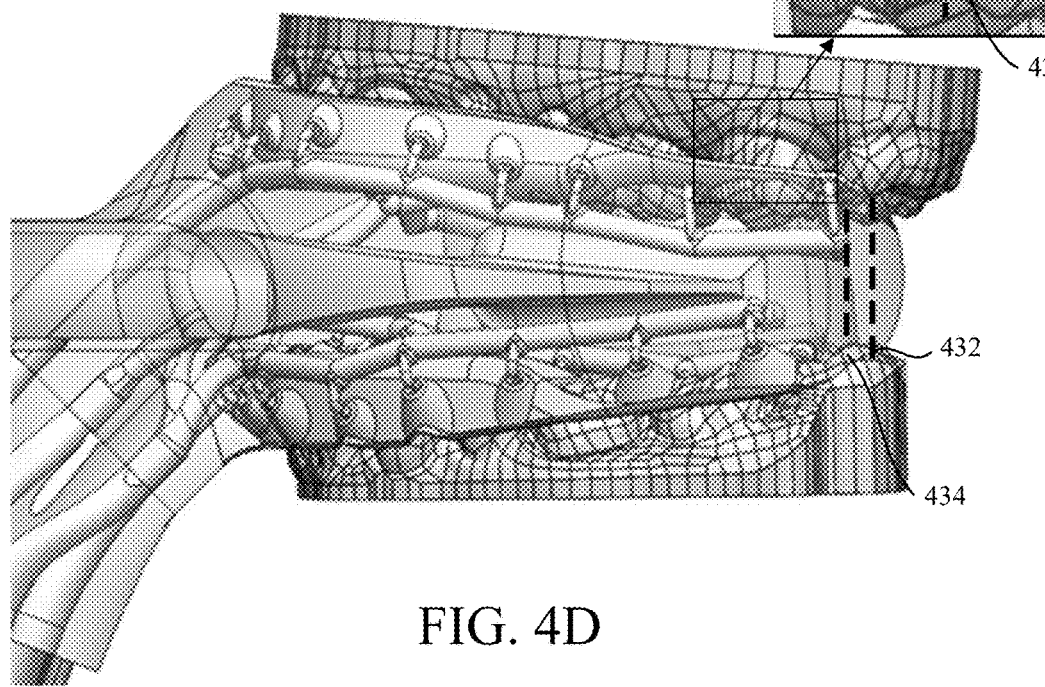

FIG. 4D depicts a posterior height (432) of the oral insert (403). In some variations, the posterior height (432) may define the longest distance (e.g., vertical distance) of the posterior portion of the oral insert (403). For example, the posterior height (432) may be larger by a predetermined value than a minimum distance between posterior molar cusps (434). The posterior height (432) may correspond to the largest jaw opening required for insertion of the oral insert. The posterior height (432) of the oral insert (403) may affect jaw opening during insertion of the oral insert (403). The posterior cavity height (430) of the oral insert (403) may define the largest vertical distance between the ultimate or penultimate molar buccal cusps and mid-buccal cavity wall. The posterior cavity height (430) of the oral insert (403) may provide bulk at the cheeks and affect jaw opening during insertion and pinching of oral tissue.

Figure 4E:
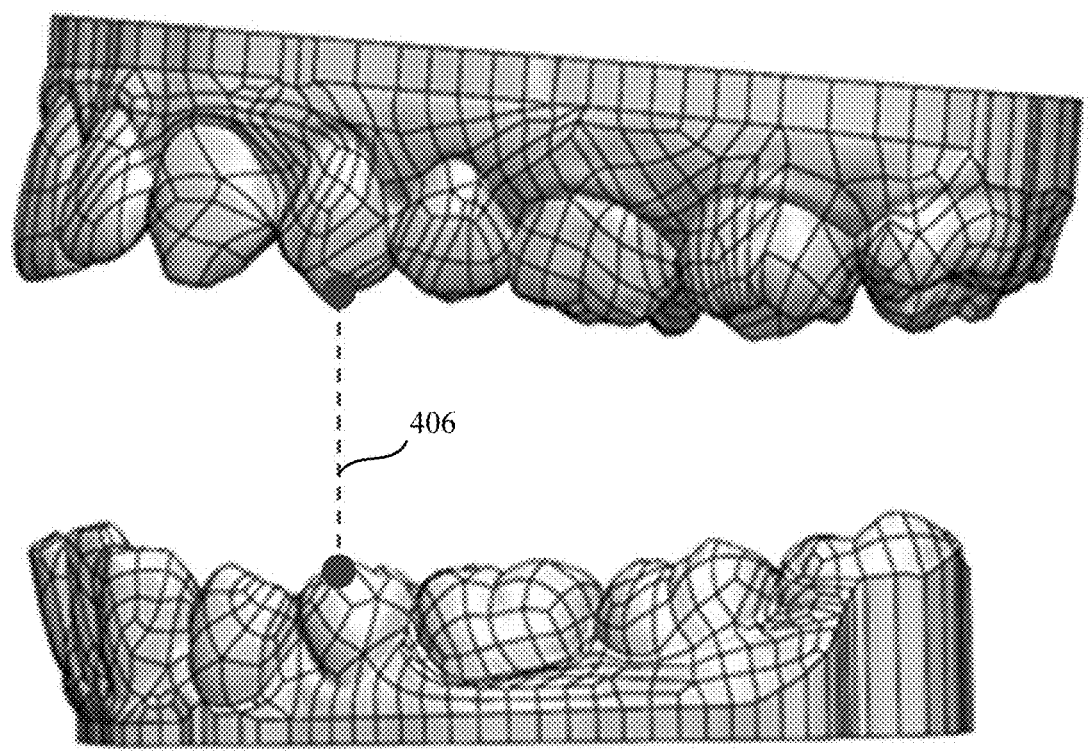
Figure 4F:
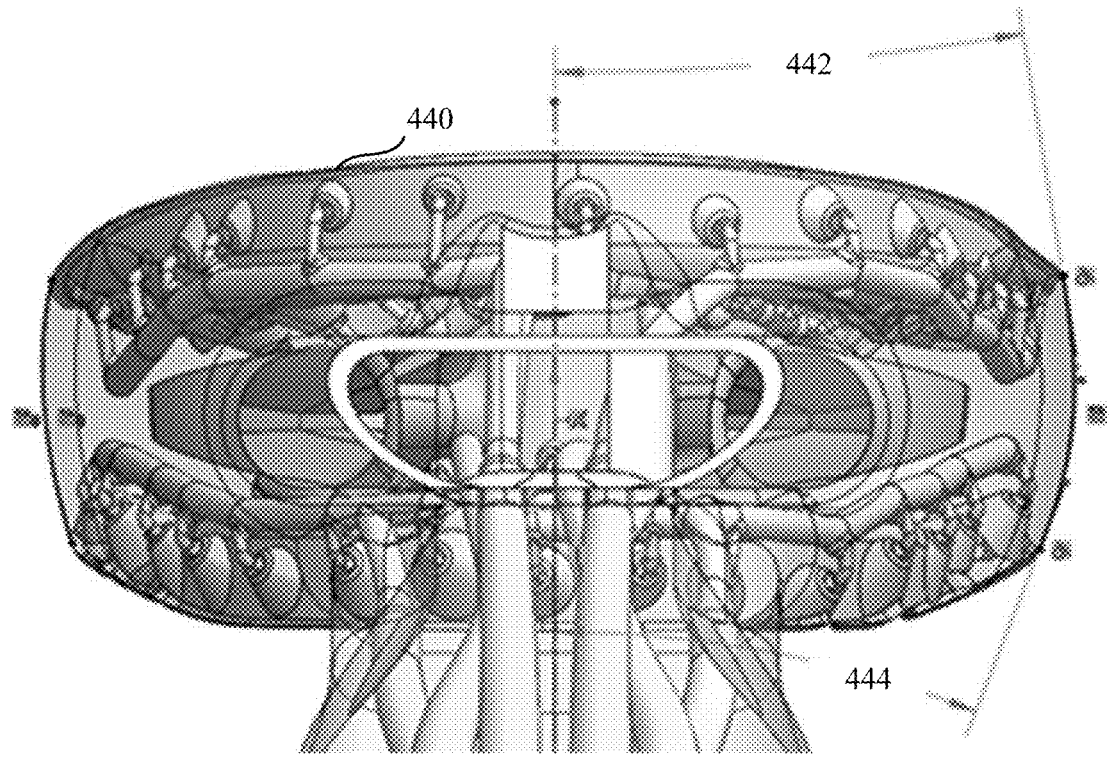

FIG. 4E depicts a premolar gap (e.g., shim gap) (406). In some variations, the premolar gap (406) may define the smallest vertical cusp-to-cusp distance between the premolars in the resting position. The premolar gap (406) may be one of the factors that defines the resting jaw position of the patient. FIG. 4F depicts curvature angles (442, 444) and a minimum radius (440) of the oral insert (403). The curvature angles (442, 444) may define angles of tangency at a respective maxillary and mandibular interface of the oral insert (403). The curvature angles (442, 444) may affect one or more of lip deflection, lip curling, and pinching of oral tissue. The minimum radius (440) may define a minimum radius of any exposed edge of the oral insert (403) and may affect abrasion and pinching of oral tissue.

II. Methods

Generally, the methods described may generate a personalized oral care device model configured to clean teeth and disrupt biofilms. The methods may comprise generating a set of hydraulic structures such as fluid nozzles and manifolds personalized to a patient's oral anatomy. The oral care device model may be further optimized to avoid structural conflicts, aid manufacturing, improve one or more of hydraulic efficiency, cleaning efficiency, user comfort, and other criteria and/or constraints. For example, errors and/or inefficiencies (e.g., geometric conflicts, hydraulic inefficiencies) of one or more structures may be identified and then those structures may be modified to optimize the oral care device model.

Generating an Oral Insert Model

Figure 5:
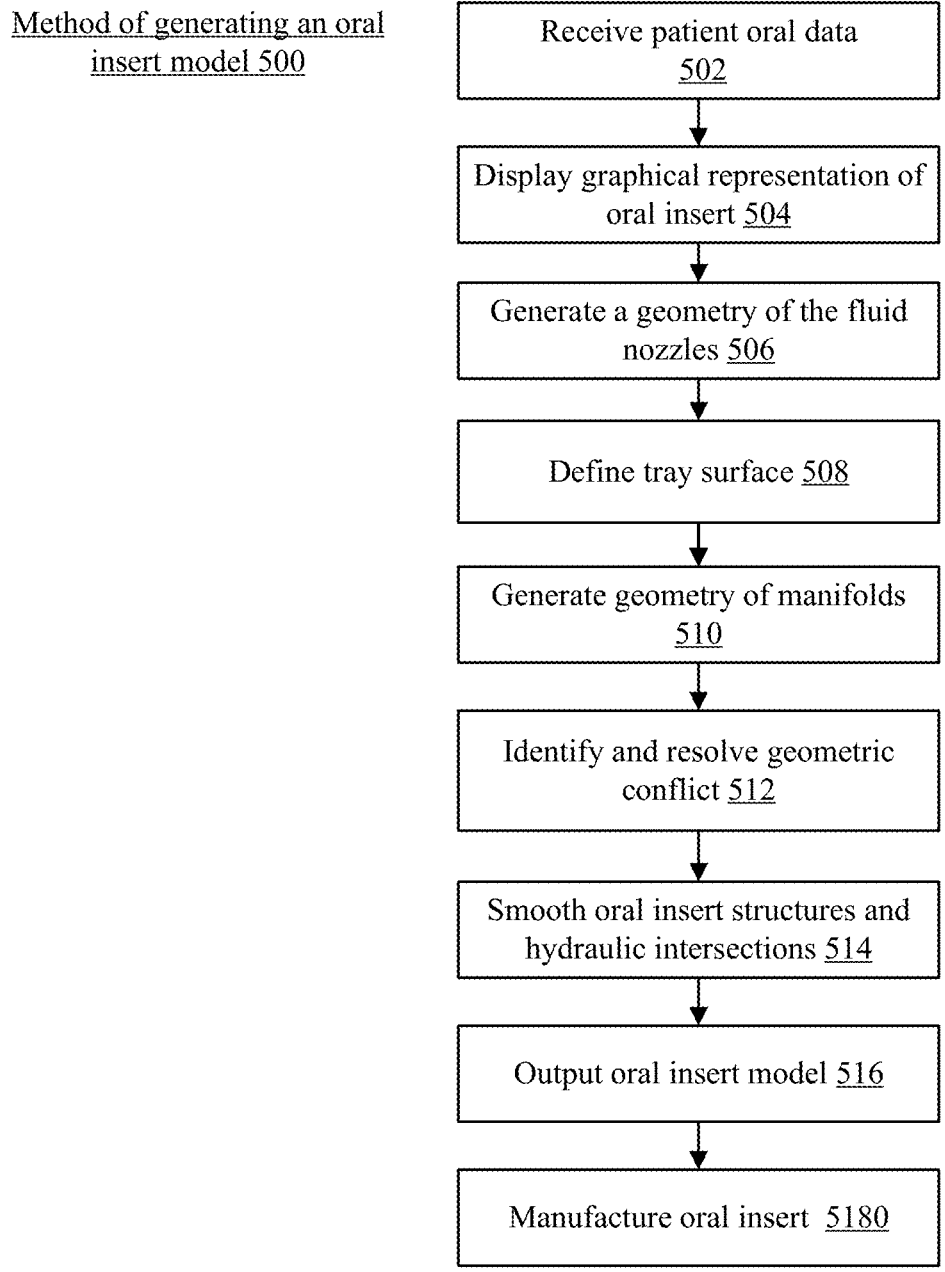
FIG. 5 depicts a flowchart representation of one method of generating an oral insert.

FIG. 5 depicts a flowchart representation of one method of generating a model of an oral insert that may comprise one or more of a fluid inlet port, fluid nozzles, manifolds, and a tray configured to retain teeth. As depicted in FIG. 5, method (500) may comprise receiving (502) patient oral data such as oral scan data of one or more jaws of a patient. In some variations, the oral scan data may comprise one or more of digital scan data (e.g., 3-D intraoral scans, 3-D scans of a dental impression), optical anatomy data (e.g., photographs, X-rays, intraoral and extraoral radiographs), physical impressions, computed tomography (e.g., cone beam computed tomography, magnetic resonance imaging, ultrasound), combinations thereof, and the like. In some variations, the patient oral data may be processed to combine a plurality of oral scan data modalities. For example, separate arch and bite scans may be aligned to each other based on user data to allow further processing such as the generation of patient oral geometry.

Figure 6:
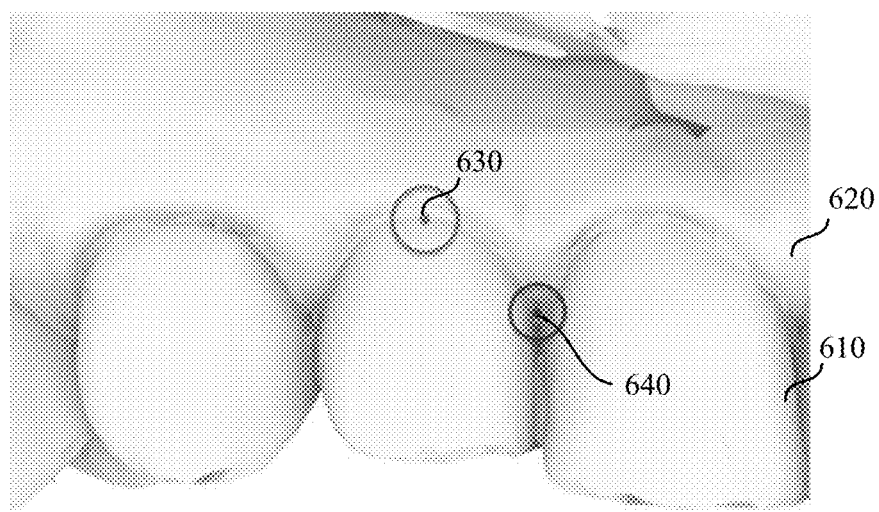
FIG. 6 is a schematic side view of identified patient oral geometry.
Figure 7A:
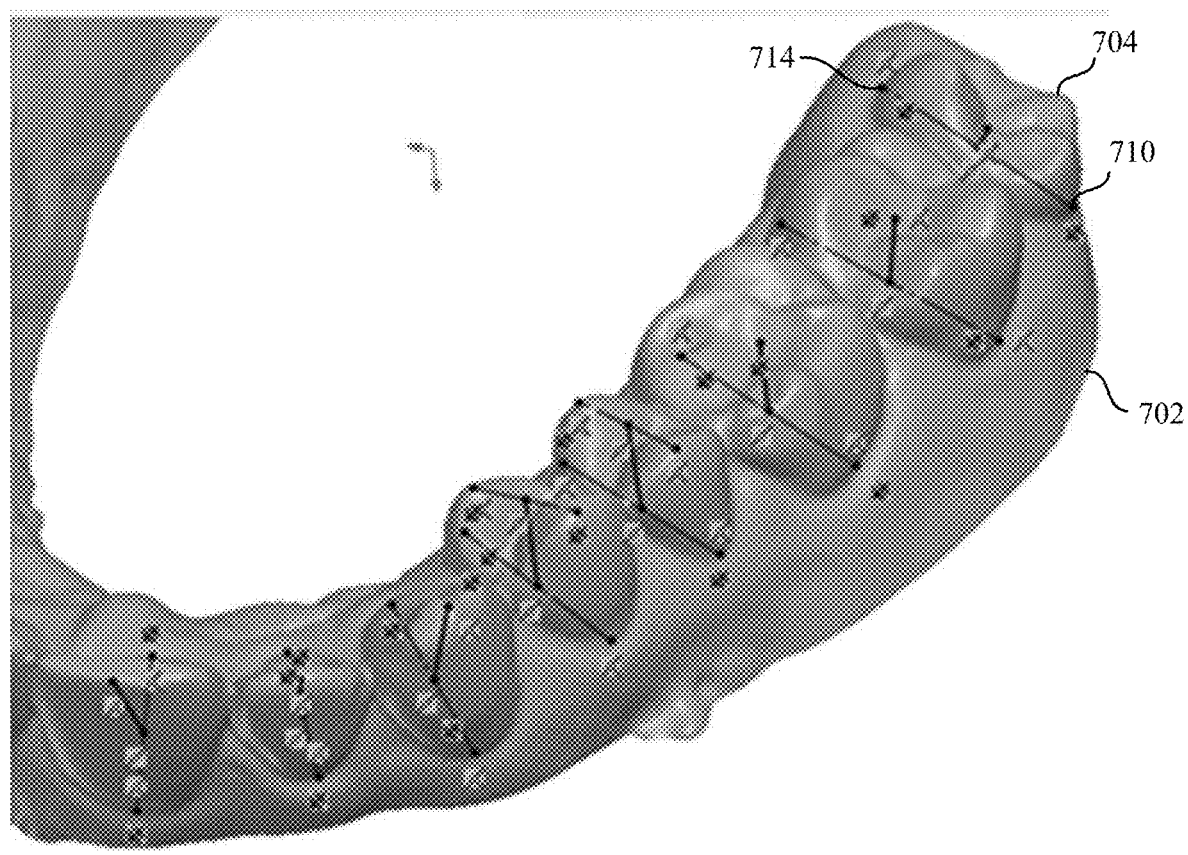
FIGS. 7A and 7B are schematic perspective views of identified patient oral geometry.
Figure 7B:
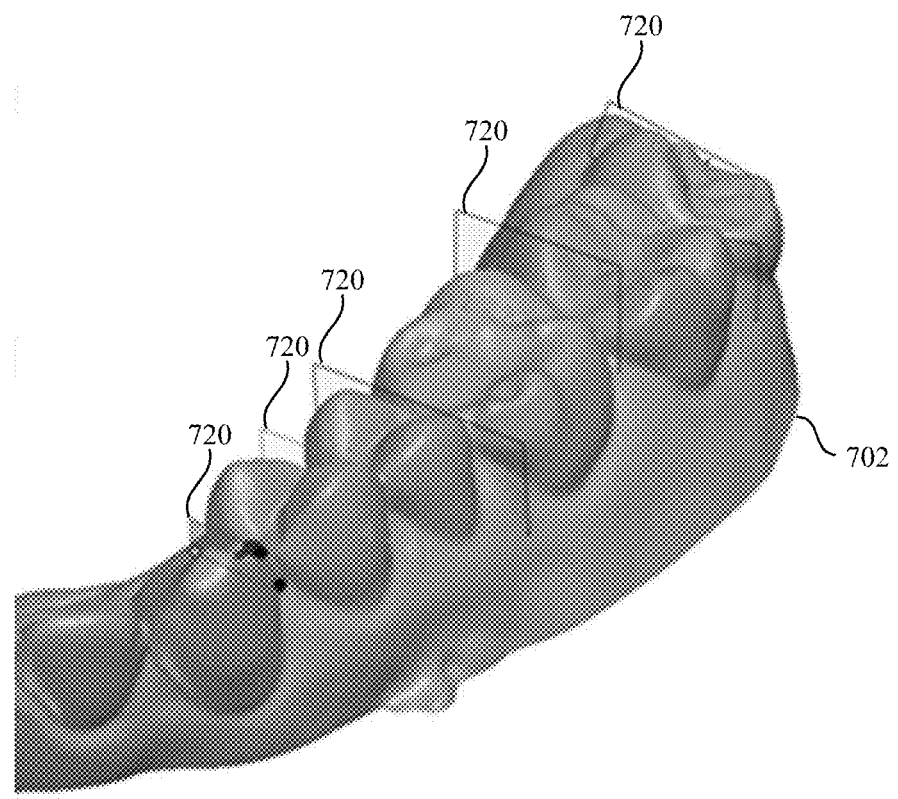
Figure 7C:
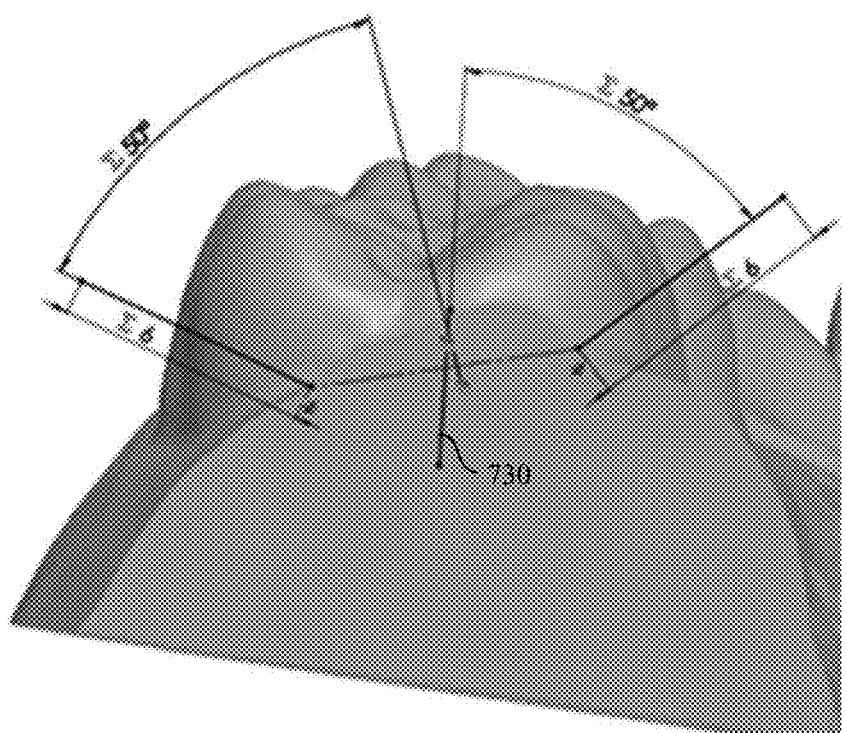
FIG. 7C is a schematic cross-sectional side view of identified patient oral geometry.

The method may further comprise generating a geometry of the oral scan data (e.g., patient oral geometry). In some variations, patient oral geometry may comprise reference interproximal geometry and teeth geometry (e.g., gingival margins, interdental gingiva, interproximal regions, incisal edges, and contours of the occlusal, facial, lingual, mesial and distal surfaces of the teeth, etc.). The patient oral geometry may be identified based on the patient oral data received in step 502. For example, FIG. 6 is a schematic side view of identified patient oral geometry of, for example, the teeth (610) and gingiva (620). The patient oral geometry may comprise a mid-gingival point (630) and interproximal point (640) of one or more of the lingual and facial sides of the teeth. FIGS. 7A and 7B are schematic perspective views of identified patient oral geometry comprising a facial mid-gingival point (710) and lingual mid-gingival point (714) of the gingiva (702) and teeth (704). FIG. 7B depicts a set of interproximal planes (720) and FIG. 7C is a schematic cross-sectional side view of identified patient oral geometry comprising a longitudinal axis (730). In some variations, an interproximal plane (720) between adjacent teeth may be defined based on the facial and lingual points and interproximal points between occlusal surfaces and incisal edges.

The method (500) may further comprise displaying (504) a graphical representation of the model of the oral insert. In some variations, an enclosure of the oral insert may be generated based on patient oral geometry such as the interproximal geometry and teeth geometry and predetermined criteria. In some variations, the oral insert model may be displayed as a three-dimensional graphical representation with or without corresponding oral anatomy. A user interface may be configured to control a view of the oral insert model (e.g., location, orientation, perspective, transparency, lighting, etc.) and set of features of the oral insert to display. FIGS. 3A-3G, 4A-4F, 11, 14, and 15 are examples of graphical representations of one or more portions of an oral insert. In some variations, exterior surfaces of the oral insert may be hidden to allow internal structures such as manifolds and nozzles to be viewed. In some variations, a graphical representation of the oral insert model may be displayed in conjunction with any of the steps described herein (e.g., FIGS. 5, 8, 12, 18) to aid visualization of model generation.

The method (500) may further comprise generating (506) a geometry of the fluid nozzles based on the oral scan data of the jaw. For example, the geometry of the fluid nozzles may be based on the patient oral geometry (e.g., nozzles angled such that fluid jet axes are tuned relative to oral anatomy). Methods of generating a fluid nozzle are discussed in more detail with respect to FIGS. 8-11.

The method (500) may further comprise defining (508) a tray surface that encloses the fluid nozzles based on the oral scan data. In some variations, the geometry of the tray surface may be based on an alpha shape (e.g., convex hull) and patient oral geometry. In some variations, the tray surface (508) may be based on an initial or predetermined tray clearance, tray width, and alignment feature geometry (e.g., length, depth). In some variations, defining the tray surface may further comprise calculating one or more of a tray occlusal (e.g., fit) plane, outer arch curvature, and occlusal maxima points for one or more of the upper and lower jaws. In some variations, the tray surface may comprise an offset of the teeth geometry. For example, the tray surface may comprise a geometry corresponding to a patient's oral geometry with undercuts removed.

The method (500) may further comprise generating (510) a geometry of a set of manifolds that connects the fluid inlet port to the fluid nozzles. For example, the geometry of the set of manifolds may be based on at least the patient oral geometry, tray surface geometry, fluid nozzle geometry, fluid inlet port geometry, and/or fluid outlet geometry. A method of generating a manifold is discussed in more detail with respect to FIGS. 12-17.

The method may further comprise generating other oral insert structures (e.g., fluid inlet port, fluid outlet port, enclosure). In some variations, a geometry of the fluid inlet port and fluid outlet port may be based on one or more of an initial or predetermined fluid outlet port geometry, occlusal plane, arch curvature, arch width, and symmetry plane for one or more of the upper and lower jaws. In some variations, generating the fluid inlet port geometry and the fluid outlet port geometry may further comprise calculating arch mid planes for one or more of the upper and lower jaws. In some variations, a geometry of the enclosure of the oral insert may be based on one or more of an initial or predetermined enclosure geometry, fluid nozzle geometry, manifold geometry, fluid inlet port geometry, fluid outlet port geometry, patient oral geometry, tray surface geometry, and clearance geometry (e.g., minimum wall thickness). In some variations, generating the enclosure geometry may further comprise calculating initial boundary and cross-section curves of the enclosure, initial boundary and cross-section curves for a fluid outlet port transition, surface quality and smoothness (e.g., inflection points), and section planes. In some variations, a print direction (e.g., 3-D printing direction) of the oral insert may be a parameter of the oral insert model that may be optimized. In some variations, a user may modify any of the generated geometries and parameter thresholds.

The method (500) may further comprise identifying and resolving (512) one or more geometric conflicts between one or more of the fluid inlet port, the fluid nozzles, the manifolds, and the tray. For example, a manifold may conflict with the tray surface by coming too close (e.g., under a minimum wall thickness) or breaking through or extending past the tray surface. As another example, the fluid nozzles may be placed too closely together with respect to each other based on predetermined criteria. As yet another example, a manifold and a fluid nozzle of another manifold may conflict by occupying the same space. A method of identifying geometric conflicts is discussed in more detail with respect to FIGS. 18-21. In some variations, one or more intersections of one or more of the fluid inlet port, the fluid nozzles, the manifolds, and the tray surface may be identified based on one or more of a wire representation and mesh representation. In some variations, the step of identifying and resolving geometric conflicts may be performed after any of the structure generation and/or modification (e.g., smoothing) steps and may be performed iteratively.

The method (500) may further comprise identifying and smoothing (e.g., filleting) (514) oral insert structures and hydraulic intersections. For example, an intersection between a manifold and a fluid nozzle may comprise one or more sharp edges that may inhibit smooth and consistent fluid flow. Filleting hydraulic intersections may improve fluid flow and hydraulic efficiency. In some variations, the surfaces of the oral insert structures may be combined and smoothed. In some variations, a user may control a degree of smoothing performed. For example, an exterior surface of the oral insert (e.g., enclosure, tray surface, fluid outlet port) may be smoothed for patient comfort and aesthetics. The method (500) may further comprise outputting (516) the oral insert model (e.g., solid model) in a data format suitable for one or more of display, analysis, transmission, storage, manipulation, and manufacturing. The method (500) may further comprise manufacturing (518) the oral insert based on the oral insert model.

The oral insert models described herein may be manufactured utilizing one or more 3-D printing (e.g., additive manufacturing) processes which may include but are not limited to: stereolithography apparatus (SLA), digital light projection (DLP), polymer jetting, powder deposition, binder jetting, selective laser sintering (SLS), fused deposition modeling (FDM), fused filament fabrication (FFF), directed energy deposition (DED), direct metal laser sintering (DMLS), selective laser melting (SLM), electron beam melting (EBM), laminated object manufacturing (LOM), rapid liquid printing (RLP), bioprinting, self-assembly printing (e.g., 4-D printing), combinations thereof, and the like. For example, manufacturing may include a hybrid process that utilizes 3-D printing and robotics, 3-D printing and manual milling, computer numerically controlled (CNC) machining, and 3-D printing and injection molding or overmolding. Manufacturing may also include a system for varying hardness, flexibility, color, or texture depending upon process and materials used. Materials may include, UV-curable photopolymers such as 3D Systems™, VisiJet SL Clear™, 3DSystems™ Accura ClearVue™, NextDent™ Model Clear™ or Stratasys™ Med620™, UV curable ceramics, powder polymers, powder metals, powder alloys, powder ceramic, powered organic material, filament-based plastics, filament-based metals, filament based ceramics, filament-based organic materials, or may be comprised of a variety of plastic, metal, ceramic, organic materials or biological materials that may be grown in a laboratory environment which may be patient specific or manufactured from a patient's genetic data or cells as a base material.

Generating a Fluid Nozzle

Figure 8:
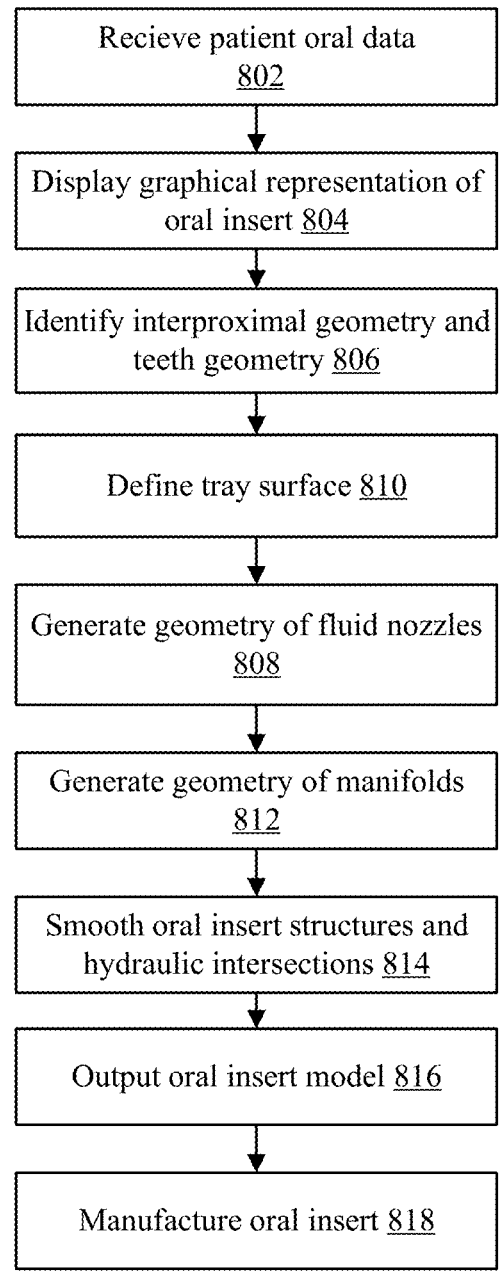
FIG. 8 depicts a flowchart representation of one method of generating a fluid nozzle of an oral insert.

FIG. 8 depicts a flowchart representation of one method of generating a fluid nozzle of an oral insert. As depicted in FIG. 8, method (800) may comprise receiving (802) patient oral data such as oral scan data of one or more jaws of a patient. The method (800) may further comprise displaying (804) a graphical representation of the model of the oral insert as described herein (e.g., FIG. 5). The method (800) may further comprise identifying (806) interproximal geometry and teeth geometry based on the patient oral data. In some variations, the interproximal geometry comprises one or more of a facial interproximal point, a lingual interproximal point, an occlusal interproximal point, and an interproximal plane. The teeth geometry may comprise a longitudinal axis of the tooth. A facial interproximal point may correspond to a point on the gum between two teeth on the facial side (e.g., cheek side) of the jaw. A lingual interproximal point may correspond to a point on the gum between two teeth on the lingual (e.g., tongue side) of the jaw. An occlusal interproximal point may correspond to a point between two teeth at about the midpoint between the facial interproximal point and the lingual interproximal point and closer to the upper part of the teeth. An interproximal plane may correspond to a plane between two teeth and may comprise the facial interproximal point, lingual interproximal point, and the occlusal interproximal point. A longitudinal axis may comprise a central axis through a tooth. The method (800) may further comprise defining (808) a tray surface that encloses the fluid nozzles based on the oral scan data. For example, the geometry of the tray surface may be based on the patient oral geometry. For example, the tray surface may have an arch region having a curvature that corresponds with a curvature of the maxillary arch.

The method (800) may further comprise generating (810) a geometry of the fluid nozzles on the graphical representation based on the oral scan data of the jaw. For example, the geometry of the fluid nozzles may be based on the patient oral geometry (e.g., interproximal geometry, teeth geometry). For example, a geometry of the fluid nozzles may be based on one or more of an initial or predetermined fluid nozzle geometry, interproximal points, gingival margin curvature and points, occlusal points, incisal points, jet axes, longitudinal axes, interproximal planes, fluid outlet port geometry, and clearance geometry (e.g., minimum wall thickness). The fluid nozzles may be configured to clean oral tissue. The geometry of the fluid nozzles may comprise a fluid nozzle inlet, a fluid nozzle outlet, and a fluid nozzle clearance geometry. In some variations, the fluid nozzle outlet may be configured to direct fluid flow toward the oral tissue in a predetermined direction. In some variations, the geometry of the fluid nozzle inlet may be based on the geometry of the fluid nozzle clearance geometry and tray surface. For example, the fluid nozzle inlet may comprise a geometry that does not intersect either the fluid nozzle clearance geometry or tray surface, and also provides a minimum wall thickness between the tray surface and the fluid nozzle inlet. If the fluid nozzle inlet is too close to the tray surface, the fluid nozzle may not be able to maintain sufficient structural integrity.

Figure 9:
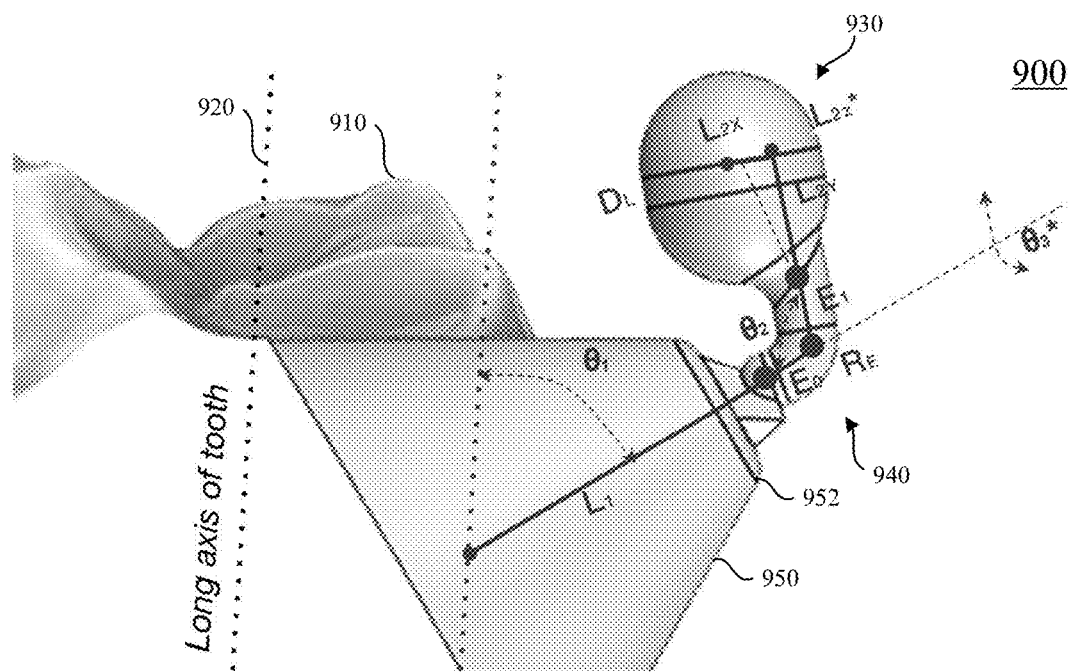
FIG. 9 depicts a schematic cross-sectional view of one variation of fluid nozzle geometry.

FIG. 9 depicts a schematic cross-sectional view of a fluid nozzle (900) positioned relative to a tooth (910) defining a longitudinal axis (920). In some variations, the fluid nozzle (900) may comprise one or more of a fluid nozzle inlet (e.g., manifold lead-in, manifold space reservation) (930), a fluid nozzle outlet (940), and a fluid nozzle clearance geometry (e.g., clearance shape, clearance cone, clearance frustum) (950).

In some variations, the fluid nozzle inlet (930) functions as a space reservation that represents the volume of the manifold that fluidly couples to the fluid nozzle (900) and is not included in the final oral insert model output by the methods described herein. That is, the fluid nozzle inlet (930) is an optional intermediary shape region that may be used for conflict (e.g., clearance) checks (e.g., nozzle-to-nozzle, nozzle-to-tray surface, etc.) when generating the fluid nozzle (900), and may represent a minimum volume in the manifold around the fluid nozzle within which no other fluidic structures should be located (e.g., a "keep-out" volume). Similarly, the fluid nozzle clearance geometry (950) functions as a space reservation that represents a volume for fluid flow and is not included in the final oral insert model output by the methods described herein. In variations having such a geometry, the fluid nozzle clearance geometry (950) may be used for conflict checks when generating the fluid nozzle (900) and tray surface. When the oral insert is manufactured, the fluid nozzle (900) comprises the fluid nozzle outlet (940).

In some variations, the fluid nozzle outlet (940) may be a fluid conduit between a manifold and the fluid nozzle clearance geometry (950). The fluid nozzle outlet (940) may be configured to receive fluid flow from a manifold and to output fluid (e.g., fluid stream, fluid spray) through the fluid nozzle clearance geometry (950). The fluid nozzle clearance geometry (950) corresponds to a keep-out volume (e.g., fluid nozzle space reservation, cavity, negative space, bounded volume) of the fluid nozzle (900) that permits fluid to be output without being impeded by other oral insert structures. The fluid nozzle outlet (940) may comprise a predetermined shape to control one or more of a pressure, shape, and direction of fluid flow.

In some variations, the fluid nozzle clearance geometry (950) may be configured to permit a fluid stream output in a predetermined direction from the fluid nozzle outlet (940). For example, the fluid nozzle clearance geometry (950) may define a lumen (e.g., fluid conduit) extending therethrough configured for fluid flow. In some variations, the fluid nozzle clearance geometry (950) may comprise an inner surface comprising one or more of a concave shape, conical shape, and frustum shape. The inner surface may be one or more of tapered (e.g., FIG. 9), stepped, and flared (e.g., surface having non-constant slope). In some variations, the fluid nozzle clearance geometry (950) may comprise an inlet comprising a first diameter and an outlet comprising a second diameter larger than the first diameter. The inlet and outlet may be parallel or non-parallel to each other.

In some variations, the fluid nozzle clearance geometry (950) may comprise a clearance geometry inlet (952) (e.g., frustum inlet) coupled to an output of the fluid nozzle outlet (940). For example, the clearance geometry inlet (952) may comprise an ellipsoid (e.g., circle) plane that defines an inlet portion of the fluid nozzle clearance geometry (950) although any geometry may be used.

FIGS. 10A-10E illustrate additional cross-sectional views of fluid nozzle (1020) geometry. The fluid nozzle (1020) may be coupled to a manifold (1010) based on, for example, intersection (e.g., overlap) with the fluid nozzle inlet (1022). The fluid nozzle (1020) may comprise a fluid nozzle outlet (1024, 1026) and a fluid nozzle clearance geometry (1028). The fluid nozzle outlet may comprise a first portion (1024) coupled to the manifold (1010) and a second portion (1026) coupled to the fluid nozzle clearance geometry (1028) (e.g., keep-out volume).

Figures 10A, 10B, 10C:
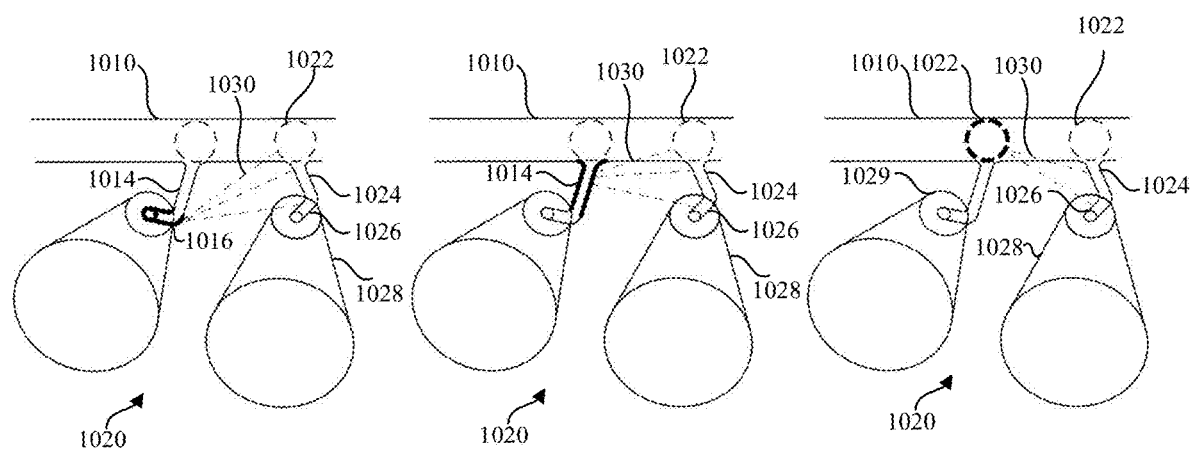
FIGS. 10A-10E depict schematic cross-sectional views of variations of fluid nozzle geometry.
Figure 10D:
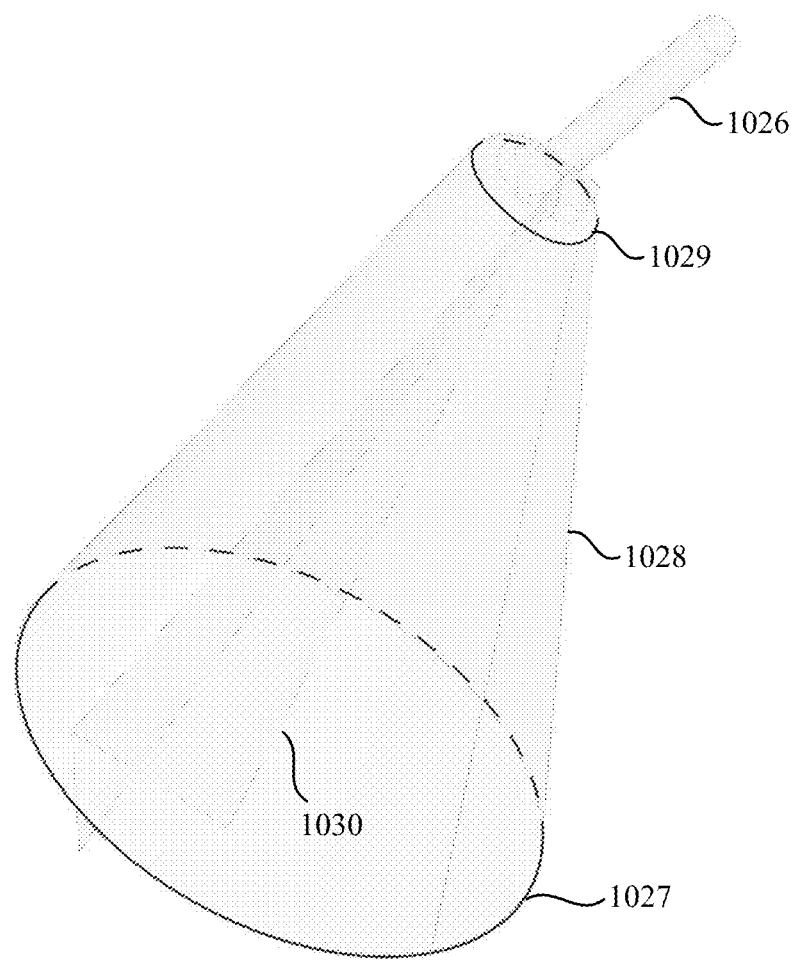
Figure 10E:
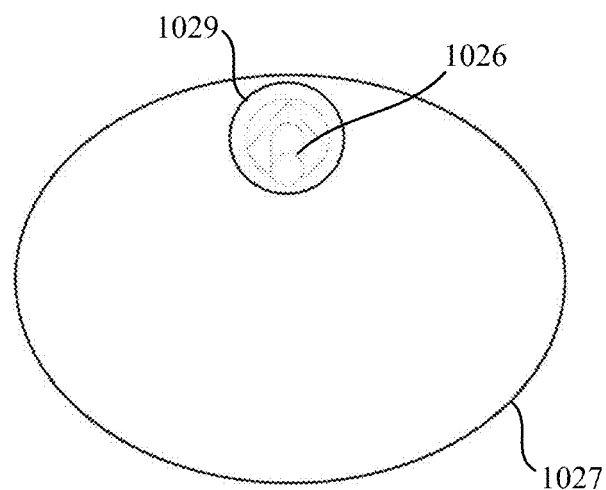
Figure 11:
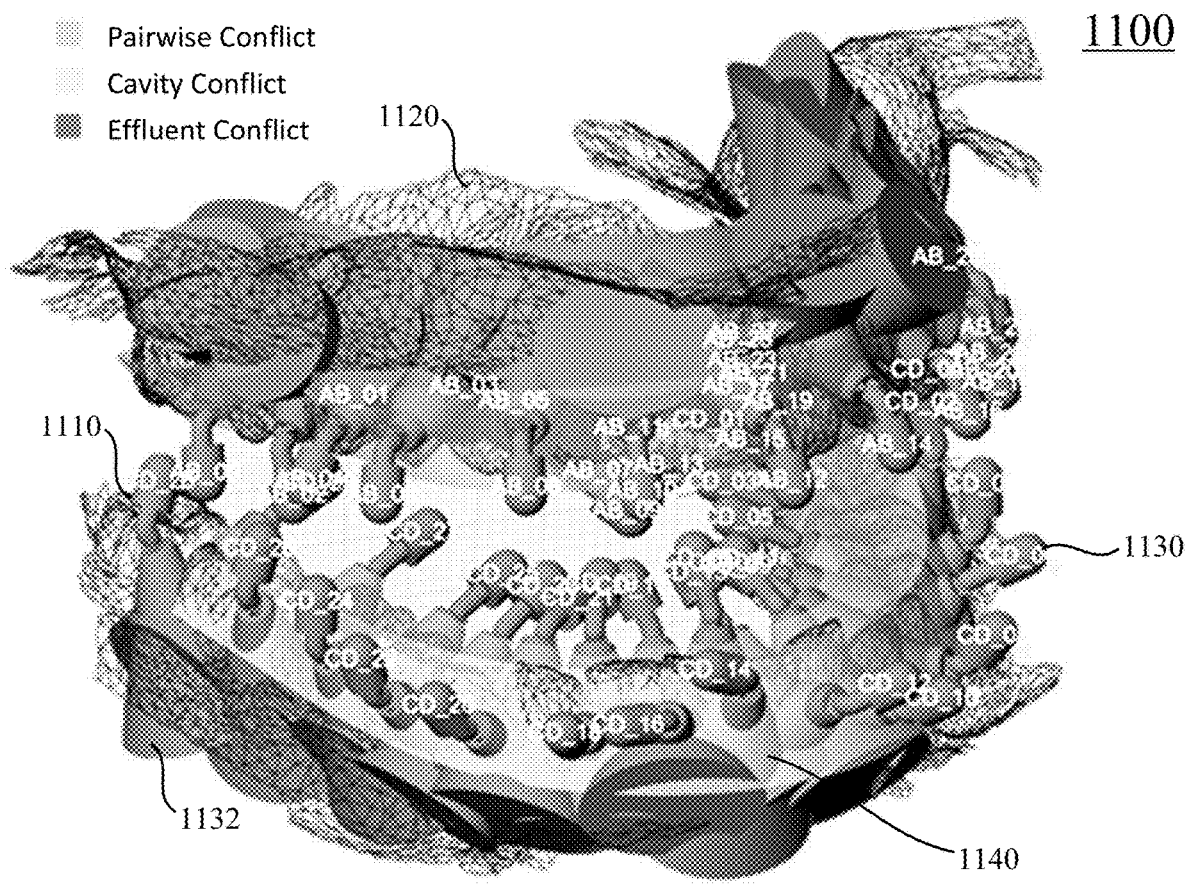
FIG. 11 depicts a schematic perspective view of one variation of an oral insert and oral anatomy.

In some variations, the fluid nozzle clearance geometry (1028) may comprise a skewed ellipsoidal clearance geometry between a clearance geometry inlet (1029) and a clearance geometry outlet (1027). The fluid nozzle clearance geometry (1028) may comprise a clearance geometry inlet (1029) coupled to the second portion (1026) of the fluid nozzle outlet (1026). As shown in FIG. 10E, the clearance geometry inlet (1029) may be circular while the clearance geometry outlet (1027) may be ellipsoidal. In FIG. 10D, a "V"-shaped spray of fluid (1030) may be output from the fluid nozzle outlet (1026) through a cavity of the fluid nozzle clearance geometry (1028).

In some variations, the fluid nozzle inlet (930) may be defined by fluid nozzle inlet coordinates ($L_{2x}$, $L_{2y}$, $L_{2z}$) and a fluid nozzle inlet diameter $D_L$. In some variations, the fluid nozzle outlet (940) may be defined by entry angle $\theta_2$, rotation angle $\theta_3$, nozzle lengths $E_0$, $E_1$, and radius of curvature $R_E$. In some variations, $E_1$ may be a length from the fluid nozzle inlet (930) to a line extending from first longitudinal axis $L_1$. In some variations, $L_1$ may be defined based on the interproximal geometry and teeth geometry (e.g., longitudinal axis) identified in, for example, step 806. First portion $E_1$ may correspond to a length of a first portion of the fluid nozzle outlet (940). Second portion $E_0$ may be a length from the end of $E_1$ to the fluid nozzle clearance geometry (950). $E_0$ may correspond to a length of the second portion of the fluid nozzle outlet (940). Rotation angle $\theta_3$ may be a rotation angle out of the interproximal plane for $E_0$, $E_1$, and $L_2$. $R_E$ may be a radius of curvature between $E_0$ and $E_1$. In some variations, entry angle $\theta_2$ may be an angle between $E_0$ and $E_1$. In some variations, entry angle $\theta_2$ may be between about 100 degrees and about 260 degrees. In some of these variations, the range of entry angles $\theta_2$ may be reduced for posterior fluid nozzles. In some variations, $E_1$ may be between about 1 mm and about 2.5 mm.

In some variations, the fluid nozzle clearance geometry (950) may be based on a clearance geometry angle $\theta_1$ and a first longitudinal axis (e.g., nozzle offset) $L_1$. In some variations, clearance geometry angle $\theta_1$ may be the angle between the longitudinal axis (920) and the first longitudinal axis $L_1$ of the fluid nozzle clearance geometry (950). The longitudinal axis (920) may correspond to a projected longitudinal axis of its corresponding tooth (910). For example, the longitudinal axis (920) may be directed 'outward' or 'inward' for the facial and lingual surfaces, respectively. In some variations, the clearance geometry angle $\theta_1$ may be between about 45 degrees and about 90 degrees. In some variations, first longitudinal axis $L_1$ may extend from a patient's oral anatomy (e.g., interproximal point) to the fluid nozzle outlet (940). That is, first longitudinal axis $L_1$ may be a fluid nozzle outlet offset from a gingival peak of a corresponding tooth (910) to the fluid nozzle outlet (940). In some variations, first longitudinal axis $L_1$ may be between about 2 mm and about 6 mm.

The method (800) may further comprise generating (812) a geometry of a set of manifolds that connects the fluid inlet port to the fluid nozzles. For example, the geometry of the set of manifolds may be based on at least the patient oral geometry, tray surface geometry, fluid nozzle geometry, fluid inlet port geometry, and fluid outlet port geometry. The method (800) may further comprise generating (812) a geometry of the manifolds on the graphical representation that connects the fluid inlet port to the fluid nozzles.

The method (800) may further comprise smoothing (814) oral insert structures and hydraulic intersections. The method (800) may further comprise outputting (816) the oral insert model (e.g., solid model) in a data format suitable for one or more of display, analysis, transmission, storage, manipulation, and manufacturing. The method (800) may further comprise manufacturing (818) the oral insert based on the oral insert model.

Generating a Manifold

Figure 12:
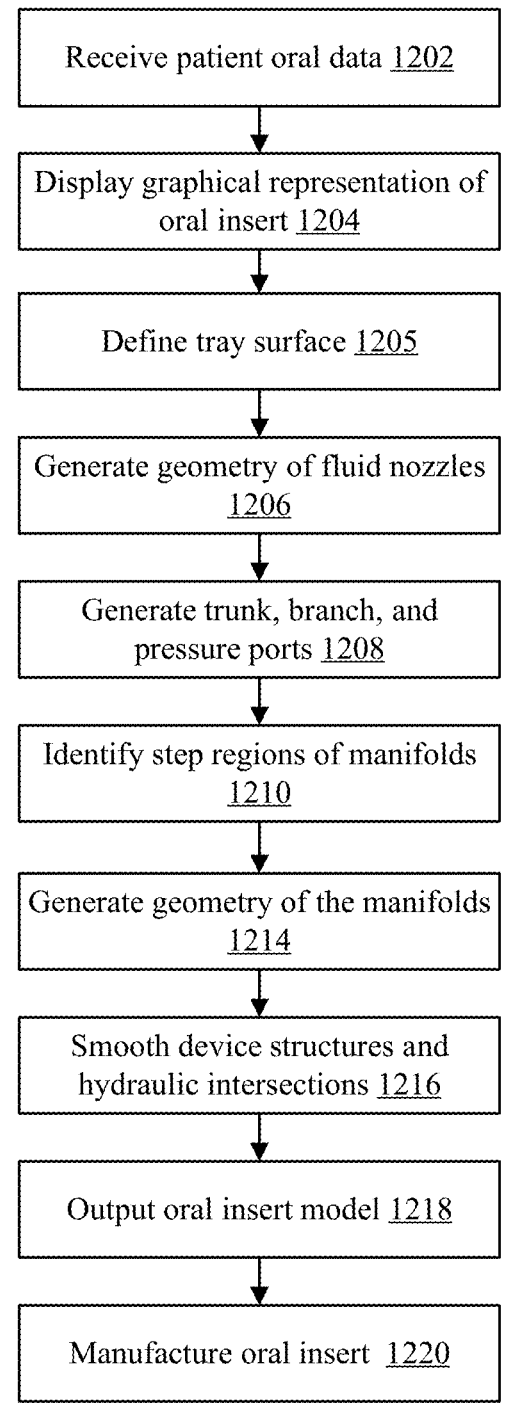
FIG. 12 depicts a flowchart representation of one method of generating a manifold of an oral insert.

FIG. 12 depicts a flowchart representation of one method of generating a manifold geometry of an oral insert. As depicted in FIG. 12, method (1200) may comprise receiving (1202) patient oral data such as oral scan data of one or more jaws of a patient. The method (1200) may further comprise displaying (1204) a graphical representation of the model of the oral insert. In some variations, an enclosure of the oral insert may be generated based on patient oral geometry such as the interproximal geometry and teeth geometry, and predetermined criteria. The method (1200) may further comprise defining (1205) a tray surface that encloses the fluid nozzles based on the oral scan data. For example, the geometry of the tray surface may be based on the patient oral geometry. The method (1200) may further comprise generating (1206) a geometry of the fluid nozzles based on the oral scan data of the jaw. For example, the geometry of the fluid nozzles may be based on the patient oral geometry. For example, the clearance geometry angle $\theta_1$ may be defined by a longitudinal axis of a tooth and corresponding interproximal point.

The method (1200) further comprises generating (1208) one or more of a trunk, a branch coupled to the trunk and one of the fluid nozzles, and a pressure port coupled to the trunk based on a number of the fluid nozzles. In some variations, the pressure port comprises a taper along its length. In some variations, the pressure port is connected between the trunk and an effluence port of the oral insert.

Figure 13:
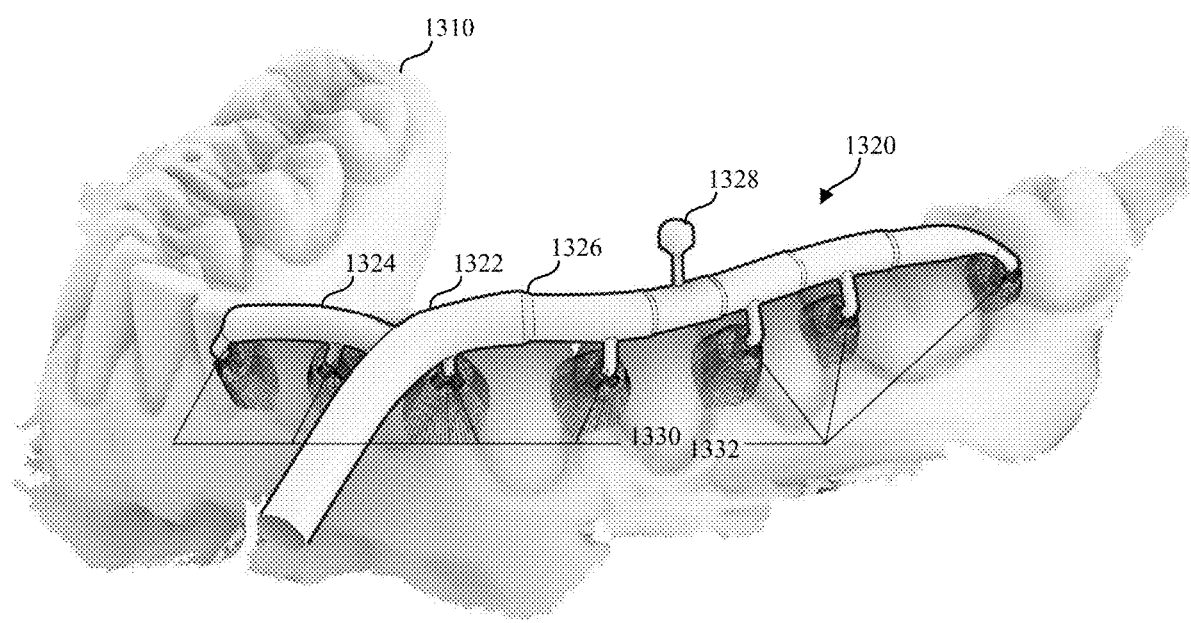
FIG. 13 depicts a schematic perspective view of one variation of a set of fluid nozzles coupled to a manifold and oral anatomy.

FIG. 13 depicts a schematic perspective view of a manifold relative to oral anatomy (1310). The manifold (1320) may be coupled to a set of fluid nozzles (1330) comprising a set of fluid clearance geometries (1332). The manifold (1320) may comprise one or more of a trunk (1322), branch (1324), step region (1326), and pressure port (1328). The trunk (1322) may be a primary fluid conduit coupled between a fluid inlet port (not shown) and each of a branch (1324), pressure port (1328), and fluid nozzle (1330). The trunk (1322) may comprise a larger diameter than any of the branch (1324), pressure port (1328), and fluid nozzles (1330). The branch (1324) may extend from the trunk (1322) and comprise a diameter smaller than the trunk (1322). The branch (1324) may serve as a secondary fluid conduit extending from a trunk (1322) for fluid nozzles (1330) not otherwise coupled to the trunk (1322). For example, a branch (1324) may extend from the trunk (1322) in FIG. 13 for fluid nozzles (1330) corresponding to a set of anterior teeth of a patient. Branches may be useful to reduce tortuosity (e.g., prevent kinks) in the manifold (1320) and improve hydraulic performance of the oral insert.

In some variations, one or more pressure ports (1328) (e.g., pressure balancing port) may extend from one or more of trunks (1322) and branches (1324). A pressure port (1328) may be configured to release pressure as fluid flows through the manifold (1320). Without pressure ports (1328), the manifold (1320) and fluid nozzles (1330) may generate unbalanced pressure drops and uneven fluid flow from the fluid nozzles (1330). In some variations, a pressure port (1328) may be useful when a number of nozzles on all manifolds is not equal in order to maintain a predetermined range of hydraulic pressures. In some variations, a diameter of the manifold (1320) may decrease along a length of the manifold (1320) due to pressure relieved by a pressure port (1328) on the manifold (1320). In some variations, the number, shape, size, and location of the pressure port (1328) may be configured to promote a predetermined range of pressures through at least a portion of the manifold (1320). For example, one or more pressure ports (1328) may be configured such that a fluid pressure within the manifold (1320) may be within a predetermined range (e.g., relatively constant) throughout a length of the manifold (1320). In some variations, a pressure port (1328) may be located downstream of a step region (1326) of the manifold (1320).

Figure 14:
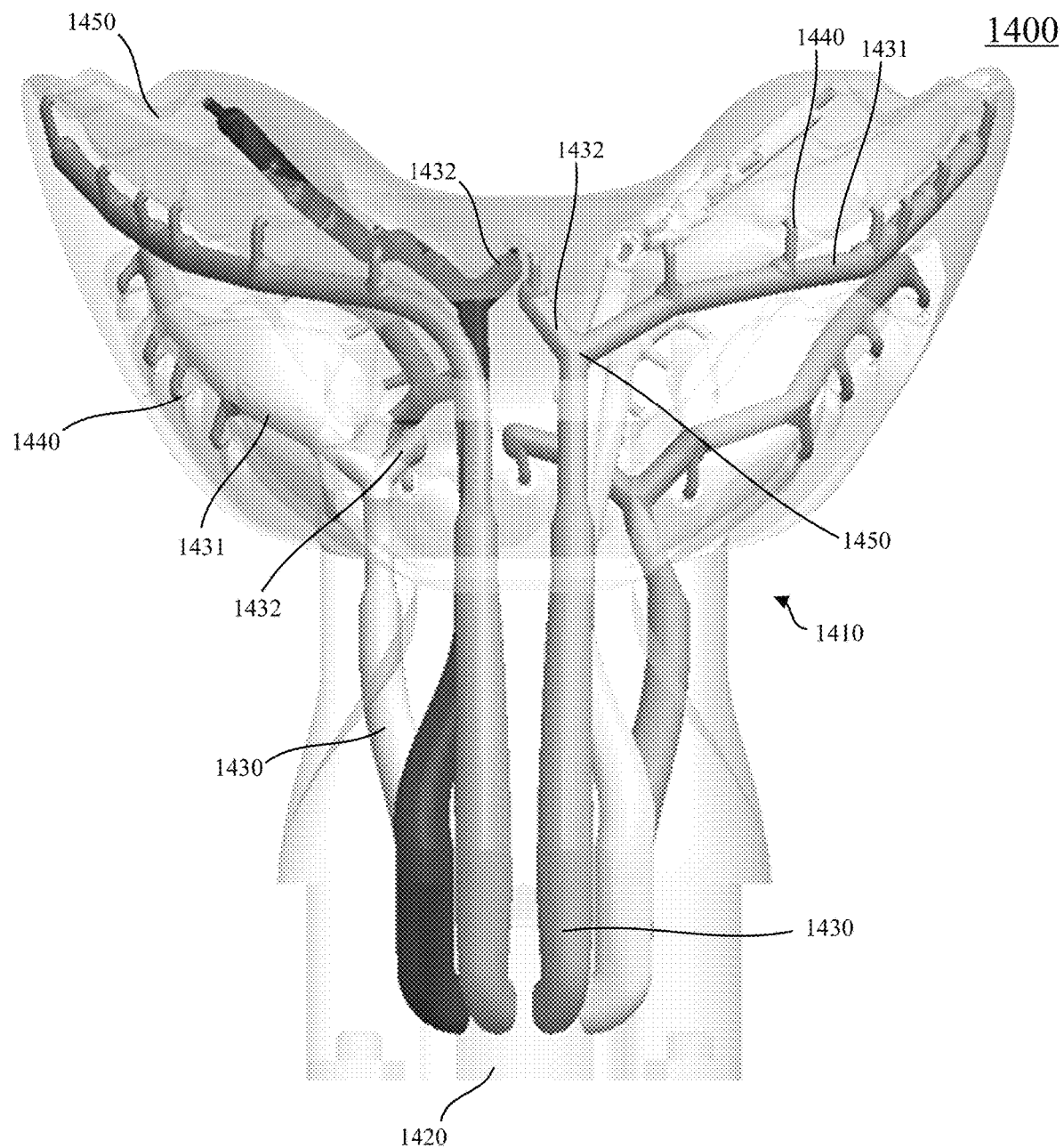
FIG. 14 depicts a schematic perspective view of one variation of a set of manifolds of an oral insert.

FIG. 14 depicts a schematic perspective view of a set of manifolds (1430) of an oral insert (1410). The oral insert may comprise a fluid inlet port (1420) configured to receive fluid and a tray surface (1450) configured to retain teeth (not shown). The set of manifolds (1430) may be configured to receive fluid from the fluid inlet port (1420). Each manifold (1430) may comprise one or more trunks (1431) and branches (1432) extending from a trunk (1431). Fluid nozzles (1440) may be coupled to respective trunks (1431) and branches (1432). In some variations, the set of manifolds (1430) may extend from the fluid inlet port (1420) on either side of a lateral plane bisecting the central incisors (not shown). Directly connecting the trunk (1431) to the fluid nozzles (1440) corresponding to the central incisors may generate a hydraulically inefficient tortuous path for the trunk (1431). Therefore, in some variations, a branch (1432) may be used to couple one or more of the anterior fluid nozzles (1440) to the trunk (1431). In FIG. 14, branches (1432) extend toward fluid nozzles (1440) corresponding to the anterior teeth (e.g., central incisors).

Figure 15:
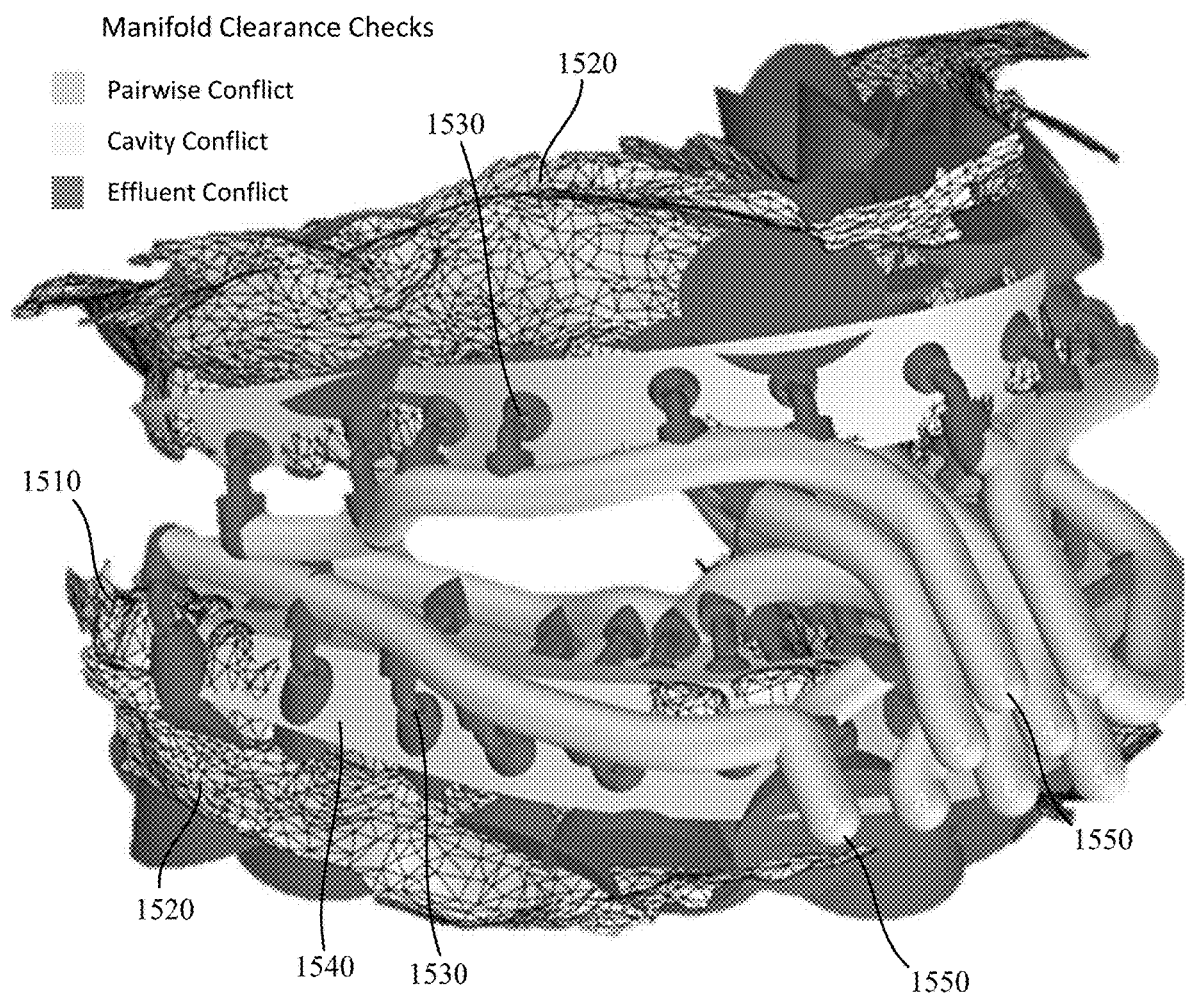
FIG. 15 depicts a schematic perspective view of one variation of a set of manifolds of an oral insert and oral anatomy.

FIG. 15 depicts a schematic perspective view of a set of manifolds (1550) of an oral insert and oral anatomy. For example, a set of eight manifolds (1550) are illustrated relative to a set of teeth (1510) and gingiva (1520). A set of fluid nozzles (1530) may be coupled to respective manifolds (1550) and the set of fluid nozzles (1530) may be coupled between a tray surface (1540) and a respective manifold (1550).

In some variations, a geometry of the manifolds (1550) may be based on one or more of an initial or predetermined manifold geometry (e.g., pressure port geometry), fluid nozzle geometry, tray surface geometry, fluid inlet port geometry, fluid outlet port geometry, posterior height, lingual width, overall width, tortuosity, and clearance criteria (e.g., minimum wall thickness). In some variations, manifold geometry may be generated predictively, based on a multi-constraint weighted combination of initial positions of nozzles, curve fairing objectives, and clearance criteria. In some variations, manifold geometry may be based on a hydraulic diameter, cross-sectional area, shape/aspect ratio (e.g., circular, ellipsoid, rectangular, ribboned/slotted, irregularly shaped), centerline geometry (e.g., minimum radius of curvature, bending angle), branch-manifold intersection angle, and minimum radius/smoothness for branch-manifold transitions and manifold-nozzle transitions. In some variations, generating the manifold geometry may further comprise calculating a manifold path, pressure port geometry, tortuosity, curvature, and length for one or more of the upper and lower jaws.

In some variations, the oral insert may be divided into a set of volumes each assigned a weight based on its distance from a predetermined clearance volume including the exterior enclosure and fluid outlet port geometry. Based on the volumes which are maximally distant from the clearance volumes, a manifold path may be generated that minimizes a distance to the nozzles as well as torsion and inflection of the manifold path itself. In some variations, one or more of the manifold path, branches, and pressure ports may be routed or iteratively modified based on a weighted function of its objectives. For example, the manifold may comprise one or more branches based on the tortuosity of the predicted manifold path.

FIGS. 16A-16I are schematic representations of methods of generating a manifold of an oral insert. In some variations, the generated manifold may be configured to permit a relatively constant fluid pressure through a length of the manifold by decreasing a diameter of the manifold along a length of the manifold based at least in part on the fluid nozzles (e.g., number, placement, size). In some variations, curvature analysis may be performed during one or more of the manifold generation and optimization steps described herein. Curvature analysis may comprise geometric analysis of one or more of the hydraulic paths and surface geometry of any of the oral insert structures described herein. For example, curvature analysis may validate whether a manifold path is within a predetermined tortuosity range and whether a set of fluid nozzles meet a predetermined set of hydraulic performance criteria. In some variations, curvature analysis may be performed for one or more of a manifold, fluid nozzle, fillets, transition surfaces, and any surface or geometry of the oral insert. For example, an initial manifold path may be generated such that a manifold couples to a set of fluid nozzles. Curvature analysis of the initial manifold path may identify an unacceptable tortuous path for the portion of the manifold corresponding to the anterior teeth. In response to the curvature analysis, the manifold path may be modified and a branch may be generated that extends toward the anterior teeth.

Figure 16A:
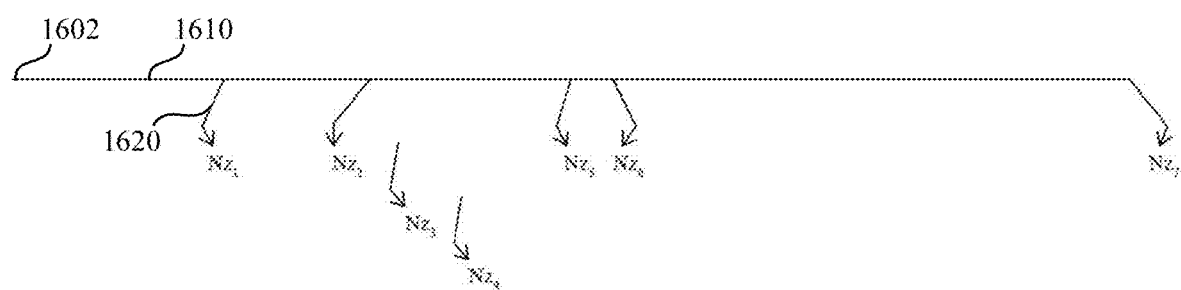
FIGS. 16A-16I are schematic representations of one method of generating a manifold of an oral insert.

FIG. 16A depicts generation of an initial (e.g., provisional) manifold path (1610) (e.g., trunk path) and set of fluid nozzles $N_{Zn}$ (1620). The location and orientation of the set of fluid nozzles $N_{Zn}$(1620) may be based on patient oral geometry. The initial manifold path may be (1610) predetermined based on the number and location of fluid nozzles $N_{Zn}$ (1620) of that manifold. Fluid may enter at a manifold inlet (1602). In some variations, the manifold path (1610) may be configured to intersect one or more fluid nozzles $N_{Zn}$(1620) while having a predetermined tortuosity range. As shown in FIG. 16A, fluid nozzles $N_{Z1,2,5,6,7}$ are directly coupled to the manifold path (1610) while fluid nozzles $N_{Z3,4}$ are not coupled because directly coupling the manifold path (1610) to fluid nozzles $N_{Z3,4}$ would exceed a predetermined tortuosity range. These fluid nozzles may be connected to the manifold path (1610) via a branch as discussed in more detail herein. For example, the fluid nozzles corresponding to the interproximal spaces between the upper and lower central incisors may be coupled to a trunk by one or more branches.

Figure 16B:
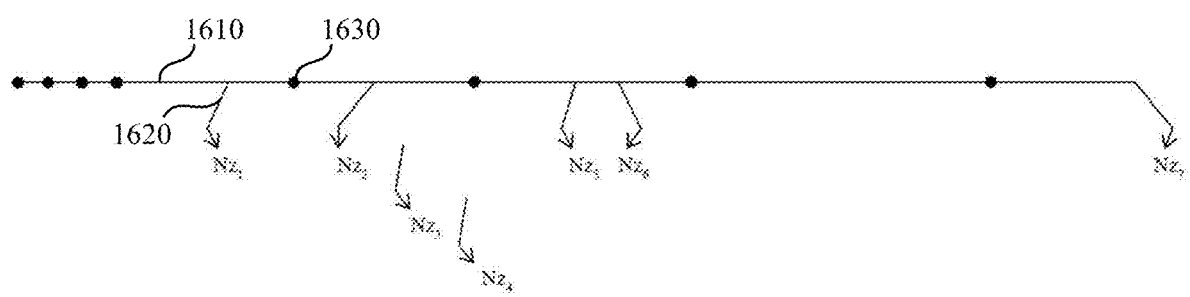

FIG. 16B depicts a set of control points (1630) defined by the locations of fluid nozzle along the initial manifold path (1610). In some variations, the set of control points may allow manual control of manifold generation. For example, a user may modify (e.g., fine tune) manifold parameters (e.g., diameter, path, location, curvature) at the control points. In some variations, the set of control points may be located based on fluid nozzle and manifold inlet locations.

Figure 16C:
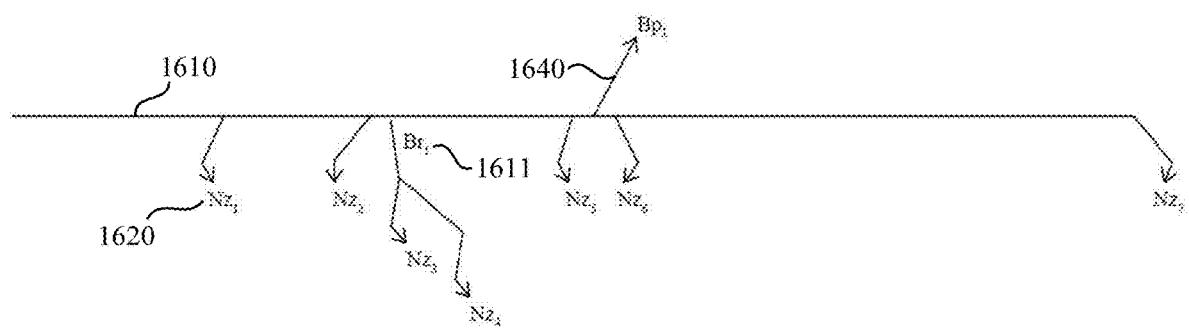

FIG. 16C depicts generation of branches $B_{r1}$ (1611) and pressure ports $B_{p1}$ (1640). For example, fluid nozzles $N_{Z3,4}$ are coupled to the manifold path (1610) via branch $B_{r1}$. In some variations, fluid nozzles (1620) that are in relatively close proximity to each other, such as for the lower lingual anterior teeth, may increase tortuosity of a manifold path (1610). If the tortuosity of the manifold path exceeds a predetermined tortuosity range, a branch (1611) may be added to connect these fluid nozzles (1620) to the manifold path (1610) to reduce the tortuosity of the manifold path to be within the predetermined range. In some variations, to maintain a predetermined (e.g., consistent) fluid pressure throughout a length of a manifold, a predetermined cross-sectional area of the manifold may be reduced and a pressure port (1640) may be coupled to the manifold and configured to release a predetermined range of pressures. In some variations, the number of pressure ports (1640) may be based at least in part on the number of fluid nozzles $N_{Zn}$ (1620) coupled to the manifold. In some variations, a radius of a pressure port (1640) may be a function of the number of fluid nozzles (1620) of the manifold and may be determined using a lookup table (LUT). In some variations, one or more of manifold start radius $M_{sr}$, manifold end radius $M_{er}$, inlet radius $I_r$, and number of fluid nozzles $N_c$ on a manifold may be input parameters to the LUT.

Figure 16D:
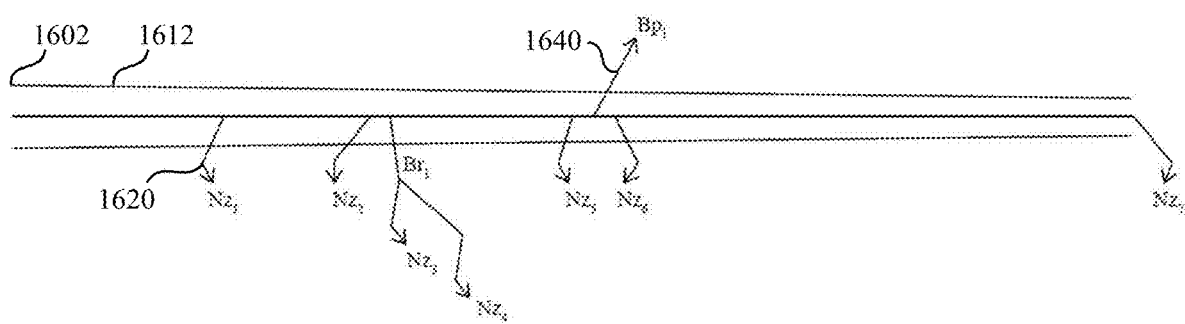
Figure 16E:
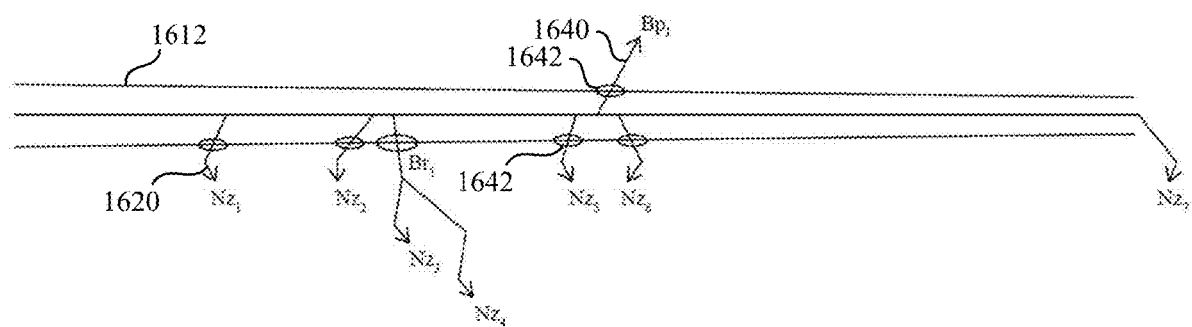

FIG. 16D depicts generation of an initial manifold taper (1612) extending from an inlet (1602) to an end of the manifold. FIG. 16E depicts identified intersections between the manifold taper (1612), nozzles (1620), branches (1611), and pressure ports (1640). In some variations, geometric conflict checks may be performed with respect to the identified intersections of the generated structures.

Figure 17:
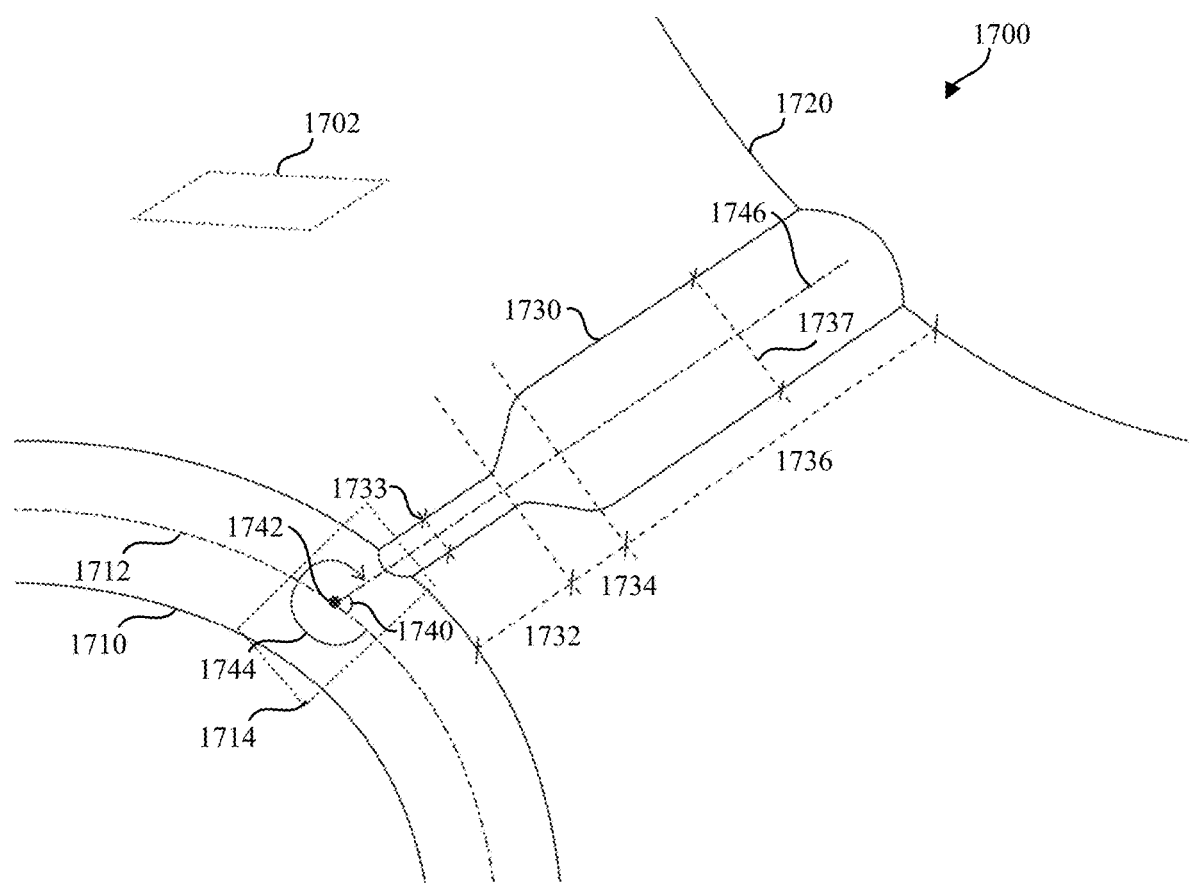
FIG. 17 is a cross-sectional schematic representation of one variation of a port of a manifold of an oral insert.

In some variations, a pressure port may be configured to vent excess pressure of a manifold. FIG. 17 is a cross-sectional schematic representation a pressure port (1730) coupled to a manifold (1710). The oral insert (1700) may comprise a fluid outlet port (1720) and the pressure port (1730) between the manifold (1710) and the fluid outlet port (1720). The manifold (1700) may comprise a manifold central axis (1712) and a manifold plane (1714) that is perpendicular to the manifold curve (1712) and which intersects the pressure port (1730). The pressure port (1730) may comprise a first portion (1732) (e.g., inlet portion, narrow portion), a second portion (1734) (e.g., tapered portion), and a third portion (1736) (e.g., outlet portion, wide portion). The first portion (1732) may comprise a first diameter (1733) and the third portion (1736) may comprise a third diameter (1737). The pressure port (1730) may define a longitudinal axis (1746) that intersects the manifold central axis (1712) at the intersection point (1742). A pressure port angle (1740) may comprise an angle between the longitudinal axis (1746) and the manifold central axis (1712). The pressure port (1730) may comprise a rotation angle (1744) within the manifold plane (1714) relative to a reference plane (1702) (e.g., medial surface) normal projected to the manifold plane (1714) (e.g., angle relative to medial plane normal).

In some variations, one or more pressure port (1730) parameters may be generated based on one or more of an intersection point (1742) (e.g., a pressure port location), pressure port angle (1740), rotation angle (1744), number of nozzles, first diameter (1733), third diameter (1737), manifold curve (1712), fluid outlet port (1720), and lookup table. In some variations, generating a pressure port may comprise identifying an intersection surface between the pressure port (1730) and the fluid outlet port (1720) based on the intersection point (1742) and the pressure port angle (1740). A normal of the medial surface (1702) may be projected to the perpendicular frame of the manifold (1710). Then, the projected normal of the medial surface (1702) may be rotated based on a rotation angle (1744). The longitudinal axis (1746) of the pressure port (1730) may be generated based on one or more of the intersection surface, rotated manifold plane (1714), and intersection point (1742). In some variations, the first diameter (1733) and the third diameter (1737) may be obtained from a corresponding lookup table to generate a geometry of the pressure port (1730) that permits predetermined pressure relief to the manifold. For example, an amount of pressure relief provided by a pressure port (1730) may be a function of the first diameter (1733) and length of the first portion (1732).

The method (1200) further comprises identifying (1210) one or more step regions along a length of the manifold. In some variations, identifying the one or more step regions of the manifold may be based at least on a number of the fluid nozzles. One or more step regions may comprise a diameter, step length, and a taper angle. In some variations, a manifold radius may be reduced in diameter (e.g., stepped down) by a cross-sectional area equal to a cross-sectional area of fluid flow outputted by a fluid nozzle (1620) to allow a predetermined fluid pressure for each fluid nozzle (1620) of the manifold. In some variations, an area step size ($A_{step}$) for each nozzle may be based on a change in area from the manifold start radius to the manifold end radius and a number of nozzles on the manifold (e.g., $A_{step}=\Delta A/(N_c-1)$). For each nozzle $N_c$ except for the last nozzle at the end of the manifold, a step region may be generated such that the decrease in area after the nozzle $N_c$ is equal to $A_{step}$. For example, a taper angle of a given step region may increase as a volume of fluid output by a fluid nozzle increases.

Figure 16F:
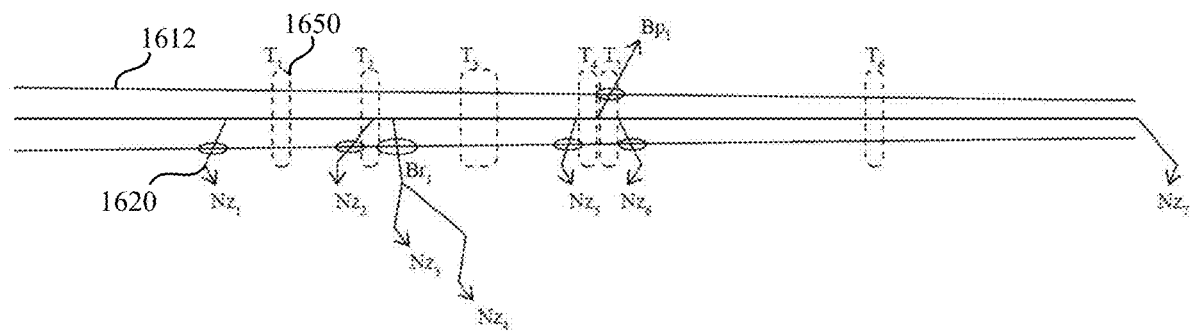

FIG. 16F depicts a set of initial (e.g., provisional) step regions $T_n$ (1650). Each step region $T_n$ may comprise a predetermined length comprising a taper. For example, a length of a step region $T_n$ may be based on the change in radius and taper angle and vice versa. In some variations, a step region $T_n$ may be generated downstream of a corresponding fluid nozzle (1620) or pressure port (1640). In some variations, a number and length of a taper may be based on geometric constraints (e.g., insufficient space to include a stepdown between multiple nozzles, branches, and/or pressure ports) such that a single taper may correspond to a plurality of nozzles.

Figure 16G:
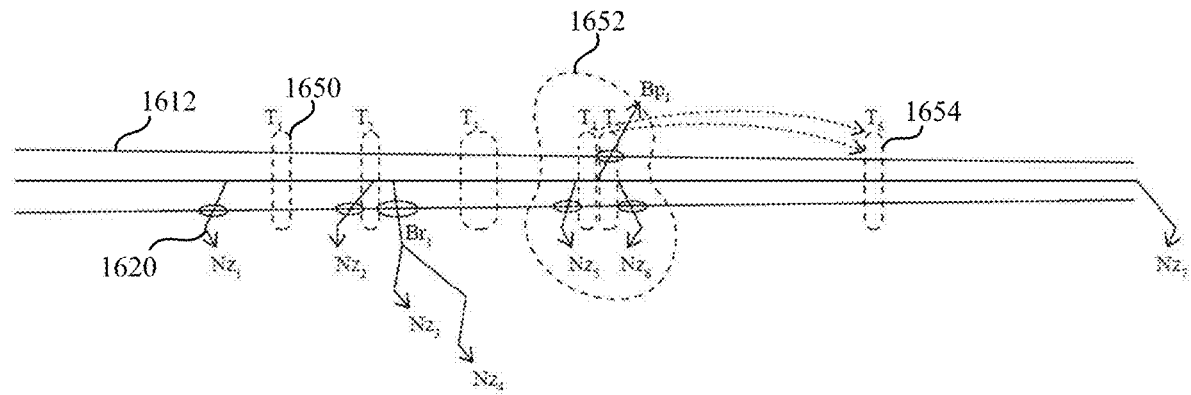
Figure 16H:
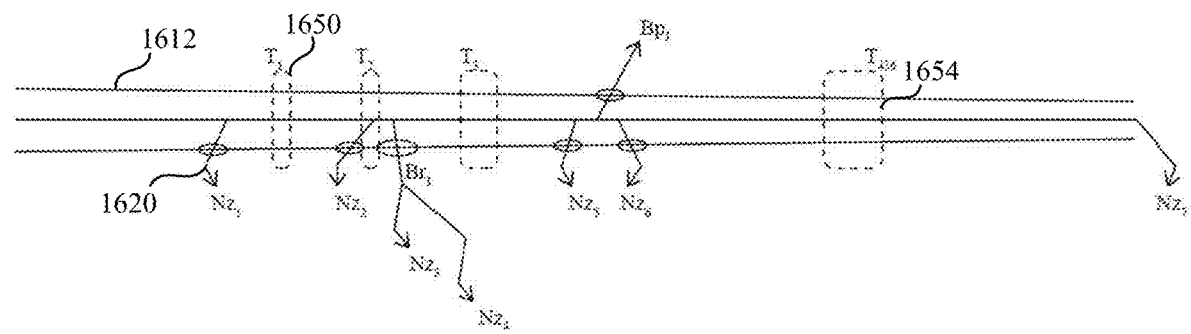
Figure 16I:
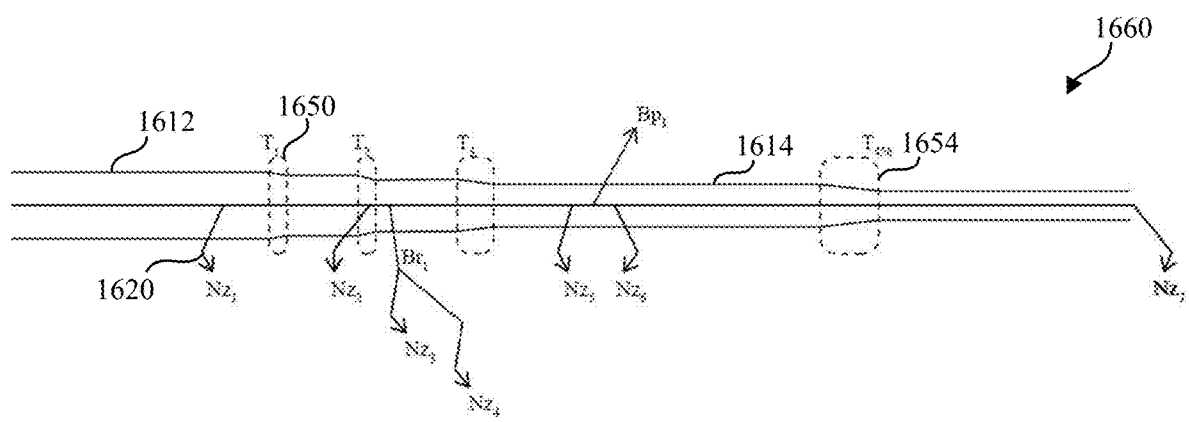

In some variations, a step region may correspond to more than one fluid nozzle, in which case the decrease in area of the step region should account for multiple fluid nozzles. In some variations, a set of initial step regions (1652) may be too close or overlap with each other (e.g., $T_4$ and $T_5$) in which case two or more of the step regions (1652, 1654) may be combined. For example, FIG. 16G depicts a step region conflict (1652) where step regions $T_4$ and $T_5$ are too close to each other. The step regions $T_4$ and $T_5$ may be combined with step region $T_6$ (1654) to form a modified step region $T_{456}$ (1654) as depicted in FIG. 16H. Combining step regions may obviate geometric conflicts due to overcrowding and thus aid structural integrity and/or manufacturing of the oral insert. FIG. 16I depicts the generated manifold (1660) having a manifold radius (1614) that decreases along a length of the manifold.

The method (1200) further comprises generating (1214) a geometry of the manifolds that connect the fluid inlet port to the fluid nozzles on the graphical representation of the oral insert model. The manifolds may be configured to allow a predetermined range of hydraulic pressures to each of the fluid nozzles. In some variations, each of the manifolds may comprise a trunk coupled to the fluid inlet port and at least one of the fluid nozzles. In some variations, a diameter of the manifold may decrease along a length of the manifold from the fluid inlet port. In some variations, the geometry of the manifolds may be iteratively modified (e.g., optimized) based at least on curvature analysis of the manifolds.

The method (1200) further comprises smoothing (1216) device structures and hydraulic intersections. The method (1200) may further comprise outputting (1218) the oral insert model (e.g., solid model) in a data format suitable for one or more of display, analysis, transmission, storage, manipulation, and manufacturing. The method (1200) may further comprise manufacturing (1220) the oral insert based on the oral insert model.

Identifying Geometric Conflicts

Figure 18:
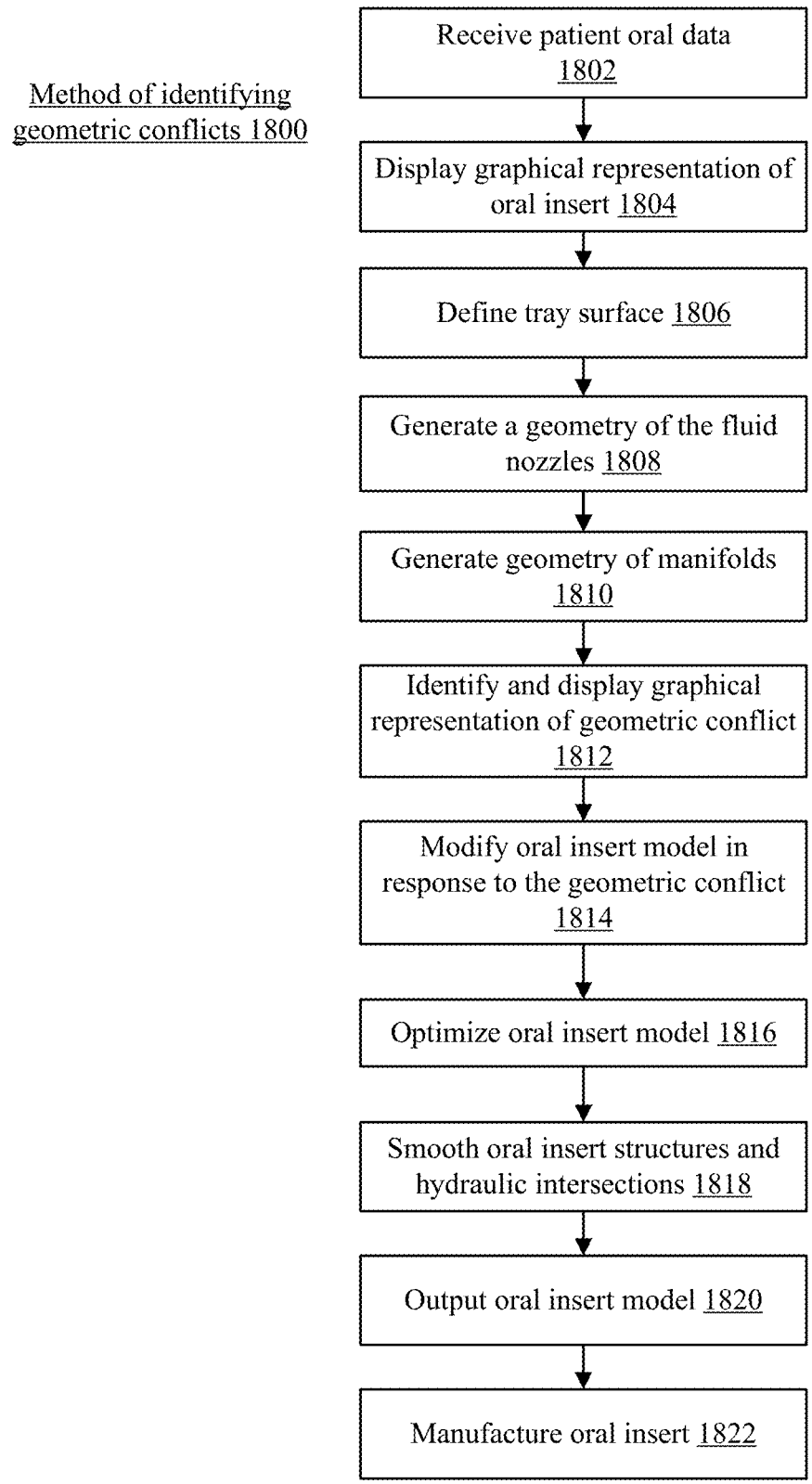
FIG. 18 depicts a flowchart representation of one method of identifying geometric conflicts of an oral insert.

FIG. 18 depicts a flowchart representation of one method of identifying a geometric conflict. In some variations, geometric conflict may occur between, for example, different hydraulic structures, between a hydraulic structure and an exterior surface of the oral insert, and between a hydraulic structure and a keep-out volume. For example, adjacent hydraulic structures may overlap or be too close to each other, or portions of the oral insert may not meet a minimum wall thickness between an enclosure and the hydraulic structure.

As depicted in FIG. 18, method (1800) may comprise receiving (1802) patient oral data such as oral scan data of one or more jaws of a patient. The method (1800) may further comprise displaying (1804) a graphical representation of the model of the oral insert. In some variations, an enclosure of the oral insert may be generated based on patient oral geometry such as the interproximal geometry and teeth geometry and predetermined criteria. The method (1800) may further comprise defining (1806) a tray surface that encloses the fluid nozzles based on the oral scan data. For example, the geometry of the tray surface may be based on the patient oral geometry. The method (1800) may further comprise generating (1808) a geometry of the fluid nozzles based on the oral scan data of the jaw. For example, the geometry of the fluid nozzles may be based on the patient oral geometry. The method (1800) may further comprise generating (1810) a geometry of a set of manifolds that connects the fluid inlet port to the fluid nozzles. For example, the geometry of the set of manifolds may be based on at least one or more of the patient oral geometry, enclosure geometry, tray surface geometry, fluid nozzle geometry, fluid inlet port geometry, and fluid outlet port geometry.

The method (1800) may further comprise identifying and displaying (1812) a graphical representation of a geometric conflict between one or more of the fluid inlet port, the fluid nozzles, the manifolds, and the tray. For example, a manifold geometry may conflict with the tray surface by breaking through or extending past the tray surface. As another example, the fluid nozzles may be placed too closely together with respect to each other based on predetermined criteria. As yet another example, the manifold geometry and fluid nozzle geometry may conflict by occupying the same space. The method (1800) may further comprise modifying (1814) an oral insert model in response to the geometric conflict. For example, one or more of the fluid nozzle and manifold geometries may be modified in response to the geometric conflict.

In some variations, a geometric conflict may be identified and modified based on predetermined input and output parameter ranges. For example, first portion length $E_1$ of a fluid nozzle may limited to between about 1 mm and about 2.5 mm. A first portion length $E_1$ for the fluid nozzle inputted by a user that is outside this range may be identified as a geometric conflict and subsequently modified. In some variations, an input parameter may comprise patient oral geometry, clearance geometry (e.g., minimum wall thickness), and predetermined oral insert geometry (e.g., ideal/default fluid nozzle geometry). Similarly, output parameters (e.g., oral insert geometry) may have predetermined ranges that may be identified and modified when falling outside the predetermined range.

Figure 19:
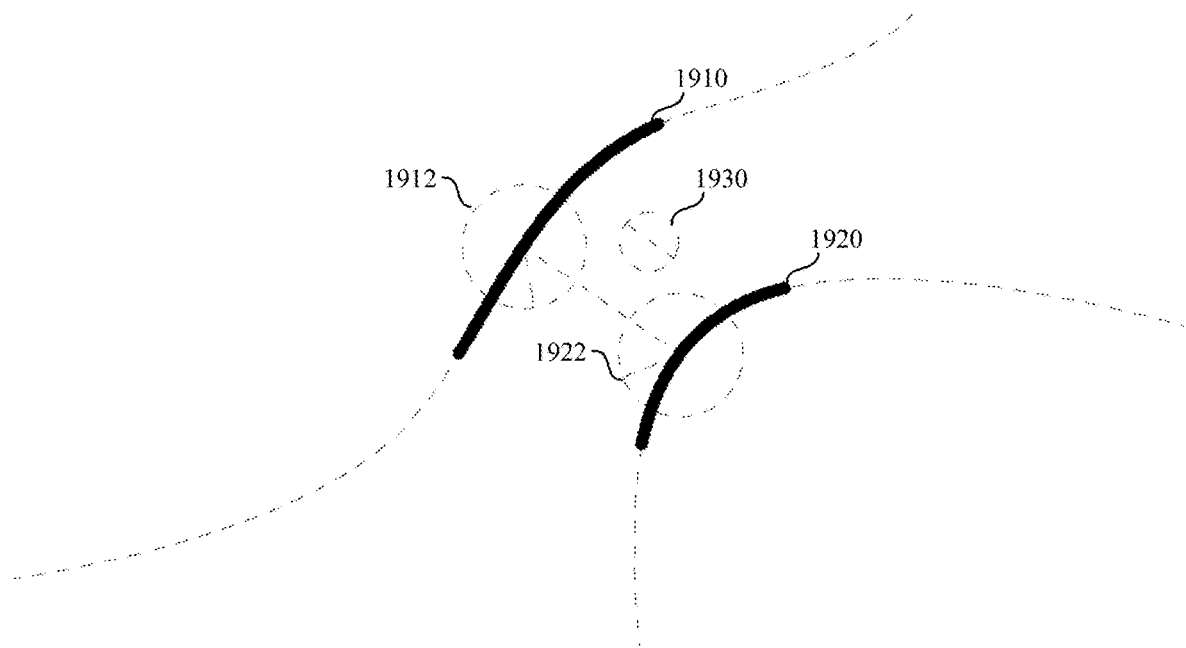
FIG. 19 is a schematic representation of one method of identifying a geometric conflict of an oral insert.

In some variations, one or more intersections of one or more of the fluid inlet port, fluid nozzles, manifolds, and tray surface may be identified using on one or more of a wire representation and mesh representation of those structures. In some variations, wire-to-wire geometry conflict identification (e.g., wire-to-wire clearance check) may be a computationally efficient method of identifying geometric conflicts where the geometric structures (e.g., fluid conduits, fluid nozzles, manifolds) to analyze may be represented as tubular shapes. For example, in a wire-to-wire clearance check, intersection and clearance (e.g., wall thickness) analysis of the central axes (e.g., wires) of two or more tubular structures may be performed. FIG. 19 is a schematic representation of wire-to-wire geometric conflict identification for a first wire (1910) and a second wire (1920). Each wire may define a line or curve. The first and second wires (1910, 1920) each comprise a central axis and respective radii (1912, 1922). In some variations, the closest points between the two wires (1910, 1920) may be identified and measured. If this distance is less than the radii (1912, 1922) of the two wires (1910, 1920) and a predetermined clearance (1930) (e.g., wall thickness), then a geometric conflict may be identified between the two wire structures (1910, 1920). In some variations, a geometric conflict may be notified to a user or automatically resolved based on a predetermined optimization method.

Figure 20:
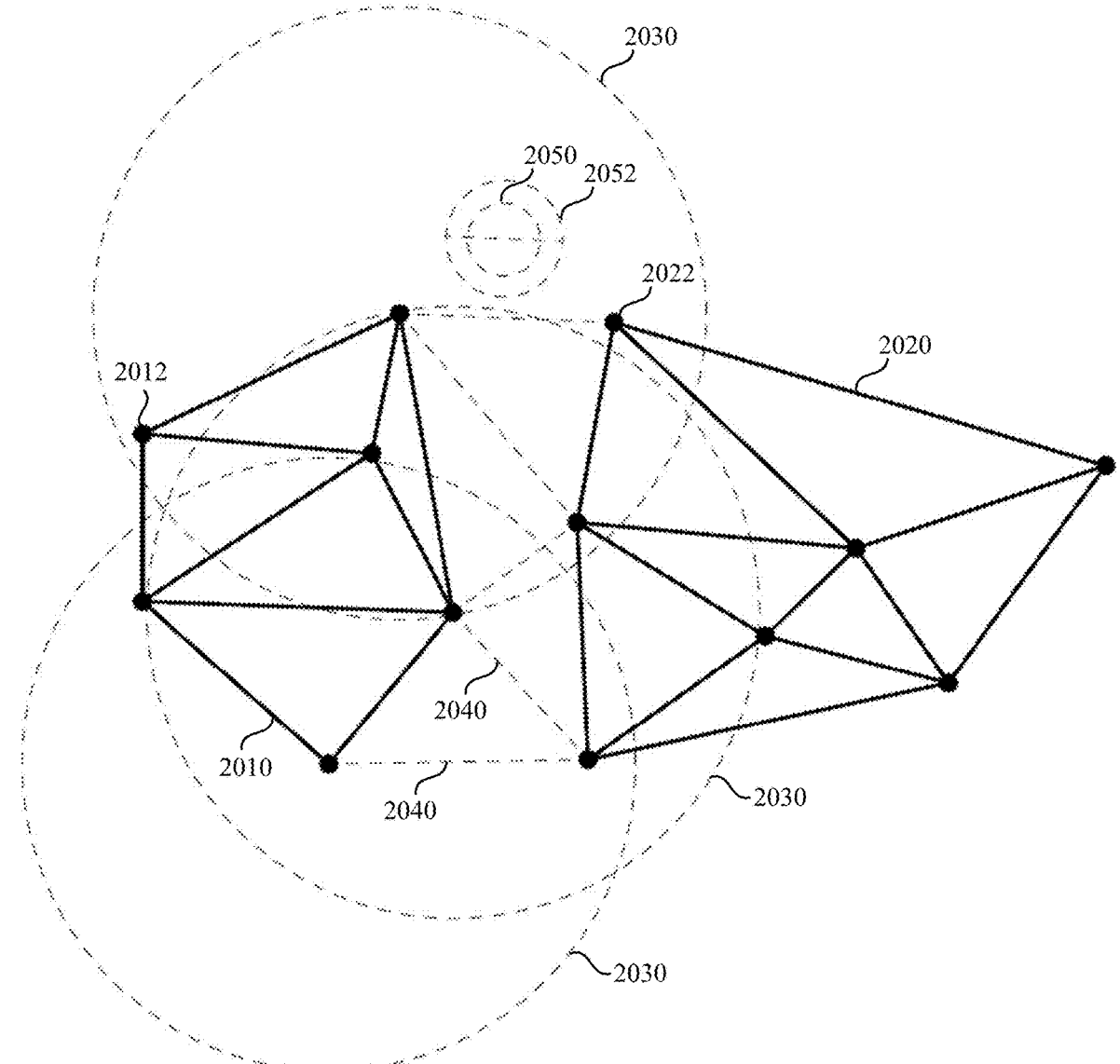
FIG. 20 is a schematic representation of one method of identifying a geometric conflict of an oral insert.

In some variations, mesh-to-mesh geometry conflict identification (e.g., mesh-to-mesh clearance check) may be a comprehensive method of identifying geometric conflicts where the structures to analyze may be represented three-dimensionally by an arbitrary shape. For example, in a mesh-to-mesh clearance check, intersection and clearance (e.g., wall thickness) analysis of three-dimensional surfaces (e.g., meshes) of two or more oral insert structures may be performed. FIG. 20 is a schematic representation of geometric conflict identification for a first mesh (2010) and a second mesh (2020). Each mesh may comprise a set of vertices (2012, 2022) and lines (e.g., edges) connected therebetween. In some variations, a set of vertices (2022) of the second mesh (2020) within a predetermined search radius (2030) of a first mesh vertex (2012) may be identified for each vertex (2012) of the first mesh (2010). In some variations, the predetermined search radius (2030) may comprise a predetermined minimum wall thickness (2050) and a predetermined offset (2052) (e.g., tolerance). For each second mesh vertex (2022) within the search radius (2030), a distance (2040) between the first mesh vertex (2012) and second mesh vertex (2022) may be calculated. If the distance (2040) is less than a predetermined minimum wall thickness (2050), then a geometric conflict may be identified between the first mesh (2010) and the second mesh (2020).

In some variations, one or more fluid nozzle geometric conflicts may be identified within the fluid nozzle and between the fluid nozzle and other oral insert structures. In some variations, one or more intersections between a fluid nozzle and a tray surface may be identified as a geometric conflict. In some variations, mesh-to-mesh representations of the fluid nozzle and tray surface may be used to identify a geometric conflict with greater accuracy than a wire-to-wire representation.

Figure 21:
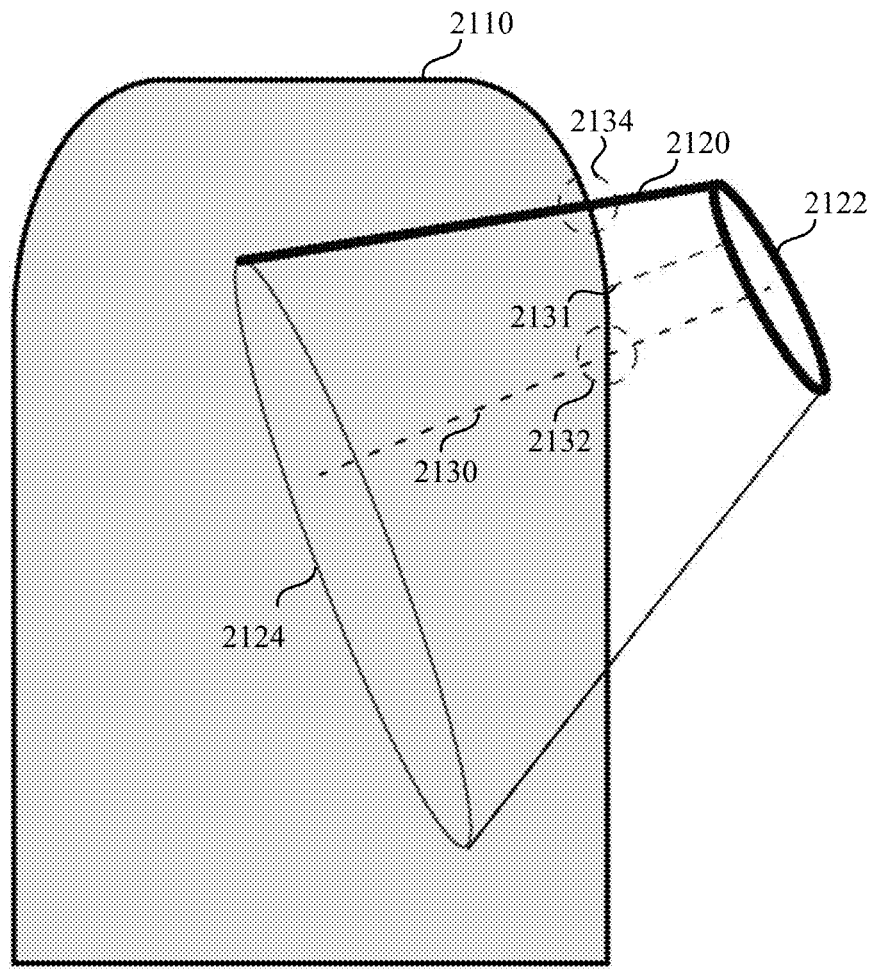
FIG. 21 is a schematic representation of one method of identifying a geometric conflict of a fluid nozzle.

FIG. 21 is a schematic representation of a geometric conflict check between a fluid nozzle clearance geometry (2120) and tray surface (2110). In some variations, an acceptable fluid nozzle clearance geometry may be identified when the fluid nozzle clearance geometry (2120) intersects (2134) a tray surface (2110) and a first longitudinal axis $L_1$ (2130) intersects (2132) the tray surface (2110). In some variations, a clearance geometry inlet (2122) may have a predetermined distance (2131) (e.g., greater than zero) from the tray surface (2110), and the first longitudinal axis $L_1$ (2130) may intersect (2132) the tray surface (2110).

In some variations, one or more geometric conflicts may be identified between other fluid nozzle structures and the tray surface. For example, a geometric conflict may be identified when any of first longitudinal axis $L_1$, first portion $E_1$, second portion $E_0$, and the fluid nozzle inlet $L_2$ intersects a tray surface.

In some variations, one or more geometric conflicts may be identified between a fluid nozzle and fluid outlet port (e.g., effluence port). For example, a clearance check may be performed between each fluid nozzle structure and a fluid outlet port to ensure that the fluid nozzles do not intersect and that they also meet clearance criteria (e.g., minimum wall thickness).

In some variations, one or more fluid nozzle to fluid nozzle geometric conflicts may be identified. For example, the geometry of adjacent fluid nozzles may be analyzed (using either wire-to-wire or mesh-to-mesh clearance checks) to ensure that the fluid nozzles do not intersect and that they also meet clearance criteria (e.g., minimum wall thickness). In some variations, a clearance check may be performed between every pair of adjacent fluid nozzles. For example, as shown in FIG. 10A, a clearance check may comprise calculating a set of distances (1030) between a second portion (1016) of a first fluid nozzle and each of a first portion (1024), second portion (1026), and fluid nozzle inlet (1022) of a second fluid nozzle. As shown in FIG. 10B, the clearance check may further comprise calculating a set of distances between a first portion (1014) of a first fluid nozzle and each of a first portion (1024), second portion (1026), and fluid nozzle inlet (1022) of a second fluid nozzle. As shown in FIG. 10C, the clearance check may further comprise calculating a set of distances between a fluid nozzle inlet (1022) of a first fluid nozzle and each of a first portion (1024) and second portion (1026) of a second fluid nozzle. The fluid nozzles may pass the clearance criteria when the set of calculated distances meet or exceed a set of predetermined distances.

In some variations, one or more manifold geometric conflicts may be identified within the manifold and between the manifold and other oral insert structures. In some variations, one or more geometric conflicts may be identified between the manifold and fluid nozzle. For example, the geometry of a manifold and fluid nozzles not associated with that manifold may be analyzed (using either wire-to-wire or mesh-to-mesh clearance checks) to ensure that these non-associated fluid nozzles do not intersect the manifold and that they also meet predetermined clearance criteria (e.g., minimum wall thickness for some portions). As another example, a fluid nozzle outlet may have a wall thickness requirement while a fluid nozzle inlet (e.g., manifold lead-in) may not since it is a space reservation for a manifold.

In some variations, a clearance check may be performed between a manifold and every fluid nozzle not directly coupled to the manifold. For example, a geometric conflict may be identified when the manifold geometry intersects any of a first longitudinal axis $L_1$, first portion $E_1$, and second portion $E_0$ of a fluid nozzle not directly coupled to the manifold.

In some variations, one or more manifold to manifold geometric conflicts may be identified. For example, the geometry of each manifold pairing of an oral insert may be analyzed (using either wire-to-wire or mesh-to-mesh clearance checks) to ensure that the manifolds do not intersect and that they also meet clearance criteria (e.g., minimum wall thickness). In some variations, a clearance check may be performed between every pairing of the manifolds of the oral insert.

In some variations, one or more kinks in a manifold may be identified that may reduce the hydraulic performance characteristics of the oral insert. In some variations, one or more radius of curvatures may be calculated along a plurality of locations along a central axis of the manifold. The manifold may comprise a kink when the calculated radius of curvature at a location of the manifold is less than a radius of the manifold at the location or less than a maximum radius of the manifold. In some variations, a manifold may be modified when a kink is identified to improve fluid flow.

In some variations, one or more geometric conflicts may be identified between oral insert surface geometry and an oral insert hydraulic structure. For example, oral insert surface geometry such as a tray surface (e.g., alignment feature) or fluid outlet port may be analyzed with respect to one or more of a fluid inlet port, manifold, and fluid nozzle (using either wire-to-wire or mesh-to-mesh clearance checks) to ensure that these geometries do not intersect and that they also meet clearance criteria (e.g., minimum wall thickness).

The method (1800) may further comprise optimizing (1816) one or more oral insert structures. In some variations, optimization may comprise identifying a set of acceptable geometry of an oral insert structure and selecting an "optimal" geometry based on predetermined criteria (e.g., closest to ideal geometry). In some variations, optimization may be a linear or non-linear process. In some variations, optimization may be performed for one or more oral insert structures serially or in parallel. For example, manifold optimization may be followed serially by fluid nozzle optimization or manifold and fluid nozzle optimization may be performed in parallel.

In some variations, a fluid nozzle may be generated based on a linear (e.g., sequential) optimization process. For example, the generated fluid nozzle may try to achieve a set of predetermined (e.g., optimal) fluid nozzle parameter values. In some variations, a set of fluid nozzles may be initially placed at a set of predetermined (e.g., ideal) positions. For each fluid nozzle, a first longitudinal axis $L_1$ may be extended from a facial interproximal point or lingual interproximal point to a fluid nozzle outlet (940). If the first longitudinal axis $L_1$ is not within a predetermined length range (e.g., between about 2 mm and about 6 mm), then a set of lines $L_{1,s}$ may be generated from the facial or lingual interproximal point to the fluid nozzle outlet (940) and having an angle $\theta_1$ within the predetermined clearance geometry angles (e.g., between about 45 degrees and about 90 degrees). From the set of lines $L_{1,s}$, an optimal line $L_{1,opt}$ may be identified that comprises the predetermined length range and a minimum angle $\theta_{1,opt}$ relative to $L_1$. The first longitudinal axis $L_1$ may then be set to $L_{1,opt}$.

If first portion $E_1$ intersects a tray surface, then a minimum angle $\theta_2$ for which first portion $E_1$ does not intersect the tray surface or breach a minimum wall thickness may be calculated. In some variations, if the fluid nozzle inlet (930) (e.g., manifold space reservation) does not meet predetermined clearance criteria, then $E_1$ may be extended until $L_2$ clears the tray surface and $E_1$ is within the predetermined length range. If this new $L_2$ intersects the fluid outlet port, then $\theta_2$ may be rotated away from the tray surface and the fluid outlet port until a distance from the fluid nozzle inlet (930) and fluid outlet port meets predetermined clearance criteria (e.g., minimum wall thickness).

In some variations, non-linear optimization may be performed for a set of fluid nozzle locations. Non-linear optimization may comprise measuring a quality of fluid nozzle positioning using a predetermined fitting function. The value of the fitting function may be optimized by varying nozzle parameters. In some variations, a predetermined (e.g., ideal) fluid nozzle geometry may be defined. Non-linear optimization may be performed using the predetermined fluid nozzle geometry and a predetermined nozzle positioning function while performing conflict identification and modification to converge the fluid nozzle geometry on an optimal solution having minimal conflicts.

In some variations, a set of manifolds may be optimized by defining an initial and predetermined (e.g., ideal) manifold geometry. The manifold and fluid nozzle positions may be optimized while performing conflict identification and modification to converge the optimal manifold geometry on a solution having minimal conflicts. For example, manifold inlet geometry may be optimized for a set of manifolds directly coupled to a fluid entry port.

The method (1800) may further comprise smoothing (1818) oral insert structures and hydraulic intersections. The method (1800) may further comprise outputting (1820) the oral insert model (e.g., solid model) in a data format suitable for one or more of display, analysis, transmission, storage, manipulation, and manufacturing. The method (1800) may further comprise manufacturing (1822) the oral insert based on the oral insert model.

Although the foregoing variations have, for the purposes of clarity and understanding, been described in some detail by of illustration and example, it will be apparent that certain changes and modifications may be practiced, and are intended to fall within the scope of the appended claims. Additionally, it should be understood that the components and characteristics of the systems and devices described herein may be used in any combination. The description of certain elements or characteristics with respect to a specific figure are not intended to be limiting or nor should they be interpreted to suggest that the element cannot be used in combination with any of the other described elements. For all of the variations described above, the steps of the methods may not be performed sequentially. Some steps are optional such that every step of the methods may not be performed.

We claim:

1. A method of generating a model of an oral insert that comprises a fluid inlet port, fluid nozzles, manifolds, and a tray configured to retain teeth, the method comprising:
    generating a geometry of the fluid nozzles based on oral scan data of a jaw;
    defining a tray surface that encloses the fluid nozzles based on the oral scan data;
    generating a geometry of the manifolds that connect the fluid inlet port to the fluid nozzles, wherein the manifolds are configured to provide a predetermined range of hydraulic pressures to each of the fluid nozzles;
    generating one or more step regions of the manifold based on one or more of a number and location of the fluid nozzles; and
    displaying the one or more step regions of the manifold as a geometric representation of the oral insert model.

2. The method of claim 1, wherein each of the manifolds comprises a trunk coupled to the fluid inlet port and at least one of the fluid nozzles.

3. The method of claim 2, wherein generating the geometry of the manifolds further comprises generating a branch coupled to the trunk and one or more of the fluid nozzles.

4. The method of claim 2, wherein generating the geometry of the manifolds further comprises generating a pressure port coupled to the trunk based on a number of the fluid nozzles.

5. The method of claim 1, wherein a diameter of the manifold decreases along a length of the manifold from the fluid inlet port.

6. The method of claim 1, wherein generating the geometry of the manifolds further comprises identifying one or more step regions along a length of the manifold.

7. The method of claim 1, further comprising smoothing intersections between one or more of the fluid inlet port, fluid nozzles, manifolds, branch, pressure port, and the tray surface.

8. The method of claim 1, wherein the manifold is configured to provide a substantially equal hydraulic pressure to each of the fluid nozzles.

9. The method of claim 1, further comprising:
    identifying one or more intersections and clearance conflicts between one or more of the fluid inlet port, the fluid nozzles, the manifolds, and the tray surface based on one or more of a wire representation analysis and mesh representation analysis; and displaying a geometric conflict between one or more of the fluid inlet port, the fluid nozzles, the manifolds, and the tray with the geometric representation of the oral insert model.

10. The method of claim 9, further comprising modifying one or more of the geometries of the fluid nozzles and the manifolds in response to the geometric conflict.

11. The method of claim 9, wherein displaying the geometric representation of the geometric conflict further comprises identifying one or more kinks in the manifolds.

12. The method of claim 9, wherein displaying the geometric representation of the geometric conflict further comprises identifying intersections and clearance conflicts between the fluid nozzle and the tray surface.

13. The method of claim 1, further comprising:
identifying interproximal geometry and teeth geometry of the oral scan data of the jaw;
generating a geometry of the fluid nozzles of the oral insert model based on the interproximal geometry and the teeth geometry such that the fluid nozzles are configured to clean oral tissue, wherein the geometry of the fluid nozzles comprise a fluid nozzle inlet, a fluid nozzle outlet, and a fluid nozzle clearance geometry;
identifying one or more intersections and clearance conflicts of the oral insert model between one or more of the fluid inlet port, the fluid nozzles, the manifolds, and the tray surface based on the fluid nozzle clearance geometry; and
displaying the one or more intersections and clearance conflicts with the geometric representation of the oral insert model.

14. The method of claim 13, wherein the interproximal geometry comprises one or more of a facial interproximal point, a lingual interproximal point, an occlusal interproximal point, and an interproximal plane.

15. The method of claim 13, wherein the fluid nozzle clearance geometry comprises a vertex angle between about 45 degrees and about 90 degrees.

16. The method of claim 13, wherein the fluid nozzle clearance geometry comprises an inlet comprising a first diameter and an outlet comprising a second diameter larger than the first diameter.

* * * * *